US012737110B2

(12) United States Patent
Gabrilovich et al.

(10) Patent No.: US 12,737,110 B2
(45) Date of Patent: Sep. 15, 2026

(54) METHODS FOR IDENTIFYING DEVOLVED SEQUENCES OF HANDWRITING MOTIONS FOR GENERATING TARGET INPUTS USING A CO-ADAPTED INPUT-DETECTION MODEL, AND DEVICES AND SYSTEMS THEREFOR

(71) Applicant: Meta Platforms Technologies, LLC, Menlo Park, CA (US)

(72) Inventors: Evgeniy Gabrilovich, Saratoga, CA (US); Patrick William John Kaifosh, New York, NY (US); Shagun Sodhani, Toronto (CA); Michael Mandel, Brooklyn, NY (US); Stephen McAnearney, Darien, CT (US); Adam Calhoun, New York, NY (US); Adam Berenzweig, Brooklyn, NY (US); Laurentius Johannes Paulus van der Maaten, New York, NY (US); Salvatore Candido, San Francisco, CA (US); Chia-Jung Chang, Redwood City, CA (US); Siddharth Reddy, New York, NY (US); Thomas Robert Reardon, New York, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 101 days.

(21) Appl. No.: 18/905,099

(22) Filed: Oct. 2, 2024

(65) Prior Publication Data

US 2025/0117131 A1 Apr. 10, 2025

Related U.S. Application Data

(60) Provisional application No. 63/588,270, filed on Oct. 5, 2023.

(51) Int. Cl.

*G06F 3/04883* (2022.01)
*G06T 11/00* (2026.01)
*G06F 3/01* (2006.01)

(52) U.S. Cl.

CPC .......... *G06F 3/04883* (2013.01); *G06T 11/00* (2013.01); *G06F 3/015* (2013.01); *G06T 2200/24* (2013.01)

(58) Field of Classification Search

CPC .......... G06F 3/014; G06F 3/015; G06F 3/017; G06F 3/04883; G06T 11/00; G06T 2200/24

See application file for complete search history.

(56) References Cited

U.S. PATENT DOCUMENTS

2011/0157012 A1* 6/2011 Ma .................... G06F 3/0237 345/157
2014/0368474 A1* 12/2014 Kim .................... A61B 5/1122 345/179

(Continued)

FOREIGN PATENT DOCUMENTS

WO 2021046267 A1 3/2021

OTHER PUBLICATIONS

International Search Report and Written Opinion for International Application No. PCT/US2024/050094, mailed Jan. 8, 2025, 11 pages.

*Primary Examiner* — Ryan A Lubit
(74) *Attorney, Agent, or Firm* — Morgan, Lewis & Bockius LLP

(57) ABSTRACT

A method of identifying devolved sequences of handwriting motions is described. The method includes obtaining, via sensors of a wearable device of a computing system, data corresponding to a user attempting to perform a sequence of handwriting motions associated with one or more target inputs while wearing the wearable device. The method (Continued)

includes identifying, based on at least (i) the data corresponding to the user attempting to perform the sequence of handwriting motion and (ii) the one or more target inputs associated with the sequence of handwriting motions, a devolved sequence of handwriting motions to suggest to the user for inputting a respective target input of the one or more target inputs. The devolved sequence of handwriting motions is a different sequence and includes fewer handwriting motions as compared to the sequence of handwriting motions. And the method includes presenting a representation of the devolved sequence of handwriting motions.

20 Claims, 22 Drawing Sheets

(56) References Cited

U.S. PATENT DOCUMENTS

2015/0169975 A1 6/2015 Kienzle et al.
2018/0284912 A1* 10/2018 Kim .................... G06F 3/03545
2020/0065370 A1* 2/2020 Mannby ................ G06F 40/171
2020/0201443 A1* 6/2020 Huang ................. G06N 3/0464
2020/0356254 A1* 11/2020 Missig ................ G06F 3/04886
2024/0086761 A1* 3/2024 Patel ...................... A61B 5/165

* cited by examiner

Figure 2A:
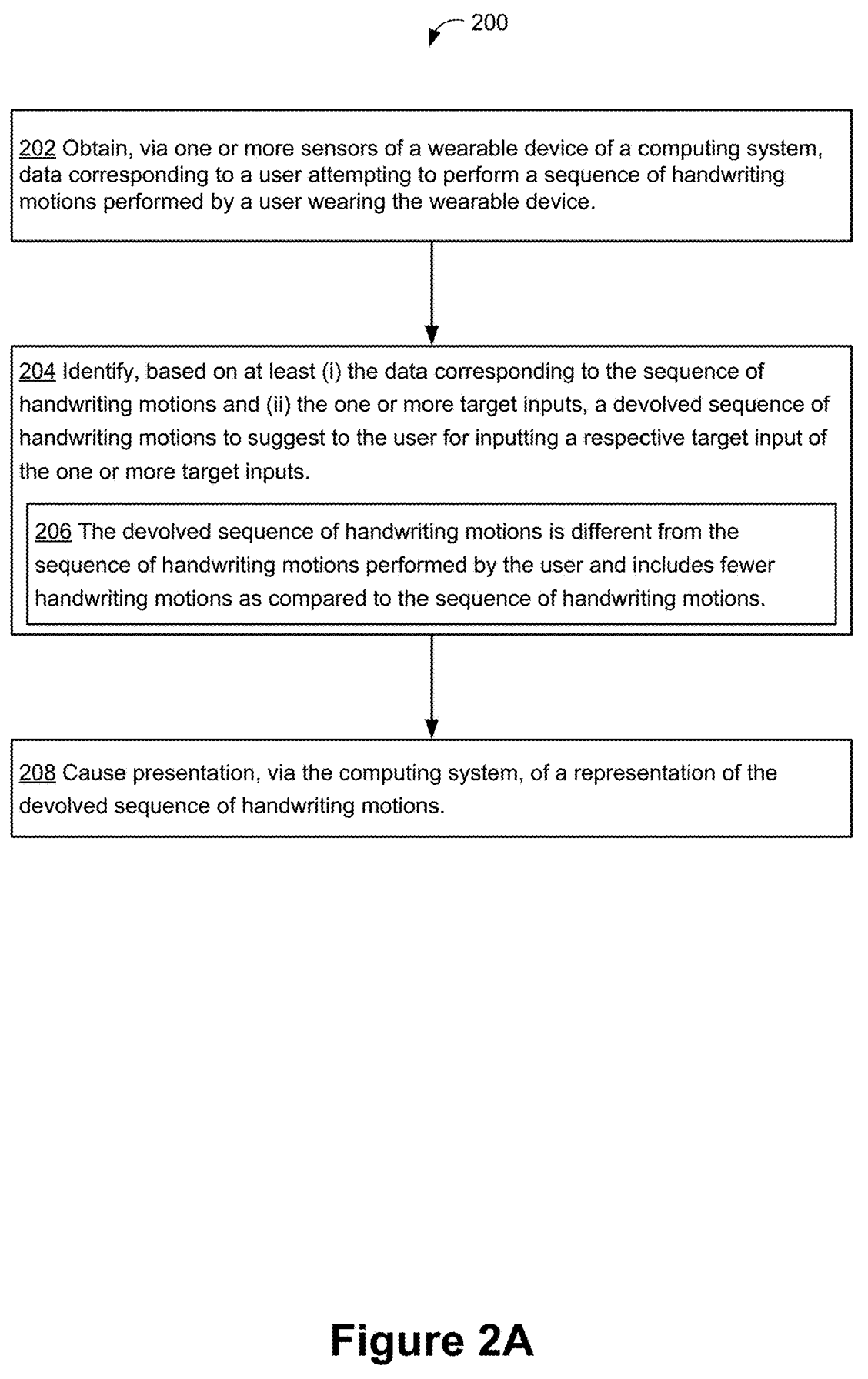

200

202 Obtain, via one or more sensors of a wearable device of a computing system, data corresponding to a user attempting to perform a sequence of handwriting motions performed by a user wearing the wearable device.

204 Identify, based on at least (i) the data corresponding to the sequence of handwriting motions and (ii) the one or more target inputs, a devolved sequence of handwriting motions to suggest to the user for inputting a respective target input of the one or more target inputs.

206 The devolved sequence of handwriting motions is different from the sequence of handwriting motions performed by the user and includes fewer handwriting motions as compared to the sequence of handwriting motions.

208 Cause presentation, via the computing system, of a representation of the devolved sequence of handwriting motions.

Figure 2B:
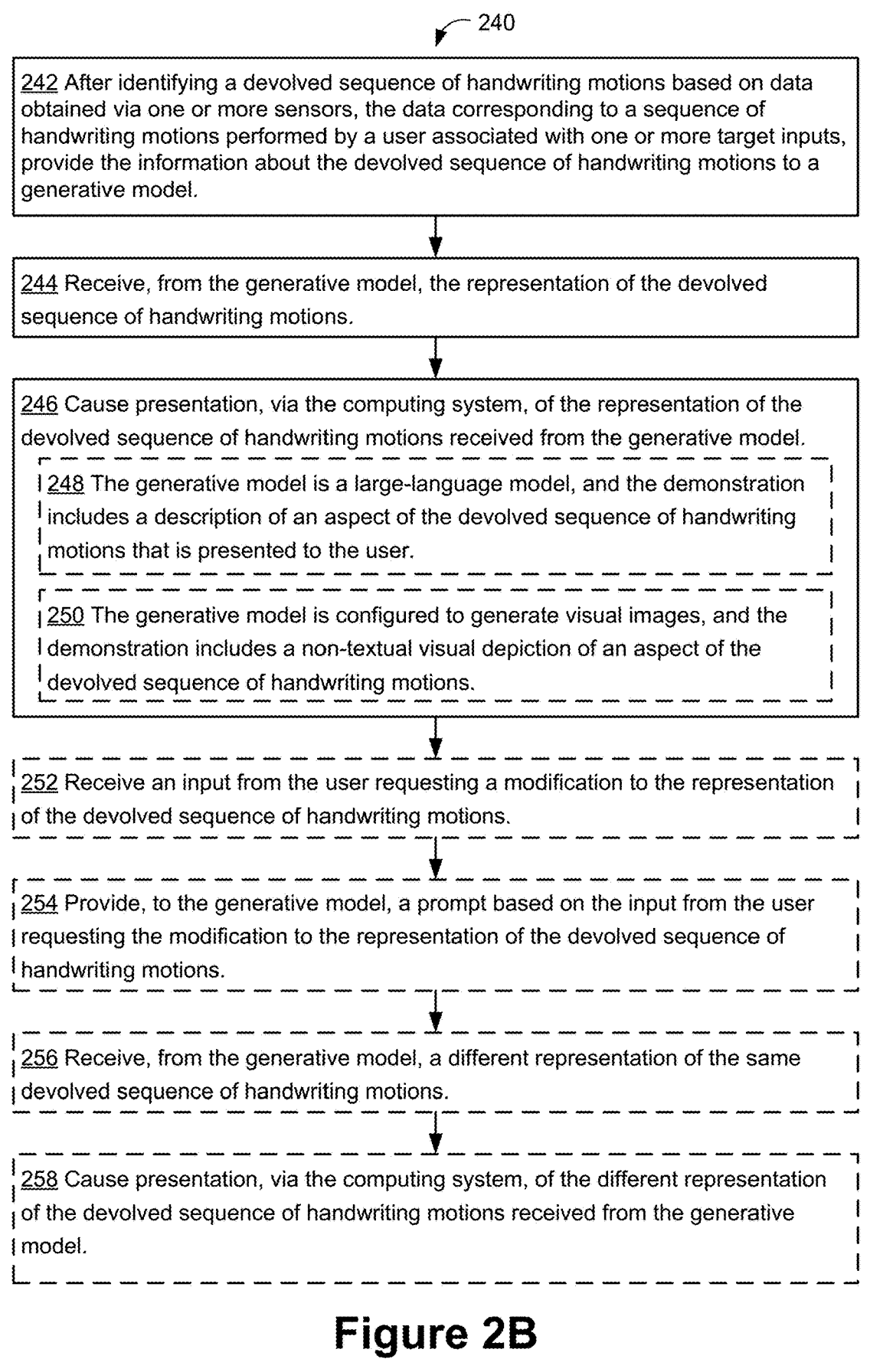

242 After identifying a devolved sequence of handwriting motions based on data obtained via one or more sensors, the data corresponding to a sequence of handwriting motions performed by a user associated with one or more target inputs, provide the information about the devolved sequence of handwriting motions to a generative model.

244 Receive, from the generative model, the representation of the devolved sequence of handwriting motions.

246 Cause presentation, via the computing system, of the representation of the devolved sequence of handwriting motions received from the generative model.

248 The generative model is a large-language model, and the demonstration includes a description of an aspect of the devolved sequence of handwriting motions that is presented to the user.

250 The generative model is configured to generate visual images, and the demonstration includes a non-textual visual depiction of an aspect of the devolved sequence of handwriting motions.

252 Receive an input from the user requesting a modification to the representation of the devolved sequence of handwriting motions.

254 Provide, to the generative model, a prompt based on the input from the user requesting the modification to the representation of the devolved sequence of handwriting motions.

256 Receive, from the generative model, a different representation of the same devolved sequence of handwriting motions.

258 Cause presentation, via the computing system, of the different representation of the devolved sequence of handwriting motions received from the generative model.

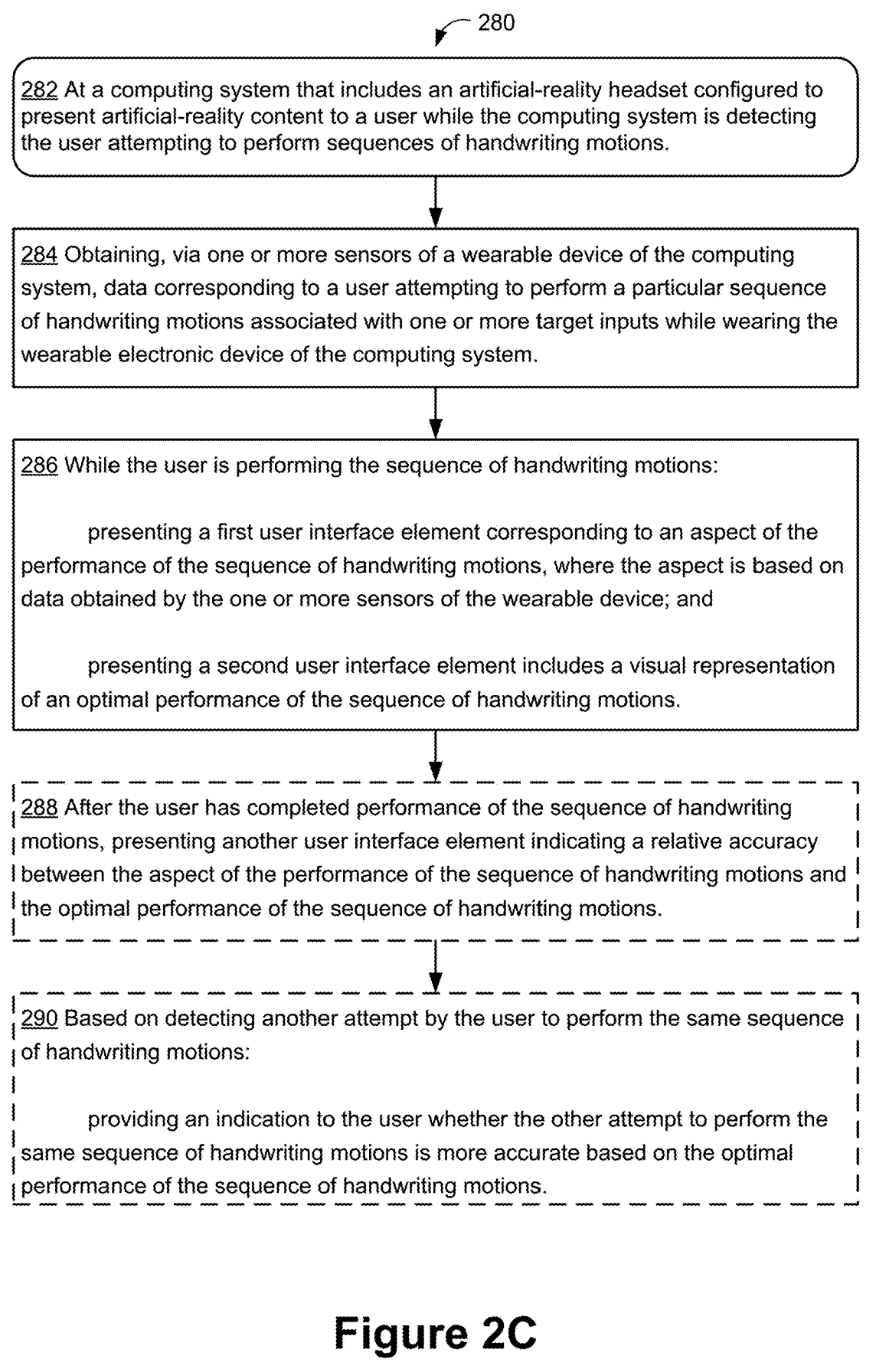

282 At a computing system that includes an artificial-reality headset configured to present artificial-reality content to a user while the computing system is detecting the user attempting to perform sequences of handwriting motions.

284 Obtaining, via one or more sensors of a wearable device of the computing system, data corresponding to a user attempting to perform a particular sequence of handwriting motions associated with one or more target inputs while wearing the wearable electronic device of the computing system.

286 While the user is performing the sequence of handwriting motions:

presenting a first user interface element corresponding to an aspect of the performance of the sequence of handwriting motions, where the aspect is based on data obtained by the one or more sensors of the wearable device; and presenting a second user interface element includes a visual representation of an optimal performance of the sequence of handwriting motions.

288 After the user has completed performance of the sequence of handwriting motions, presenting another user interface element indicating a relative accuracy between the aspect of the performance of the sequence of handwriting motions and the optimal performance of the sequence of handwriting motions.

290 Based on detecting another attempt by the user to perform the same sequence of handwriting motions:

providing an indication to the user whether the other attempt to perform the same sequence of handwriting motions is more accurate based on the optimal performance of the sequence of handwriting motions.

Figure 2C

METHODS FOR IDENTIFYING DEVOLVED SEQUENCES OF HANDWRITING MOTIONS FOR GENERATING TARGET INPUTS USING A CO-ADAPTED INPUT-DETECTION MODEL, AND DEVICES AND SYSTEMS THEREFOR

RELATED APPLICATIONS

This application claims priority to U.S. Prov. App. No. 63/588,270, filed on Oct. 5, 2023, entitled "Methods for Identifying Devolved Sequences of Handwriting Motions for Generating Target Inputs using a Co-Adapted Input-Detection Model, and Devices and Systems therefor," which is hereby incorporated by reference in its entirety.

TECHNICAL FIELD

The present disclosure relates generally to wearable electronic devices (e.g., wrist-wearable devices and/or head-wearable devices) with sensors for detecting sequences of handwriting motions performed by a wearer, and more particularly to identifying devolved sequences of handwriting motions for generating target inputs (e.g., text characters and strings, emojis, gifs).

BACKGROUND

Conventional textual input systems allow users to produce content (e.g., generate targeted textual inputs) by pressing physical buttons (e.g., on a keyboard or remote controller) and/or a touch-sensitive display displaying virtual buttons within a user interface. These textual input systems typically require tedious user inputs using "hunt-and-peck" techniques for locating and entering characters of the target inputs that the user intends to produce. These input systems are not practically capable of allowing users to produce text at speeds the same or similar to, the users' speed of producing thought and/or speaking (e.g., 120 to 150 words per minute).

The existing textual input systems are also rigidly defined, and do not efficiently or intuitively facilitate co-adaptation between the users and their respective devices for detecting user inputs. And thus, existing textual input systems do not include or consider means for effectively tracking a user's progress to determine more efficient ways for the user to perform operations to achieve the same target input as by performing the precise inputs defined by the textual input system.

SUMMARY

The methods, devices, and systems described herein address the deficiencies described above. Namely, the techniques described herein allow users to produce one or more target inputs (e.g., textual characters, emojis, reactions) by performing devolved sequences of handwriting motions that are suggested to them by a co-adapted machine-learning model. For example, a user may perform one or more handwriting motions to produce (e.g., in a text message) letters in the word "this" (e.g., separately drawing "t," "h," "I," and "s"). A machine-learning model receiving data corresponding to the user's hand movements may determine a simpler "devolved" version of the sequence of handwriting motions (e.g., requiring less motor activity, is less constrained by legibility criteria) that the user can perform to produce the same textual elements. The devolved sequence of handwriting motions may be selected based on an objective of the machine-learning model to improve the user's speed of producing target inputs (e.g., words per minute).

A first example method of identifying devolved sequences of handwriting motions is described herein. The operations of the example method include obtaining, via one or more sensors of a wearable device of a computing system, data corresponding to a user attempting to perform a sequence of handwriting motions associated with one or more target inputs while wearing a wearable electronic device of a computing system. The method further includes identifying, based on at least (i) the data corresponding to the user attempting to perform the sequence of handwriting motions and (ii) the one or more target inputs associated with the sequence of handwriting motions, a devolved sequence of handwriting motions to suggest to the user for inputting a respective target input of the one or more target inputs. The devolved sequence of handwriting motions is a different sequence as compared to the sequence of handwriting motions and includes fewer handwriting motions as compared to the sequence of handwriting motions. And the method includes causing presentation, via the computing system, of a representation of the devolved sequence of handwriting motions.

Some of the embodiments of the first example described herein are technical improvements to the pen-and-paper methodology for producing text. For example, devolvement criteria for identifying devolved sequences of handwriting motions are based on removing aspects of handwriting that are based on a legibility constraint (e.g., formal and informal rules about how text must be produced to ensure the text is readable by other human observers), which are not necessary for a co-adapted input-detection model to identify the same target inputs.

A second example method of presenting representations of identified sequences of handwriting motions to a user by applying the sequences of handwriting motions to a generative model that is co-adapted to a user of the computing system is provided. The second example includes obtaining, via one or more sensors of a wearable device of a computing system, data corresponding to a user attempting to perform a sequence of handwriting motions associated with one or more target inputs while wearing the wearable electronic device of a computing system. The second example method includes identifying, based on at least (i) the data corresponding to the user attempting to perform the sequence of handwriting motions and (ii) the one or more target inputs associated with the sequence of handwriting motions, a devolved sequence of handwriting motions to suggest to the user for inputting a respective target input of the one or more target inputs, where the devolved sequence of handwriting motions is a different sequence as compared to the sequence of handwriting motions and includes fewer handwriting motions as compared to the sequence of handwriting motions. The second example method includes, after identifying the devolved sequence of handwriting motions, providing information about the devolved sequence of handwriting motions to a generative model. The second example method includes receiving, from the generative model, a representation of the devolved sequence of handwriting motions. And the second example method includes causing presentation, via the computing system, of the representation of the devolved sequence of handwriting motions received from the generative model.

The features and advantages described in the specification are not necessarily all-inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will not be presented.

BRIEF DESCRIPTION OF THE DRAWINGS

For a better understanding of the various described embodiments, reference should now be made to the Detailed description below in conjunction with the following drawings in which like reference numerals refer to corresponding parts throughout the figures.

FIGS. 2A to 2C show example method flow charts for identifying devolved sequences of handwriting motions for generating target inputs using a co-adapted input-detection model, in accordance with some embodiments.

FIGS. 5A, 5B-1, 5B-2, and 5C illustrate example head-wearable devices, in accordance with some embodiments.

Figure 1A:
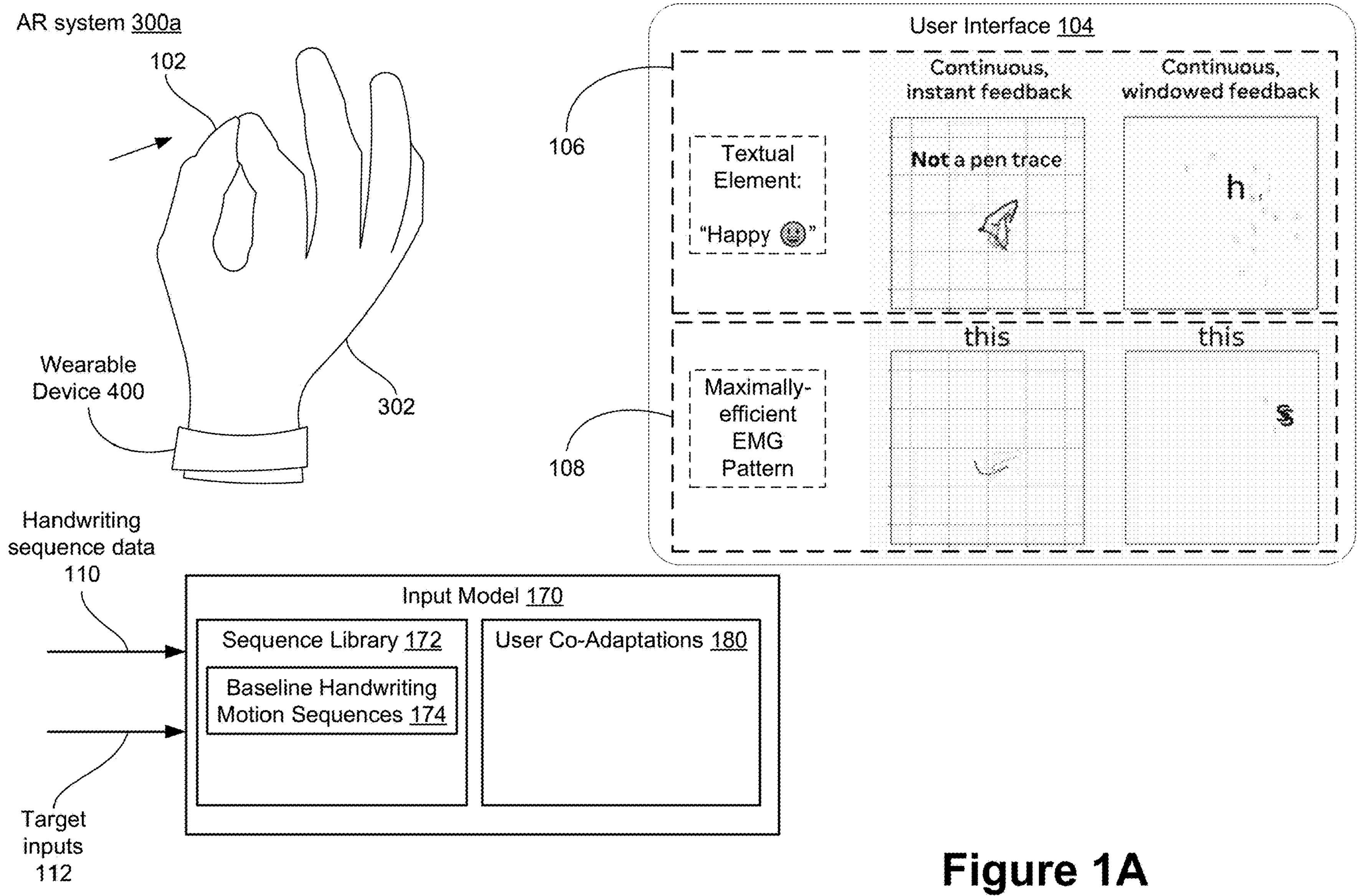
FIGS. 1A to 1F illustrate an example AR system for determining target inputs based on sequences of handwriting motions performed by a user and identifying devolved sequences of handwriting motions, in accordance with some embodiments.

In accordance with customary practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial reality (AR), as described herein, is any superimposed functionality and/or sensory-detectable presentation provided by an artificial-reality system within a user's physical surroundings. Such artificial realities can include and/or represent virtual reality (VR), augmented reality, mixed artificial reality (MAR), or some combination and/or variation of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and/or other gestures that can be detected and determined based on movements of a single hand (e.g., a one-handed gesture performed with a user's hand that is detected by one or more sensors of a wearable device (e.g., electromyography (EMG) and/or inertial measurement units (IMUs) of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words, the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single- or double-finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

As described herein, a baseline sequence of handwriting motions includes a sequence of hand motions performed by a user (e.g., in-air, near-surface, and/or surface-contact hand gestures) that directly corresponds to the motions (e.g., strokes) that the user would need to perform to produce the same text (e.g., target inputs) using pen-and-paper handwriting.

As described herein, devolved sequences of handwriting motions are sequences of handwriting motions that can be performed by the user to produce the same target inputs as would be produced by baseline sequences of handwriting motions, but which are in some way optimized (e.g., involving fewer handwriting motions than the corresponding baseline sequences of handwriting motions) for the user 302 to perform and/or for the computing system to detect.

As described herein, co-adaptation refers to a process of concurrently adapting (i) a model (e.g., a generative model, such as a LLM) and (ii) a user's behavior based on the respective tendencies of the model and the user, respectively. In other words, a co-adapted model becomes personalized based on aspects of a user's interactions with the model. In some embodiments, co-adaptation between a user and a generative model can be considered bi-directional (e.g., the model is capable of providing instructions to the user for adapting the user's performance of certain handwriting motions such that they are more likely to be correctly interpreted by the model).

FIGS. 1A to 1F illustrate an example AR system 300*a* (which is described in more detail with respect to FIG. 3A) that is causing operations to be performed for determining target inputs based on a sequence of handwriting motions 102 performed by a user 302 and identifying devolved sequences of handwriting motions (e.g., a devolved sequence suggestion 130 shown in FIG. 1B), in accordance with some embodiments.

Figure 4A:
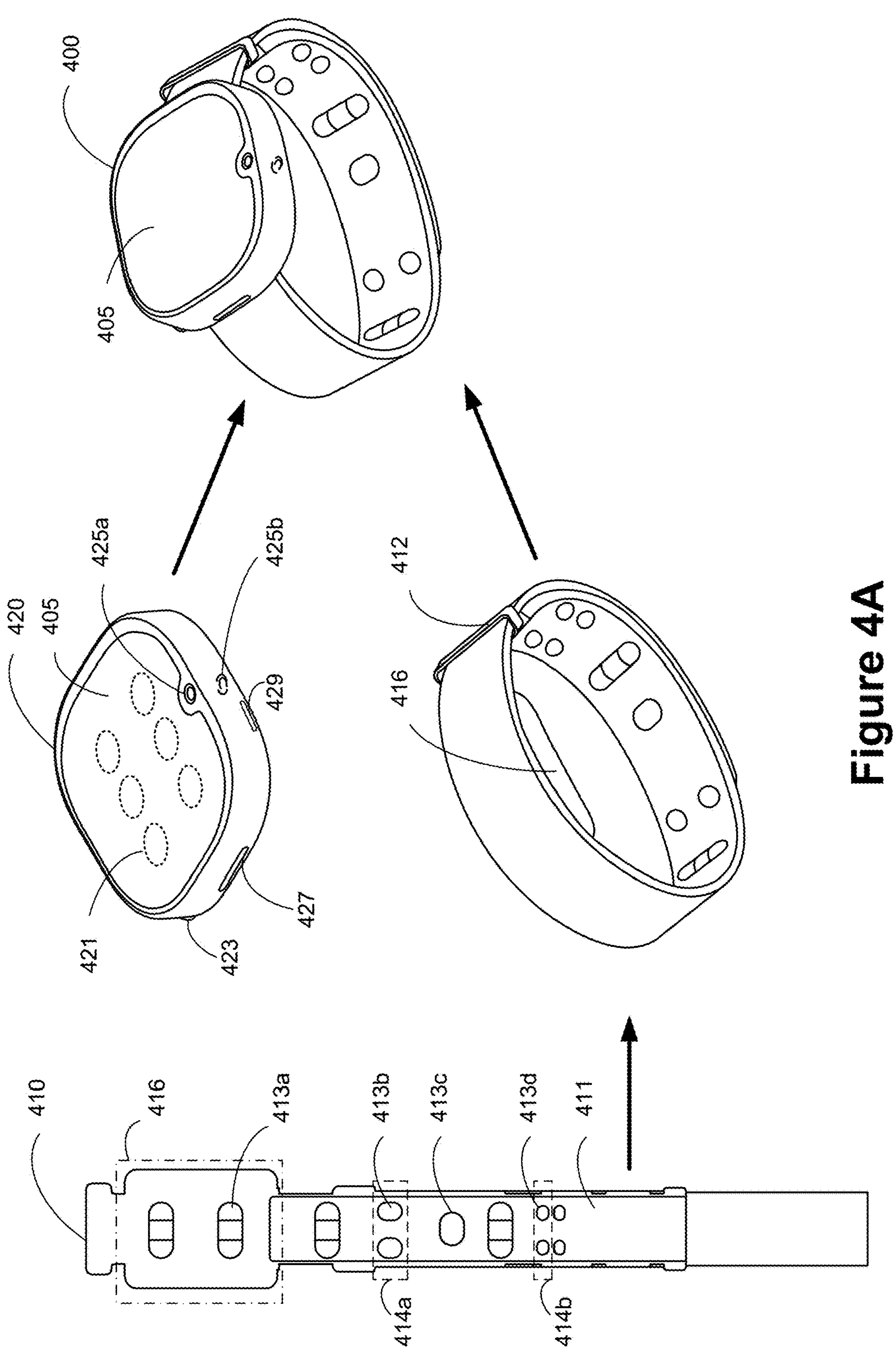
FIGS. 4A to 4B illustrate an example wrist-wearable device, in accordance with some embodiments.
Figure 4B:
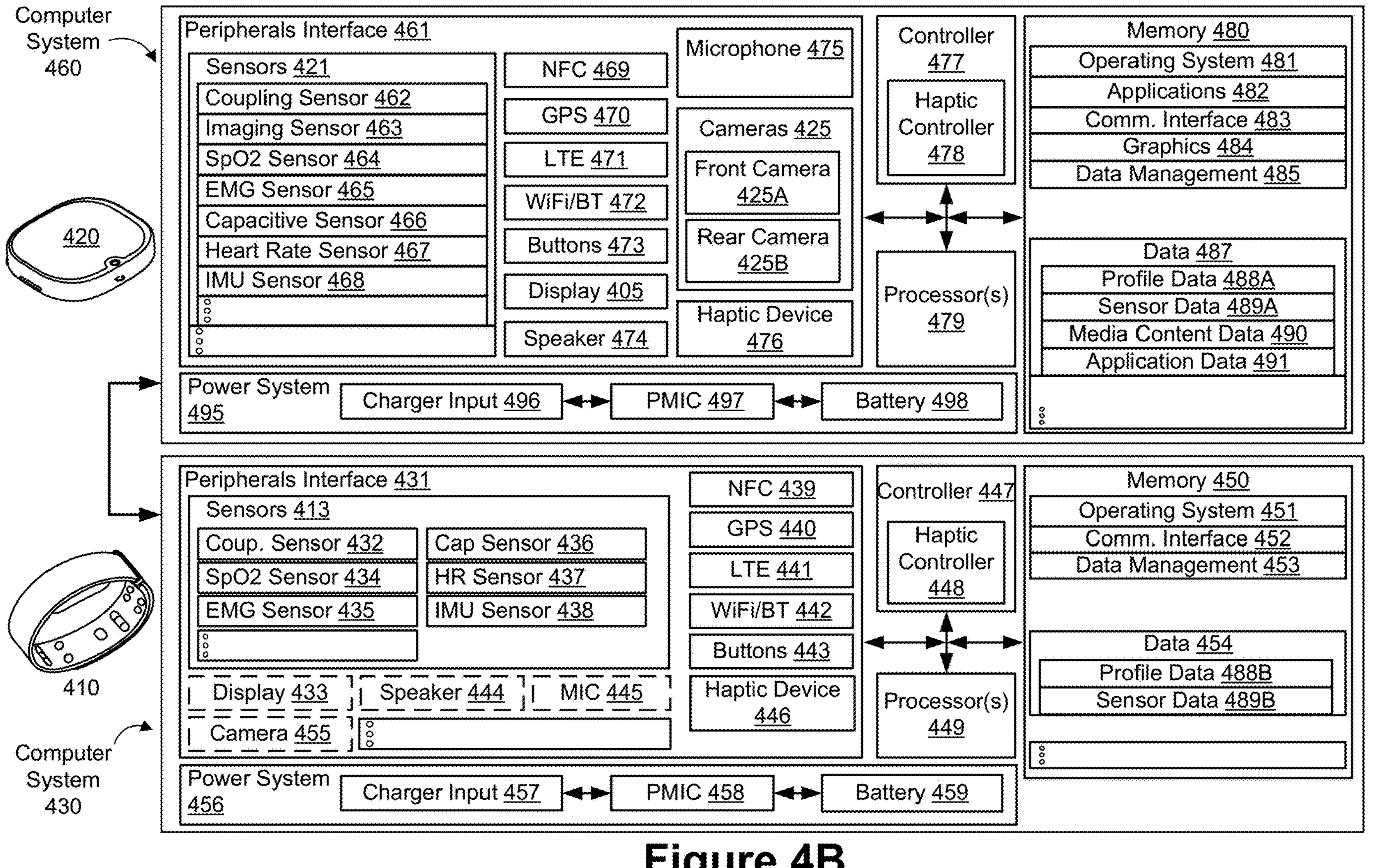

FIG. 1A shows the user 302 performing the sequence of handwriting motions 102 while wearing wrist-wearable device 400 (which is described in more detail with respect to FIGS. 4A and 4B). The wrist-wearable device 400 is part of a computing system 300*a* that also includes a head-wearable device being worn by the user 302 (e.g., AR headset 500, VR headset 510). But a skilled artisan will appreciate that computing systems including various different combinations of one or more different components can be used for performing some or all of the operations described herein (e.g., AR system 300*b*, AR system 300*c*, AR system 300*d*).

The sequence of handwriting motions 102 corresponds to a set of target inputs for the phrase "Happy:)." Specifically, the sequence of handwriting motions 102 that the user 302 is performing in FIG. 1A is described herein as a baseline sequence of handwriting motions, in that it includes respective handwriting motions that directly correspond to the same motions that the user 302 would need to perform to produce handwritten characters corresponding to the one or more target inputs (e.g., pen-and-paper sequences of letters and other characters). For example, a baseline sequence of handwriting motions corresponding to the letter "H" would include two vertical lines and a horizontal line that spatially connects the two vertical lines.

In accordance with some embodiments, the input model 170 includes a sequence library 172 that includes data (e.g., algorithms, detection models) for identifying one or more target inputs that the user 302 is attempting to produce by performing the sequence of handwriting motions 102. In some embodiments, the sequence library 172 is preconfigured with data for detecting sets of characters (e.g., alphanumeric text, numbers, and a select set of emojis) based on baseline sequences of handwriting motions. In accordance with some embodiments, the input model 170 is calibrated, or otherwise co-adapted, for the user 302 based on, for example, historical data, including data obtained while the user 302 was performing sequences of handwriting motions.

In some embodiments, the input model 170 receives data (e.g., the handwriting sequence data 110 and target input data 112 indicating the one or more target inputs that the user 302 is attempting to perform via the sequence of handwriting motions 102) from one or more data input devices of the computing system (e.g., biopotential-signal-sensing components, such as EMG sensors 465 of the wrist-wearable device 400 and/or imaging sensor 526, such as cameras, that are located on the wrist-wearable device 400 or the head-wearable device 500). In some embodiments, the input model utilizes sensor fusion to combine data from a variety of sources (e.g., data from the EMG sensor 756 and image data from the imaging sensor 526). In some embodiments, the input model 170 includes and/or is coupled with a generative model configured to perform various operations related to devolved sequences of handwriting motions. For example, a generative model may be used to identify a devolved sequence of handwriting motions to suggest to the user 302 based on a sequence of handwriting motions detected by the input model 170. In some embodiments, the same or a different generative model (e.g., a large-language model) may be used to generate a representation of the identified devolved sequence of handwriting motions (e.g., an instructional demonstration and/or textual output instructing the user 302 how to perform the devolved sequence of handwriting motions). In some embodiments, the input model 170 is co-adapted to the user 302. That is, the input model 170 may be uniquely personalized to the user 302 based on preferences and/or tendencies of the user related to their performance of gestures (e.g., sequences of handwriting motions) to produce target inputs.

While the user 302 performs the sequence of handwriting motions 102, a user interface 104 (e.g., a gesture calibration user interface) is presented by an electronic device of the computing system 300*a* (e.g., a display 405 of the wrist-wearable device 400, a display 535A of the AR device 500). The user interface 104 presents information (e.g., real-time data obtained by the wrist-wearable device 400) while the user 302 attempts to perform sequences of handwriting motions. For example, the user interface includes a user interface element 106, which includes a representation of data being obtained by one or more biopotential-signal-sensing components of the wrist-wearable device 400, in accordance with some embodiments.

In conjunction with presenting the real-time data with the user interface element 106, the user interface 104 includes another user interface element 108, which includes a representation of data that would be produced within the user interface element 106 if the user 302 had performed a maximally efficient sequence of handwriting motions for the same one or more target inputs. In some embodiments, the maximally efficient sequence of handwriting motions shown by the user interface element 108 includes the same baseline sequence of handwriting motions that the user 302 attempted to perform via the sequence of handwriting motions 102. In some embodiments, the maximally efficient sequence of handwriting motions includes a devolved sequence of handwriting motions that has already been stored within the sequence library 172 (e.g., providing a reminder to the user that the devolved sequence of handwriting motions is available for obtaining the one or more target inputs). In accordance with some embodiments, the input model 170 is further configured to include a user co-adaptations module 180, which includes a set of co-adaptations that are specific to the user 302. For example, a particular co-adaptation may indicate that the user 302 is more likely to learn devolved sequences of handwriting motions that include particular types of handwriting motions.

Figure 1B:
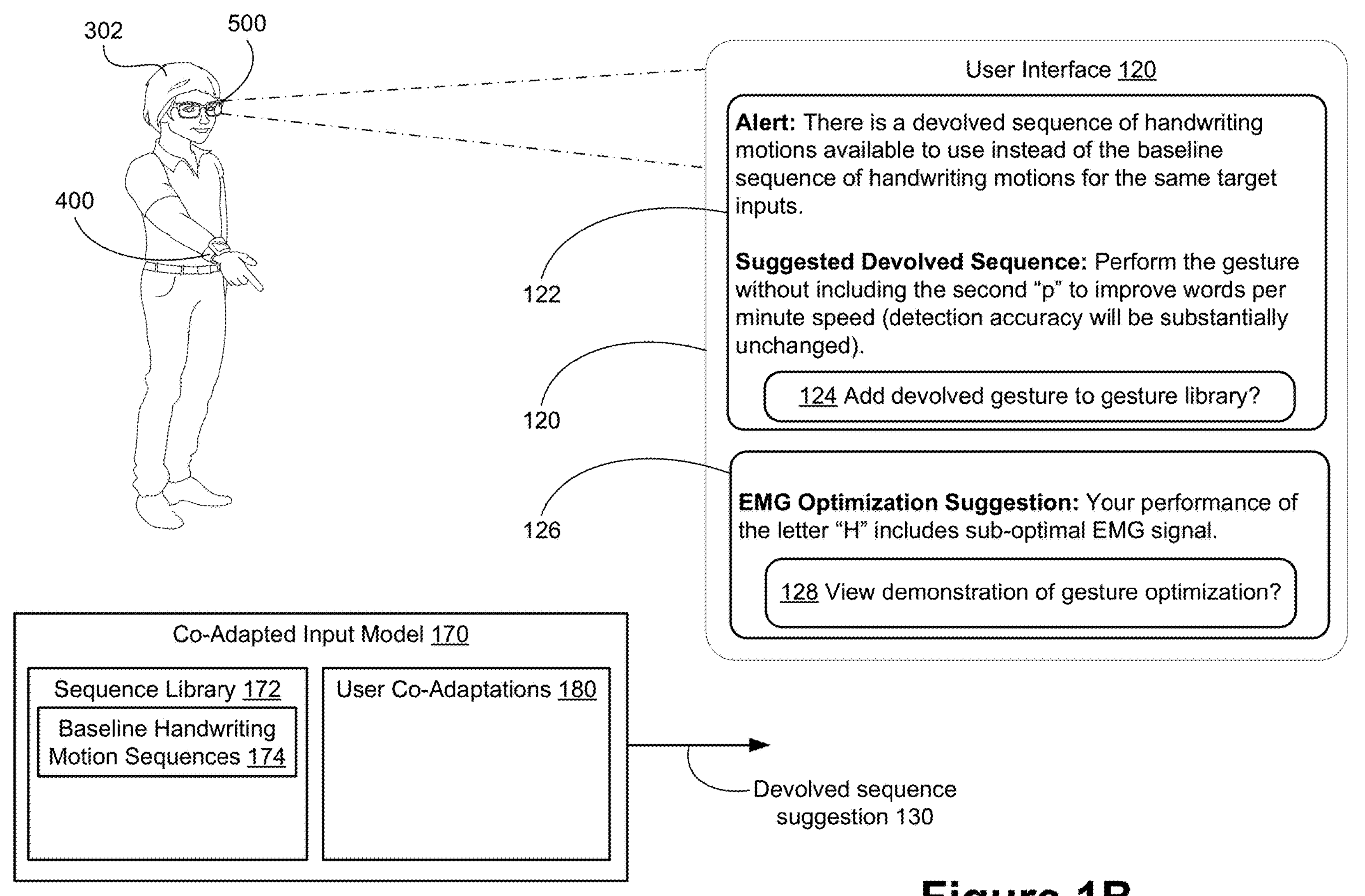

FIG. 1B shows the AR system 300*a* after the user 302 has finished performing the sequence of handwriting motions 102 shown in FIG. 1A. Another user interface 120 is being presented to the user 302, the user interface 120 including an alert that a devolved sequence of handwriting motions is available to be performed for the same one or more target inputs that the sequence of handwriting motions 102 corresponds to (e.g., a devolved sequence suggestion 130). The alert user interface element 122 includes an indication: "Alert: There is a devolved sequence of handwriting motions available to use instead of the baseline sequence of handwriting motions for the same target inputs." The alert user interface element 122 also includes information about how to perform the suggested devolved sequence of handwriting motions (e.g., "Suggested Devolved Sequence: Perform the gesture without including the second 'p' to improve words per minute speed (detection accuracy will be substantially unchanged)."). That is, in accordance with some embodiments, a devolved sequence of handwriting motions corresponding to one or more target inputs (e.g., the word "Happy") may include substantially the same set of handwriting motions for each of the individual letters, except that the devolved sequence of handwriting motions may omit a particular portion of the sequence of handwriting motions 102 (e.g., "dropping" a double letter).

The user interface 120 also includes a user interface element 126, which includes a suggestion for how the user 302 can improve performance of the sequence of handwriting motions 102 that the user 302 performed in FIG. 1A (stating: "EMG Optimization Suggestion: Your performance of the letter 'H' includes sub-optimal EMG signal."), in accordance with some embodiments. The user interface element 126 includes a selectable user interface element 128 that the user can select (e.g., using a directed tap input) to cause a demonstration of the sequence optimization. In some embodiments, the AR system 300*a* includes a neural network (e.g., a large-language model) that is configured to generate representations of particular suggestions provided by the input model 170. For example, after the input model identifies a devolved sequence suggestion 130 to suggest to the user 302, a large language model may receive information about the devolved sequence suggestion 130 and generate a visual demonstration (e.g., written instructions, a visual animation) of the devolved sequence suggestion 130 to present to the user 302.

Figure 1C:
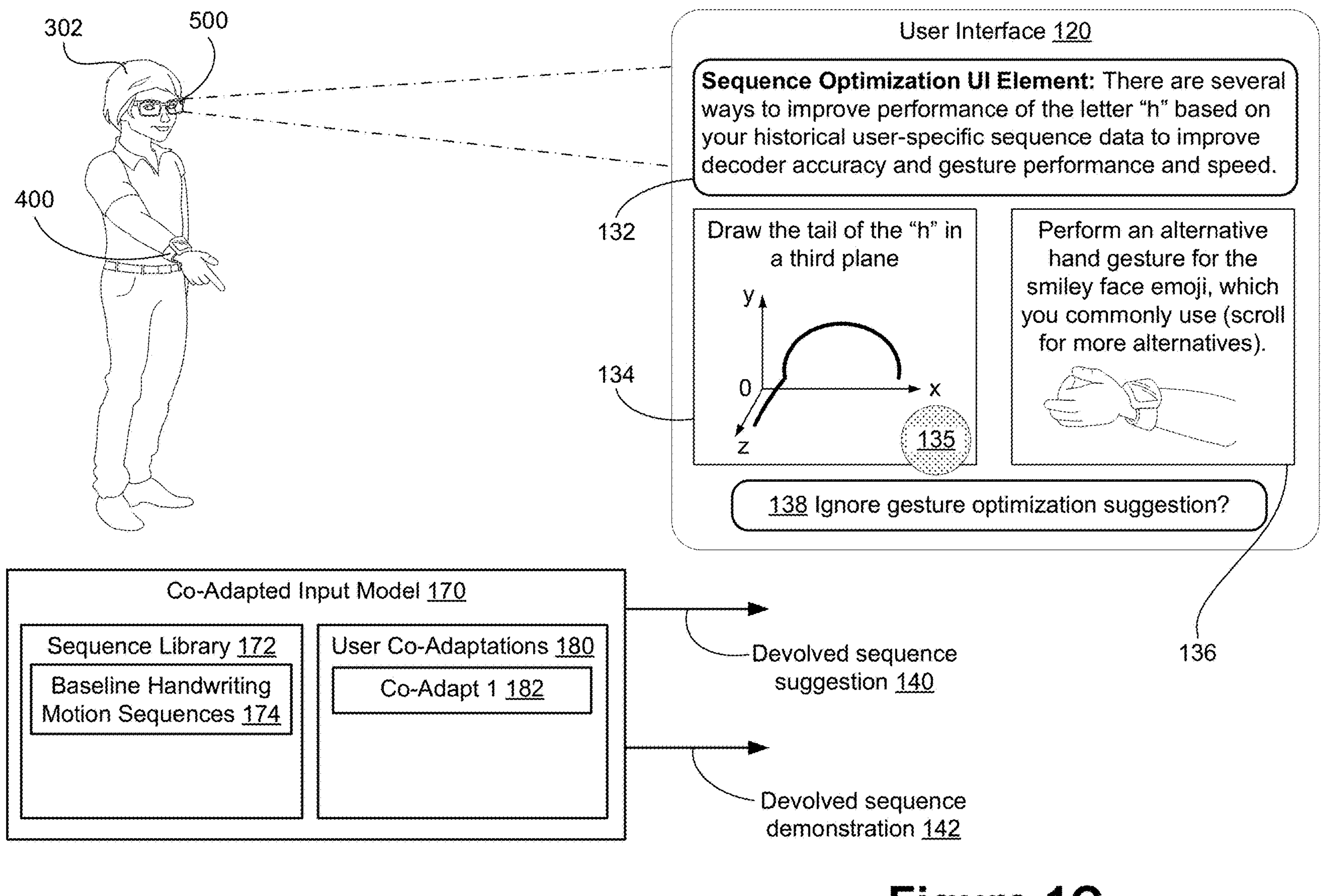

FIG. 1C shows the AR system 300*a* after the user 302 has input a selection not to add the devolved sequence suggestion 130 to the sequence library 172 of the input model 170. Based on the user input not to add the devolved sequence suggestion 130 to the sequence library 172, the user interface 120 is presenting new user interface elements corresponding to additional devolved sequence suggestions for the user 302 based on the sequence of handwriting motions 102 (an informational user interface element 132 stating: "Sequence Optimization UI Element: There are several ways to improve performance of the letter 'h' based on your historical user-specific sequence data to improve decoder accuracy and gesture performance and speed."). The user interface 120 includes demonstration user interface elements 134 and 136 that illustrate respective representations (e.g., demonstrations) for the other devolved sequence suggestions. In accordance with some embodiments, based on the user 302 forgoing adding the devolved sequence of handwriting motions suggested to the user as part of the devolved sequence suggestion 130, a particular co-adaptation 182 is added to the user co-adaptations module 180 of the co-adapted input model 170, which may be used to determine future devolved sequence suggestions to present to the user 302.

The demonstration user interface element 134 includes a visual depiction of a handwriting motion corresponding to one of the letters of the target inputs that the user intended to produce by performing the sequence of handwriting motions 102 shown in FIG. 1A (stating: "Draw the tail of the 'h' in a third plane," and including a visual depiction of the devolved sequence suggestion 140 that includes a three-dimensional plane). That is, in accordance with some embodiments, a devolved sequence of handwriting motions can include a portion of a sequence of handwriting motions that is performed in an additional dimensional plane that was not implicated by the original sequence of handwriting motions. The other demonstration user interface element 136 includes a visual depiction of a devolved sequence of handwriting motions that includes an EMG-detectable substitute gesture (e.g., a pinch gesture) that the user 302 can perform instead of the portion of the sequence of handwriting motions corresponding a particular target input (or set of target inputs). In some embodiments, EMG-detectable substitute gestures may be suggested for particular target inputs that the user 302 commonly performs.

In accordance with some embodiments, the input model 170 may include one or more user co-adaptations modules 180 based on actions performed by the user. That is the input model 170 may be or include a co-adaptive component that is configured to cause the input model 170 to co-adapt to the user 302 (e.g., based on user-specific aspects of handwriting motion data, user preferences related to learning new sequences of handwriting motions, and/or user-specific learning styles or learning rates for learning devolved sequences of handwriting motions). For example, the user co-adaptations module 180 may include a particular co-adaptation 182 based on the user foregoing to add the devolved sequence suggestion 130 to the sequence library 172. The user 302 is performing a gesture corresponding to a user selection 135 of the demonstration user interface element 134.

In some embodiments, multiple devolved sequences of handwriting motions may be suggested to the user 302 as part of a multipart devolved sequence suggestion, where each of the respective devolved sequence suggestions of the multipart devolved sequence suggestion correspond to different respective target inputs of the one or more target inputs. In some embodiments, one or more devolvement criteria are used to determine which of a plurality of candidate devolved sequences of handwriting motions to suggest to the user 302. For example, a particular devolvement criterion may be based on a reduction in the amount of exertion that the user is required to exert in performing the devolved sequence of handwriting motions.

Figure 1D:
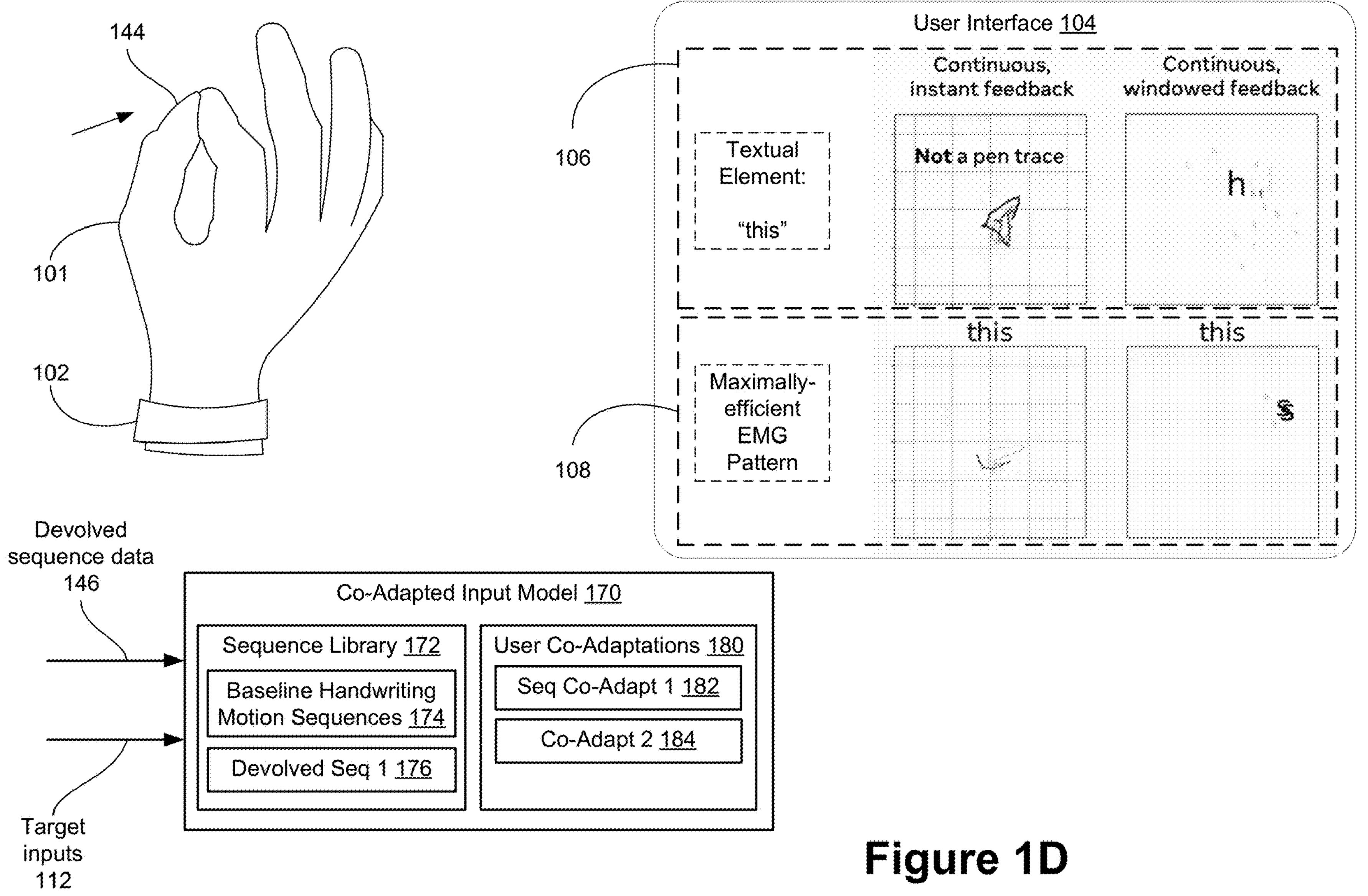

FIG. 1D shows the AR system 300*a* while the user 302 is performing the devolved sequence of handwriting motions corresponding to the devolved sequence information 176 selected by user selection 135 in FIG. 1C for the same set of target inputs (e.g., the phrase "Happy:)"). While the user 302 is performing the devolved sequence of handwriting motions 144, the user interface 104 presents similar content for the devolved sequence of handwriting motions 144 as it did for the sequence of handwriting motions 102 shown in FIG. 1A. Based on the user selection in FIG. 1C selecting the devolved sequence of handwriting motions, devolved sequence information 176 is added to the sequence library 172 for the user 302, and another particular co-adaptation 184 is added to the user co-adaptations module 180 based on the user 302 choosing to learn the devolved sequence of handwriting motions presented by the demonstration user interface element 134.

Figure 1E:
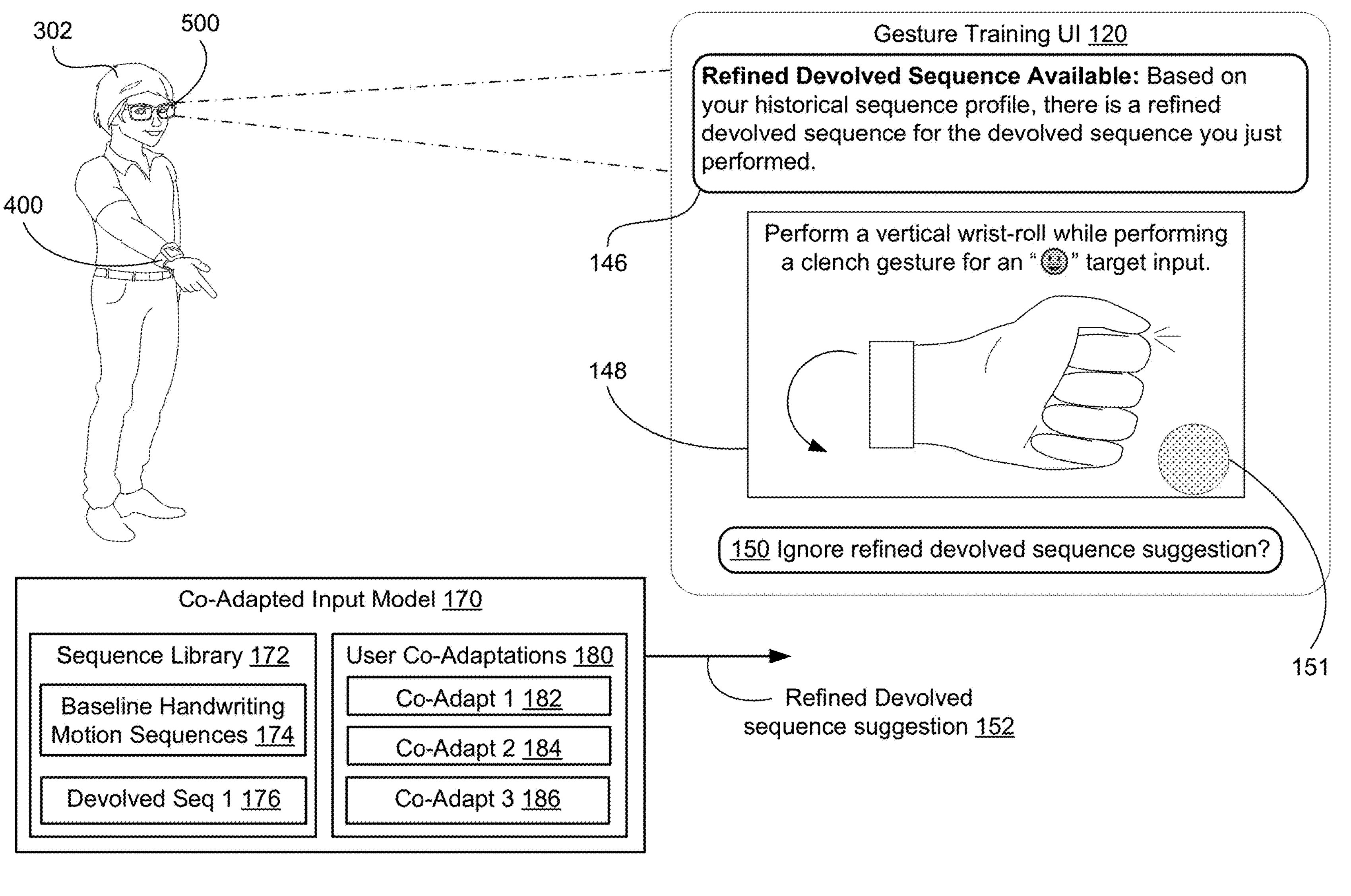

FIG. 1E shows AR system 300*a* after the user has performed the devolved sequence of handwriting motions 144 based on the devolved sequence suggestion selected in FIG. 1C. Based on the performance of the devolved sequence of handwriting motions 144 by the user 302 in FIG. 1D, the user interface 120 is presenting information to the user about a refined devolved sequence of handwriting motions based on the performance of the devolved sequence of handwriting motions 144 (an informational user interface element 146, stating: "Refined Devolved Sequence Available: Based on your historical sequence profile, there is a refined devolved sequence for the devolved sequence you just performed."). A demonstration user interface element 148 is presenting a visual demonstration of a refined devolved sequence suggestion 152 that is suggested to the user 302 based on the performance of the devolved sequence of handwriting motions 144. Based on a user selection 151 of the refined devolved sequence suggestion 152 that is presented by the user interface element 148, another particular co-adaptation 186 is added to the user co-adaptations module 180 of the input model 170 that is associated with the user 302.

Figure 1F:
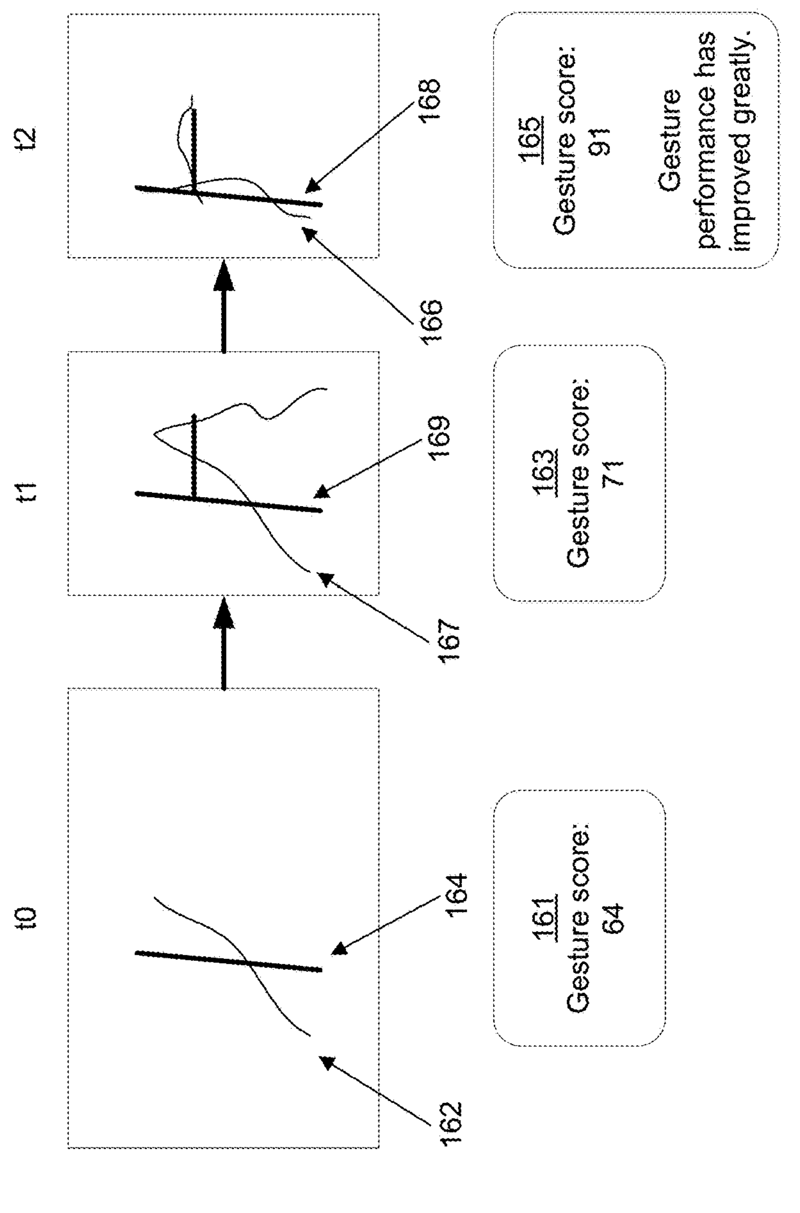

FIG. 1F shows the AR system 300*a* while the user 302 performs various iterations of a sequence of handwriting motion and is receiving feedback (e.g., instantaneous or near-instantaneous feedback) about the performance of a sequence of handwriting motions 160 that the user 302 is performing over a span of time (e.g., the span of time denoted by t0, t1, and t2). For example, at time t0 the user 302 is performing a first iteration of the sequence of handwriting motions. A first feedback element 162 is a representation of a respective handwriting motion of the sequence of handwriting motions 160 that the user 302 is performing at time to, and a second feedback element 164 is a representation of an optimized handwriting motion corresponding to the same handwriting motion that the user 302 is attempting to perform at the time t0. A user interface element 161 provides a gesture score to the user 302 (e.g., a gesture score of 64), indicating a relative accuracy of performance of that portion of the sequence of handwriting motions 160 by the user 302.

At a second time, t1, based on the user 302 performing another sequence of handwriting motions 160 (e.g., after a notification provided to the user 302 from the AR device 500 requesting the user 302 to perform gesture optimization training, and/or as part of a continuation of the sequence of handwriting motions that user 302 performed at time t0), another user interface element is displayed that includes another first feedback element 167 of a respective handwriting motion of the second sequence of handwriting motions performed by the user 302, and another second feedback element 169 is another representation of the optimized handwriting motion for performing the set of target inputs that the user 302 is attempting to produce using the sequence of handwriting motions 160. Another user interface element 163 provides a gesture score to the user 302 (e.g., a gesture score of 71), indicating a relative accuracy of the performance of the sequence of handwriting motions by the user 302.

At a third time, t2, based on the user 302 performing yet another sequence of handwriting motions (e.g., as part of a training sequence for co-adapting the user 302 to the input model 170), a third set of first and second feedback elements 166 and 168, respectively, is presented within a user interface, and another user interface element 165 is presented that includes an indication that the user 302 performed the sequence of handwriting motions corresponding to time t2 with a substantially higher level of accuracy, including a gesture score of 91 and a textual element within the user interface element 165 stating, "Gesture performance has improved greatly."

Example Embodiments

FIGS. 2A to 2C illustrate various embodiments of techniques related to devolving sequences of handwriting motions performed by users of computing systems that include components described herein. In particular: (i) FIG. 2A illustrates an example method 200 of identifying devolved sequences of handwriting motions based on users' attempts to perform sequences of handwriting motions corresponding to target inputs; (ii) FIG. 2B illustrates another example method 240 of presenting representations of identified sequences of handwriting motions to a user by applying the sequences of handwriting motions to a generative model that is co-adapted to a user of the computing system; and (iii) FIG. 2C illustrates yet another example method 280 of presenting user interfaces to users that include representations of aspects of the users' performances of sequences of handwriting motions.

For explanatory purposes, the various blocks of the processes 200, 240, and 280 are described herein with reference to FIGS. 1A to 1F, and the associated components and/or processes described herein with respect to FIGS. 3A to 6B. For example, operations (e.g., steps) of the methods 200, 240, and/or 280 can be performed by one or more processors (e.g., processor 479 and/or a microcontroller unit) of the system 300*a*. Some of the operations of the example methods shown in FIGS. 2A to 2C correspond to instructions stored in a computer memory or computer-readable storage medium (e.g., memory 450 of the computer system 430 associated with the wearable band 410).

Operations of the example methods shown in FIGS. 2A to 2C can be performed by a single device alone or in conjunction with one or more processors and/or hardware components of another communicatively coupled device (e.g., the wrist-wearable device 400 in conjunction with the head-wearable device 500) and/or instructions stored in memory or computer-readable media of the other device communicatively coupled to the system. In some embodiments, the various operations of any of the methods shown in FIGS. 2A to 2C are interchangeable and/or optional, and respective operations of the methods can be performed by any of the devices and/or constituent components of the components described herein. For convenience, the method operations will be described below as being performed by particular components or devices but should not be construed as limiting the performance of the operation to the particular device in all embodiments.

The one or more blocks of methods 200, 240, and 280 may be implemented, for example, by one or more computing devices of the AR system 300*a* including, for example, the wrist-wearable device 400 and/or the AR device 500. In some embodiments, two or more electronic devices within a respective computing system can operate in tandem (e.g., as part of a device constellation) to perform the operations described herein. For example, respective sensors of the wrist-wearable device 400 and/or the AR device 500 may collect data related to a user's performance of a sequence of handwriting motions (e.g., a baseline sequence of handwriting motions, a devolved sequence of handwriting motions), and the respective sensor data can be provided to an intermediary processing device (e.g., the handheld intermediary processing device (HIPD) 600, a remote server (e.g., a respective server of the one or more servers 330)).

Concept 1. Devolving Handwriting Through Co-Adaptation of a Gesture-Detection Model (A1) FIG. 2A shows a flow chart of the example method 200 of identifying devolved sequences of handwriting motions to suggest to a user based on detected attempts to perform sequences of handwriting motions (e.g., baseline handwriting motions for one or more characters of alphanumeric text).

As part of the AR system 300*a* performing the method 200, the wrist-wearable device 400 obtains (202), via one or more sensors of the wrist-wearable device 400 (e.g., EMG sensors 465), data corresponding to a user attempting to perform a sequence of handwriting motions associated with one or more target inputs (e.g., alphanumeric text and/or special characters, such as emojis) while wearing the wrist-wearable device 400. For example, in FIG. 1A, data may be obtained by one or more EMG sensors 465 of the wrist-wearable device 400. In some embodiments, the data corresponding to the user 302 attempting to perform the sequence of handwriting motions is obtained, at least in part, by one or more imaging sensors (e.g., external-facing cameras, such as the left camera 539A and/or the right camera 539B) of the AR device 500. In some embodiments, first data collected by one or more sensors of a first device (e.g., the wrist-wearable device 400), and second data collected by one or more sensors of a second device (e.g., the AR system 500) are provided to the same input model 170 (e.g., as part of a sensor fusion operation) in order to increase the confidence of detection of the sequence of handwriting motions.

Performance of the method 200 includes identifying (204), based on at least (i) the data corresponding to the sequence of handwriting motions and (ii) the one or more target inputs, a devolved sequence of handwriting motions to suggest to the user for inputting a respective target input of the one or more target inputs (e.g., the devolved sequence suggestion 130 shown in FIG. 1B). The devolved sequence of handwriting motions is different from the sequence of handwriting motions performed by the user and includes fewer handwriting motions (e.g., less muscular activations by the user's hand or forearm) as compared to the sequence of handwriting motions (206). In some embodiments, one or more portions of the devolved sequence of handwriting motions are the same as the sequence of handwriting motions that the user 302 originally performed. For example, the devolved sequence suggestion 130 shown in FIG. 1B includes all of the same handwriting motions for the individual letters and characters but involves dropping the second "p" in the word "happy." In contrast, some devolved sequences of handwriting motions may include handwriting motions that do not correspond to any baseline sequences of handwriting motions (e.g., a "thumbs-up" hand gesture may be a devolved sequence of handwriting motions for the word "yes").

Finally, the AR system 300*a* causes (208) presentation (e.g., using the display 535A of the AR system 500) of a representation of the devolved sequence of handwriting motions. For example, as described in more detail with respect to the method 240 discussed with respect to FIG. 2B, data related to the devolved sequence of handwriting motions may be provided to a generative model (e.g., a large-language model (LLM)), and the generative model may generate an output that includes a demonstration that includes one or more textual, visual, audial, and/or haptic components related to representing the devolved sequence of handwriting motions.

(A2) In some embodiments of A1, one or more sensors of the wearable device (e.g., the wrist-wearable device 400) obtain other data corresponding to the user 302 attempting to perform the devolved sequence of handwriting motions associated with the respective target input of the one or more target inputs. For example, in FIG. 1D, sensors of the wrist-wearable device 400 are used to detect that the user 302 is performing the devolved sequence of handwriting motions 144. The AR system 300*a* identifies, based on at least (i) the other data corresponding to the user attempting to perform the devolved sequence of handwriting motions and (ii) the respective target input of the one or more target inputs, a refined devolved sequence of handwriting motions to suggest to the user for inputting the respective target input (e.g., the refined devolved sequence suggestion 152). The refined devolved sequence of handwriting motions is a different sequence as compared to the devolved sequence of handwriting motions identified based on the sequence of handwriting motions and includes fewer handwriting motions than the sequence of handwriting motions (e.g., the sequence of handwriting motions 102 in FIG. 1A). And the AR system 300*a* causes presentation, via the computing system, of a representation of the refined devolved sequence of handwriting motions.

That is, the systems, devices, and methods described herein provide for dynamic fine-tuning of devolved sequences of handwriting motions and baseline sequences of handwriting motions that are continuously co-adapted based on the user's usage and/or efficiency in performing particular sequences of handwriting motions and/or based on the user's historical rate of learning new devolved sequences of handwriting motions. For example, a particular set of devolved sequences of handwriting motions may be based on an objective of reducing sequences of handwriting motions to singular strokes at particular angles relative to the user, and each refinement and/or devolvement of the sequence of handwriting motions may be based on achieving the objective of providing a library of single-stroke gestures to the user (e.g., to be stored in the sequence library 172).

(A3) In some embodiments of A2, the devolved sequence of handwriting motions is selected from a predefined set of devolved sequences corresponding to particular target inputs, and the refined devolved sequence is identified via a self-supervised model that is co-adapted based on sequences of handwriting motions performed by the user (e.g., stored as user co-adaptation within the user co-adaptations module 180 shown in FIGS. 1A to 1E). In other words, the AR system 300*a* can identify suggestions of devolved sequences based on a combination of (i) a pre-configured library and/or supervised learning techniques for suggesting devolved sequences (e.g., based on pre-defined devolvement objectives) and (ii) an unsupervised learning technique that suggests devolved sequences based on, for example, real-time criteria about the user 302's performance of respective sequences of handwriting motions and/or other devolved sequences of handwriting motions.

(A4) In some embodiments of any one of A1 to A3, the AR system 300*a* identifies another devolved sequence of handwriting motions to suggest to the user 302 for inputting a different respective target input of the or more target inputs (e.g., in conjunction with identifying the devolved sequence of handwriting motions). In some embodiments, the devolved sequence of handwriting motions and the other devolved sequence of handwriting motions individually, and collectively, include fewer handwriting motions as compared to the sequence of handwriting motions. For example, in identifying a devolved sequence of handwriting motions to suggest to the user 302 based on the user 302 performing a baseline sequence of handwriting motions for each of the individual letters in the word "happy," the AR system 300*a* may provide a first devolved sequence of handwriting motions that includes a different sequence of handwriting motions for the letter "h," and a devolved sequence for performing the double-p character sequence (e.g., suggesting a "dropped" letter).

(A5) In some embodiments of A4, the devolved sequence of handwriting motions and the other devolved sequence of handwriting motions together form a multipart set of devolved sequences corresponding to the one or more target inputs, and the multipart set of devolved sequences is selected based on comparing the multipart set of devolved sequences of handwriting motions to the devolved sequence of handwriting motions based on one or more devolvement criteria related to the respective sequences. That is, the systems, devices, and methods described herein can be used to determine that a combination of different devolved sequences would be most effective, intuitive, and/or efficient for suggesting to the user, instead of a single devolved sequence of handwriting motions for performing all of the one or more target inputs.

(A6) In some embodiments, the one or more devolvement criteria include respective criteria related to minimizing a legibility constraint for identifying the one or more target inputs based on the devolved sequence of handwriting motions (e.g., distinguishing or otherwise disambiguating the one or more intended target inputs based on the sequence of handwriting motions). In some embodiments, the legibility constraint is based on a discriminability of the sequence of handwriting motions (e.g., an estimated accuracy of distinguishing the one or more target inputs from other target inputs that include similar handwriting motions). In some embodiments, the one or more devolvement criteria include respective criteria related to reducing an amount of exertion required for performing the devolved sequence of handwriting motions (e.g., motor activity, an amount of arm movements, and/or a cumulative difficulty of performing the set of handwriting motions). In some embodiments, the one or more devolvement criteria include respective criteria related to increasing an estimated speed of producing the one or more target inputs (e.g., words per minute).

In some embodiments, determining which of a plurality of devolved sequences to provide to the user (and/or whether to provide any devolved sequences of handwriting motions to the user) includes comparing a respective value of one particular criterion against a different value of the same or a different particular criterion (e.g., an amount of reduction of exertion for performing the devolved sequence of handwriting motions). For example, the devolved sequence suggestion 130 may have been presented to the user 302 in FIG. 1B instead of the other devolved sequence suggestions 140 and 142 shown in FIG. 1C based on comparing the respective devolved sequences of handwriting motions corresponding to the devolved sequence suggestions 130, 140, and 142 based on relative satisfaction of respective devolvement criteria.

(A7) In some embodiments of A6, determining whether respective criteria related to the legibility constraint are satisfied includes (i) comparing a historical accuracy of an input-detection model for detecting the sequence of handwriting motions to a predicted accuracy of the input-detection model for detecting respective devolved sequences of handwriting motions and (ii) determining whether the respective devolved sequences of handwriting motions result in increasing detection accuracy for the one or more target inputs by more than a threshold error reduction rate (e.g., a five percent reduction in the rate of false positives detected by the input-detection model).

In some embodiments, the input-detection model is configured to receive feedback indicating that a respective set of one or more handwriting motions performed by the user was incorrectly identified as corresponding to a different textual element (e.g., a textual element that includes commonly confusing characters (e.g., h vs. n, b vs. p)). In some implementations, the feedback is provided by the user (e.g., providing an indication that the generated input is different than the target input intended by the user). In some implementations, the devolved sequence of handwriting motions is identified based on a determination that a portion of the sequence that corresponds to a respective target input of the one or more target inputs has been mistakenly identified by the input-detection model at or above a threshold error rate.

(A8) In some embodiments of A6 or A7, determining whether respective criteria related to the speed of producing the one or more target inputs are satisfied includes identifying one or more portions of the sequence of handwriting motions that the user performed with ballistic movement. As described herein, ballistic movement is defined as one or more muscular activations that exhibit maximum velocities and accelerations over a brief period of time (e.g., exhibiting high firing rates, high force production, and very brief contraction times).

(A9) In some embodiments of any one of A1 to A8, in accordance with determining that removing one or more handwriting motions of the sequence of handwriting motions would reduce an accuracy of detecting target inputs by less than a threshold error rate (e.g., a predicted accuracy of the input-detection model would be reduced by less than five percent, eight percent, ten percent, etc.), the AR system 300*a* identifying the devolved sequence of handwriting motions includes determining the devolved sequence of handwriting motions by removing the one or more handwriting motions from the sequence of handwriting motions that was performed by the user. For example, the system may determine that an input-detection model (e.g., a machine-learning model) for detecting which target inputs a user is intending to perform based on a particular sequence of handwriting motions would be only 0.5% less accurate at correctly inferring which target inputs the user is intending to perform without the user performing a portion of the sequence corresponding to a particular character or portion of the particular character. Based on determining that the difference in accuracy is less than a threshold error rate for suggesting the devolved sequence of handwriting motions, the system may present the devolved sequence of handwriting motions.

In some embodiments, the determination to present the devolved sequence to the user is made in conjunction with a separate determination that the devolved sequence of handwriting motions satisfies one or more devolvement criteria (e.g., increases speed of performing the one or more target inputs that is sufficient to offset any decreased efficiency caused by the reduced accuracy).

(A10) In some embodiments of any one of A1 to A9, the AR system 300*a* identifies, based on the data corresponding to the sequence of handwriting motions from the one or more sensors of the wearable device (e.g., the wrist-wearable device 400 or the AR device 500), a plurality of devolved sequences of handwriting motions to suggest to the user for inputting the respective target input, including the devolved sequence of handwriting motions (e.g., based on modifications (e.g., co-adaptions) applied to a gesture-recommendation module in accordance with the user performing respective previous sequences of handwriting motions). And the AR system **300*a* causes presentation (e.g., at the AR device 500**) of a plurality of representations, each of the representations corresponding to one of the plurality of devolved sequences of handwriting motions. In some embodiments, each of the plurality of devolved sequences of handwriting motions is identified for suggesting to the user based on a determination that each of the respective devolved sequences satisfies one or more devolvement criteria.

(A11) In some embodiments of A10, after presenting the devolved sequence of handwriting motions, the AR system **300*a* detects a user input, the user input corresponding to an operation for presenting alternative devolved sequences. And, responsive to the user input, the AR system 300*a* presents the plurality of representations, including presenting at least one of the plurality of representations corresponding to a respective devolved sequence of the plurality of devolved sequences that is different than the devolved sequence of handwriting motions. For example, while the demonstration user interface elements 134 and 136 representing selectable options are being presented to the user 302 in FIG. 1C, a selection of the demonstration user interface element 136 may cause additional devolved sequences corresponding to the same target input and/or a different target input of the one or more target inputs that the user 302 performed sequences of handwriting motions corresponding to motions in FIG. 1**A. In some embodiments, the user input to present alternative devolved sequences is provided as an indication to a gesture-suggestion model (e.g., indicating that the user did not select the representation of the devolved sequence of handwriting motions).

(A12) In some embodiments of any one of A1 to A11, based on the data corresponding to the sequence of handwriting motions, the AR system **300*a* applies a co-adaptation to an input-detection model used to identify the devolved sequence of handwriting motions, wherein the co-adaptation is based on user-specific aspects of performance of one or more respective handwriting motions of the sequence of handwriting motions. And the AR system 300*a*** uses the co-adaptation to the input-detection model to detect a different sequence of handwriting motions corresponding to one or more different target inputs. In other words, a co-adaptation applied to the input-detection model based on one particular sequence of handwriting motions may be used during detection of a different sequence of handwriting motions.

For example, the co-adapted large-language model may determine that there is a specific set of characters that the input-detection model persistently detects with a lower accuracy (and/or that the user performs slower compared to other users), and the co-adapted large language model may suggest one or more devolved hand sequences to reduce inaccuracy and or increase the user's speed of text generation based on the user-specific aspects of the historical handwriting motion sequence data related to those characters.

(A13) In some embodiments of any one of A1 to A12, after identifying the devolved sequence of handwriting motions, the AR system **300*a* provides information about the devolved sequence of handwriting motions to a generative model (e.g., a large-language model, or another artificial intelligence model that generates a particular medium of content). In some embodiments, the AR system 300*a* provides the information about the devolved sequence of handwriting motions in conjunction with a conditional prompt that includes instructions for the large-language model to generate a demonstration. And the AR system 300*a*** receives, from the generative model, the representation of the devolved sequence of handwriting motions (e.g., including visual and/or non-visual demonstration components).

In some embodiments, the representation can be a demonstration to the user as to how the devolved sequence of handwriting motions should be performed, and this demonstration can be generated by a generative (artificial-intelligence) model, such as a LLM. In some embodiments, the demonstration is presented at the wearable electronic device (e.g., a wrist-wearable device). In some implementations, the demonstration is presented at a different wearable electronic device (e.g., a head-wearable device). By leveraging the generative model, the techniques described herein provide technical improvements by presenting instructions to a user by using a generative model to generate personalized instructions based on (e.g., unsupervised) learning by the model. Further, the devolved sequences of handwriting motions that are suggested to the user may include sequences of handwriting motions that are not predefined within any sequence library or other data storage associated with the handwriting motions of the user's available handwriting motions. (A14) In some embodiments of any one of A1 to A13, the one or more sensors in operable communication with the computing system include a biopotential-signal-sensing component, and the biopotential-signal-sensing component is configured to detect hand motions performed by the user (e.g., including sequences of handwriting motions). For example, the wrist-wearable device 102 shown in FIGS. 1A to 1F may be detecting the sequences of hand motions performed by the user 302, at least in part, based on data from one or more EMG sensors 465 of the wrist-wearable device 400.

(A15) In some embodiments of A14, the devolved sequence of handwriting motions includes a stationary action (e.g., a hand gesture that includes one or more neuromuscular activations but does not include any handwriting motions) detected via data from the biopotential-signal-sensing component (e.g., a pinch or flexure of a finger of the user) to replace one or more handwriting motions of the sequence of handwriting motions associated with the one or more target inputs (e.g., the trailing vertical line of the letter "h"). In some implementations, the neuromuscular proxy can be used to cause a particular letter to be capitalized or as a replacement for a particular common trigram (e.g., "the").

(A16) In some embodiments of any one of A1 to A15, the sequence of handwriting motions corresponding to the one or more target inputs consists of a two-dimensional movement profile (e.g., within 15 to 30 degrees of a particular defined two-dimensional plane where the user is performing the motion). The devolved sequence of handwriting motions includes a handwriting motion in a third-dimensional plane distinct from respective planes defining the substantially two-dimensional movement profile. In some embodiments, the third-dimensional plane is substantially orthogonal to a plane defined by the two-dimensional movement profile (e.g., the three-dimensional movement profile shown within the demonstration user interface element 134 in FIG. 1C). In some embodiments, attempts to perform the devolved sequence of handwriting motions that include hand movements within thirty degrees of the third-dimensional plane. In some embodiments, the portion of the devolved sequence of handwriting motions that includes movement in the third-dimensional plane is estimated to increase the discriminability of the one or more target inputs. For example, suggesting a motion for the tail of "h" in the third-dimensional plane may help to distinguish from a sequence of handwriting motions that includes "n" by increasing the discriminability of the distinct aspect of the sequence of handwriting motions for the target input.

(A17) In some embodiments of any one of A1 to A16, the AR system 300*a* causes storage, in a vector space, of a plurality of vector representations for respective target inputs, wherein respective vector representations of the plurality of vector representations include data profiles for sequences of handwriting movements associated with the respective target inputs. And, responsive to obtaining the data corresponding to the sequence of handwriting motions, the AR system 300*a* causes generation of a new vector representation of the sequence of handwriting motions. The vector representation of the data corresponding to the sequence of handwriting motions is embedded into the vector space. And based on a relationship between the new vector representation and the respective vector representations of the plurality of vector representations, a corresponding vector representation is caused to be identified (e.g., by the AR system 300*a* and/or a remote server in operable communication with the AR system 300*a*).

(A18) In some embodiments of any one of A1 to A17, while the user is performing the sequence of handwriting motions, the AR system 300*a* presents a first dynamic user interface element including real-time data that is based on the data from the one or more sensors (e.g., a two-dimensional or three-dimensional visual representation of the motions detected based on biopotential-signal data). And the AR system 300*a* presents (e.g., via the AR device 500) a second dynamic user interface element including a corresponding visualization of a co-adapted performance of the sequence of handwriting motions corresponding to the one or more target inputs. For example, FIGS. 1A and 1D illustrate examples where the user interface 104 is presenting a user interface element 106 that includes a visual depiction of neuromuscular activations of a hand of the user 302 while the user 302 is performing various sequences of handwriting motions (e.g., the sequence of handwriting motions 102). And the user interface 104 also includes the user interface element 108 that includes a visual depiction of prophetic neuromuscular activations that would be detected if the user 302 optimized their performance of the respective sequences of handwriting motions 102 and 144. In some embodiments, devolved sequences of handwriting motions are suggested to the user 302 based on the user performing one or more portions of sequences of handwriting motions having an optimization score below a particular threshold. That is, the devolved sequences of handwriting motions can be identified based on respective sequences of handwriting motions that the user 302 has performed poorly.

Concept 2. Using a Generative Model (e.g., a Large-Language Model) to Produce Instructions for Performing Devolved Sequences of Handwriting Motions (B1) FIG. 2B shows a flow chart of the example method 240 of presenting representations of identified sequences of handwriting motions to a user by applying the sequences of handwriting motions to a generative model that is co-adapted to a user of the computing system.

As part of performing the method 240, after identifying a devolved sequence of handwriting motions based on data obtained via one or more sensors, the data corresponding to a sequence of handwriting motions performed by a user associated with one or more target inputs, the AR system 300*a* provides (242) the information about the devolved sequence of handwriting motions to a generative model. In accordance with some embodiments, the AR system 300*a* receives (244), from the generative model, the representation of the devolved sequence of handwriting motions. For example, the input model 170 may provide the devolved sequence suggestion 130 shown in FIG. 1B and/or the devolved sequence suggestions 140 and 142 to a generative model.

After receiving the representation of the devolved sequence of handwriting motions from the generative model, the AR system 300*a* causes (246) presentation, via the computing system, of the representation of the devolved sequence of handwriting motions received from the generative model. For example, the demonstration user interface elements 134 and 136, shown in FIG. 1C, may be generated using a generative model (e.g., a generative model that includes a large language model).

(B2) In some embodiments of B1, the generative model is a large-language model, and the demonstration includes a description of an aspect of the devolved sequence of handwriting motions that is presented to the user (248) (e.g., the textual element within the demonstration user interface element 134 stating, "Draw the tail of the 'h' in a third plane").

(B3) In some embodiments of B1, the generative model is configured to generate visual images, and the demonstration includes a non-textual visual depiction of an aspect of the devolved sequence of handwriting motions (250) (e.g., the visual element within the demonstration user interface element 134 that includes the three-dimensional plane and the orientations of the respective sequences of handwriting motions within the three-dimensional plane).

(B4) In some embodiments of any one of B1 to B3, the AR system 300*a* receives (252) an input from the user requesting a modification to the representation of the devolved sequence of handwriting motions. After the AR system 300*a* receives the input from the user, the AR system 300*a* provides (254), to the generative model, a prompt based on the input from the user requesting the modification to the representation of the devolved sequence of handwriting motions. The AR system 300*a* then receives (256), from the generative model, a different representation of the same devolved sequence of handwriting motions. And the AR system 300*a* causes (258) presentation, via the computing system, of the different representation of the devolved sequence of handwriting motions received from the generative model.

Concept 3. Using a Co-Adapted Artificial Intelligence Model to Teach the User of a Computing System how to Optimize Performance of Sequences of Handwriting Motions (C1) FIG. 2C shows a flow chart of the example method 280 of presenting user interfaces to users that include representations of aspects of the users' performances of sequences of handwriting motions.

The operations of the method 280 are performed at a computing system (e.g., AR system 300*a*) that includes an artificial-reality headset configured to present artificial-reality content to a user while the computing system is detecting the user attempting to perform sequences of handwriting motions (282).

In accordance with embodiments of the example method 280, the AR system 300*a* obtains (284), via one or more sensors of a wearable device of the computing system, data corresponding to a user attempting to perform a particular sequence of handwriting motions associated with the one or more target inputs while wearing the wearable electronic device of the computing system.

And in accordance with embodiments of the example method 280, while the user 302 is performing the sequence of handwriting motions, the AR system 300*a* presents a first user interface element corresponding to an aspect of the performance of the sequence of handwriting motions, where the aspect is based on data obtained by the one or more sensors of the wearable electronic device, and presents a second user interface element that includes a visual representation of an optimal performance of the sequence of handwriting motions (286).

(C2) In some embodiments C1, after the user has completed performance of the sequence of handwriting motions, the AR system 300*a* (288) presents another user interface element indicating a relative accuracy between the aspect of the performance of the sequence of handwriting motions and the optimal performance of the sequence of handwriting motions.

(C3) In some embodiments of C1 or C2, based on detecting another attempt by the user to perform the same sequence of handwriting motions (290), the AR system provides an indication to the user 302 whether the other attempt to perform the same sequence of handwriting motions is more accurate based on the optimal performance of the sequence of handwriting motions.

The devices described above are further detailed below, including systems, wrist-wearable devices, headset devices, and smart textile-based garments. Specific operations described above may occur as a result of specific hardware; such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 400, a head-wearable device, an HIPD 600, a smart textile-based garment 700, or other computer system). There are several distinct types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to manage graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., time-of-flight sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to manage graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems 3A-3D-2

Figure 3A:
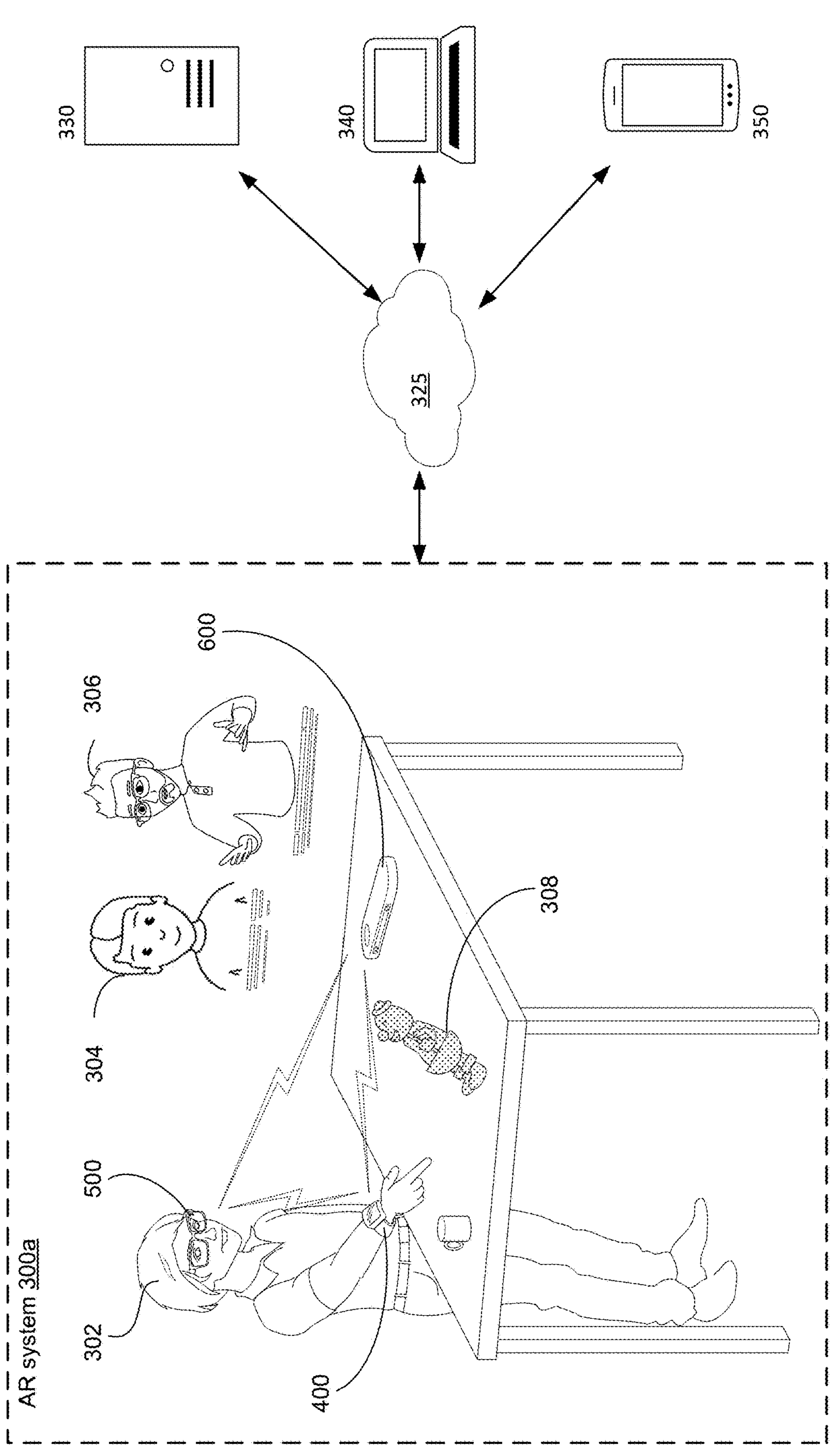
FIGS. 3A, 3B, 3C-1, 3C-2, 3D-1, and 3D-2 illustrate example artificial-reality systems, in accordance with some embodiments.
Figure 3B:
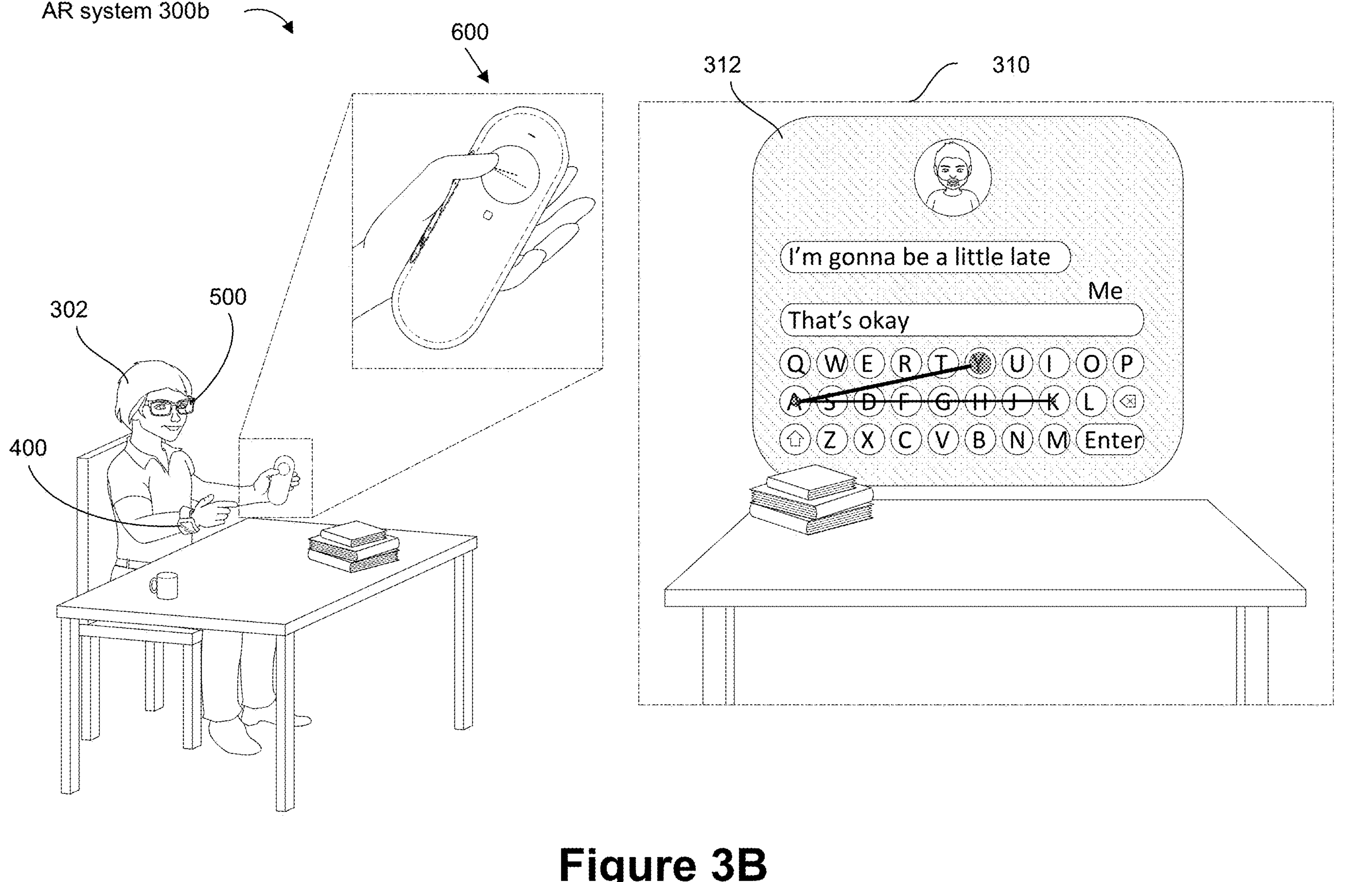
Figures 1, 3C:
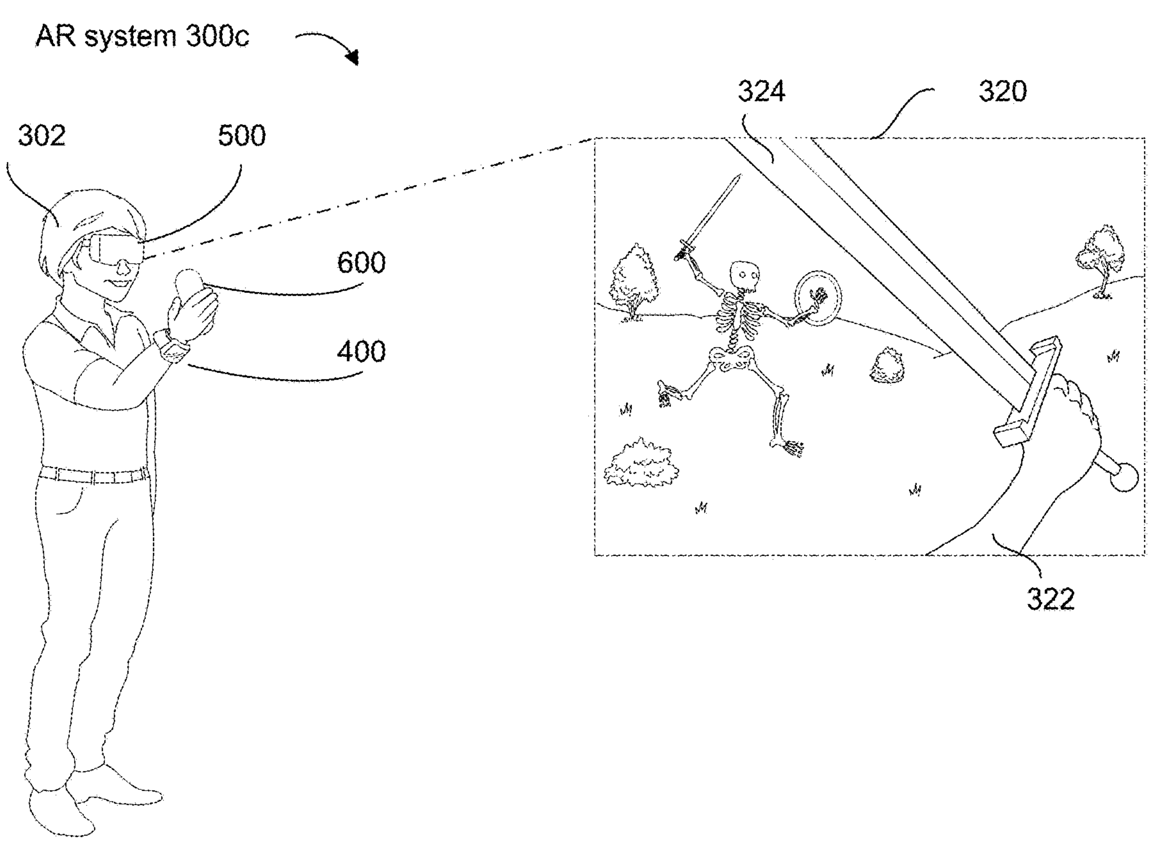
Figures 2, 3C:
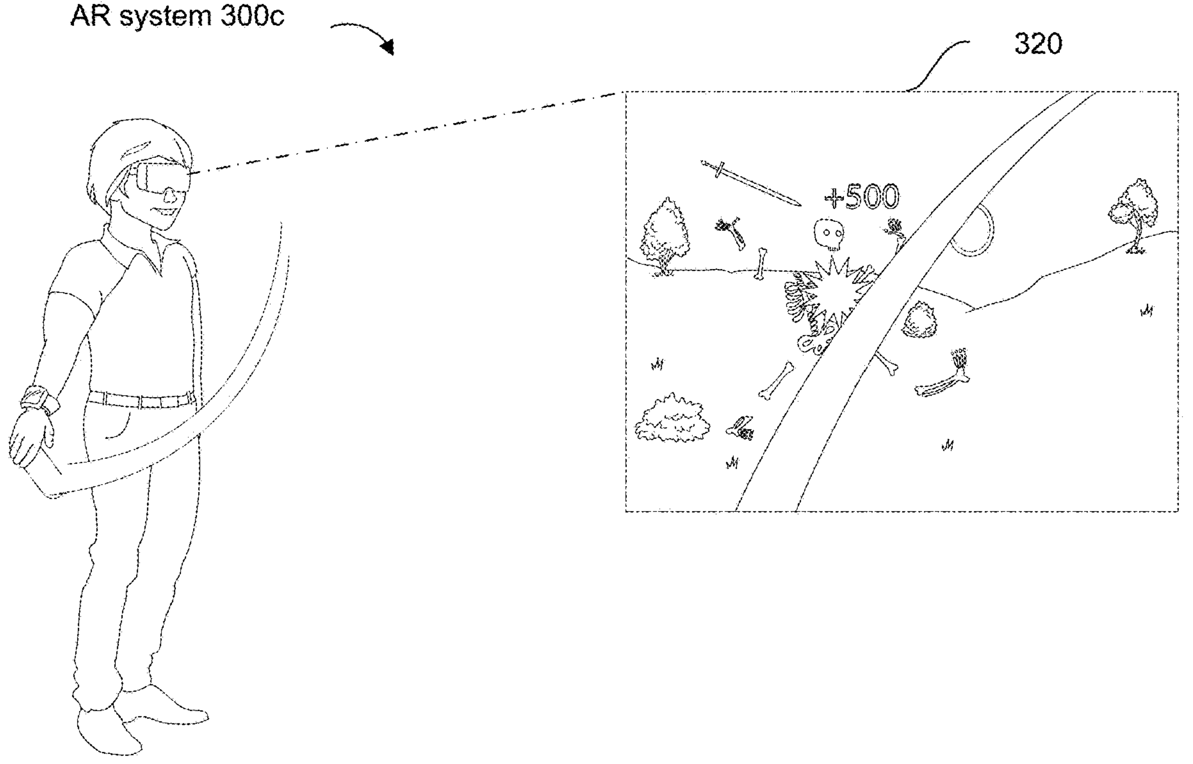
Figures 1, 3D:
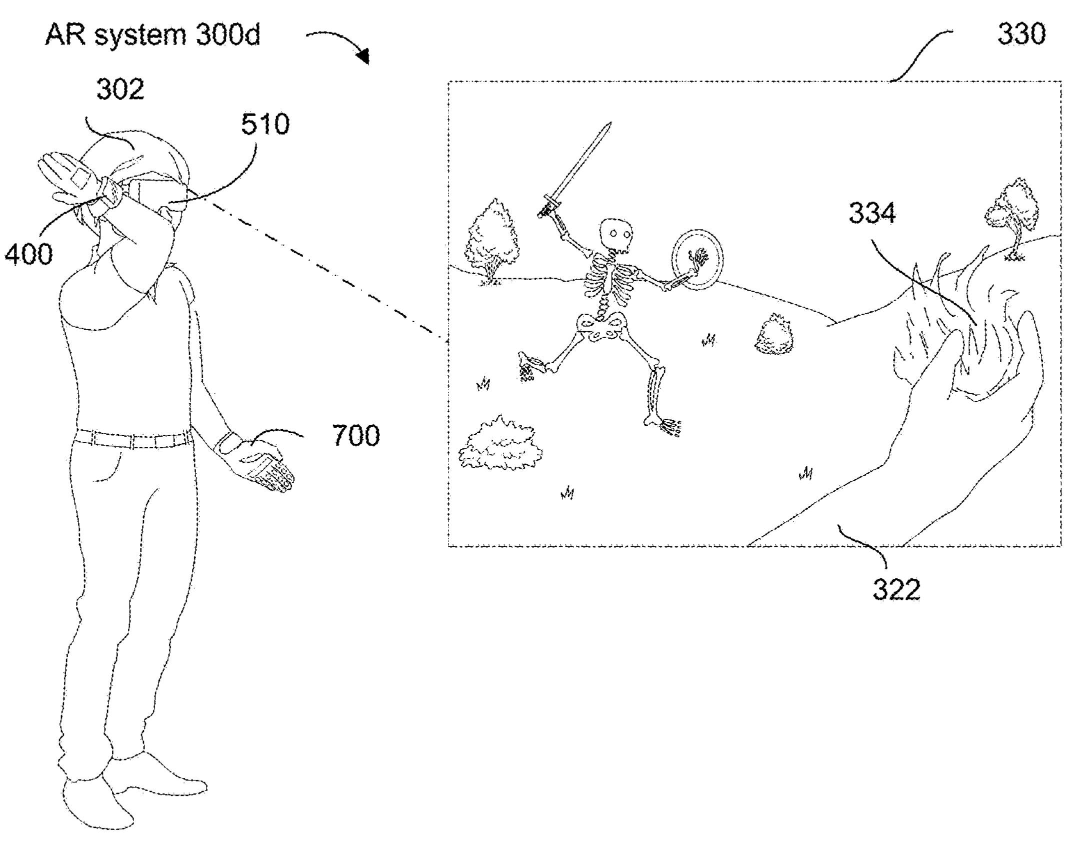
Figures 2, 3D:
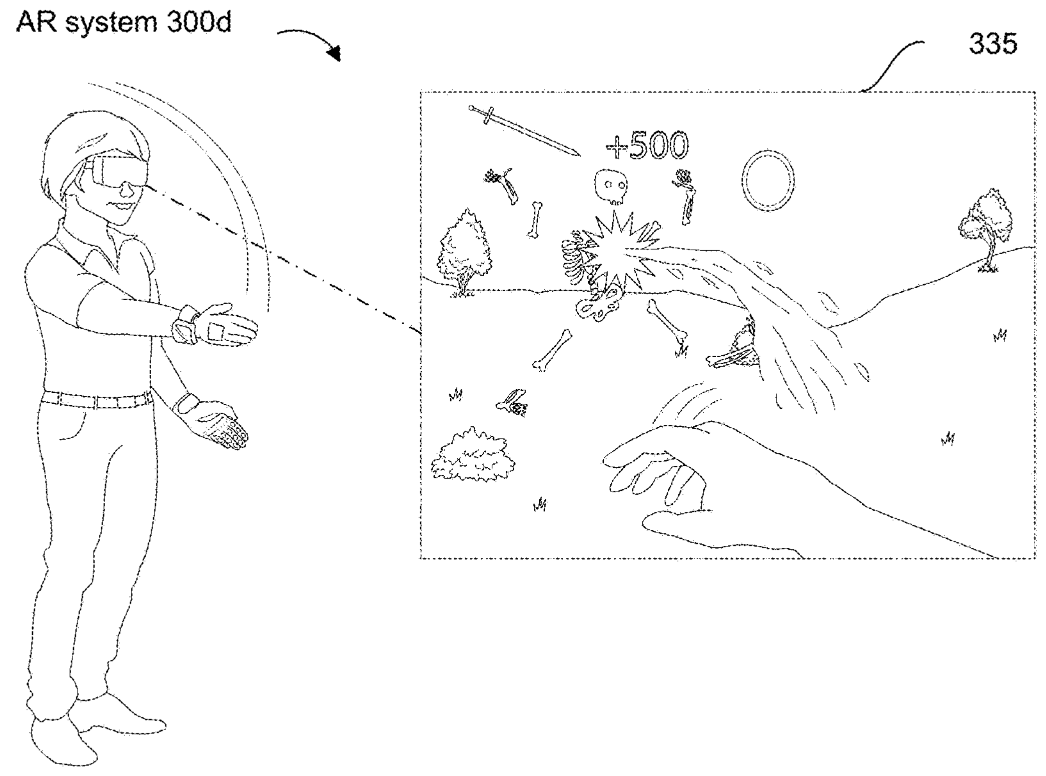

FIGS. 3A, 3B, 3C-1, 3C-2, 3D-1, and 3D-2 illustrate example AR systems, in accordance with some embodiments. FIG. 3A shows a first AR system 300*a* and first example user interactions using a wrist-wearable device 400, a head-wearable device (e.g., AR device 500), and/or a handheld intermediary processing device (HIPD) 600. FIG. 3B shows a second AR system 300*b* and second example user interactions using a wrist-wearable device 400, AR device 500, and/or an HIPD 600. FIGS. 3C-1 and 3C-2 show a third AR system 300*c* and third example user interactions using a wrist-wearable device 400, a head-wearable device (e.g., virtual-reality (VR) device 510), and/or an HIPD 600. FIGS. 3D-1 and 3D-2 show a fourth AR system 300*d* and fourth example user interactions using a wrist-wearable device 400, VR device 510, and/or a smart textile-based garment 700 (e.g., wearable gloves, haptic gloves). As the skilled artisan will appreciate upon reading the descriptions provided herein, the above-example AR systems (described in detail below) can perform various functions and/or operations described above with reference to FIGS. 1A to 1F.

The wrist-wearable device 400 and its constituent components are described below in reference to FIGS. 4A-4B, the head-wearable devices and their constituent components are described below in reference to FIGS. 5A-5D, and the HIPD 600 and its constituent components are described below in reference to FIGS. 6A-6B. The smart textile-based garment 700 and its one or more components are described below in reference to FIGS. 7A-7C. The wrist-wearable device 400, the head-wearable devices, and/or the HIPD 600 can communicatively couple via a network 325 (e.g., cellular, near field, Wi-Fi, personal arca network, or wireless LAN). Additionally, the wrist-wearable device 400, the head-wearable devices, and/or the HIPD 600 can also communicatively couple with one or more servers 330, computers 340 (e.g., laptops or computers), mobile devices 350 (e.g., smartphones or tablets), and/or other electronic devices via the network 325 (e.g., cellular, near field, Wi-Fi, personal area network, or wireless LAN). Similarly, the smart textile-based garment 700, when used, can also communicatively couple with the wrist-wearable device 400, the head-wearable devices, the HIPD 600, the one or more servers 330, the computers 340, the mobile devices 350, and/or other electronic devices via the network 325.

Turning to FIG. 3A, a user 302 is shown wearing the wrist-wearable device 400 and the AR device 500, and having the HIPD 600 on their desk. The wrist-wearable device 400, the AR device 500, and the HIPD 600 facilitate user interaction with an AR environment. In particular, as shown by the first AR system 300*a*, the wrist-wearable device 400, the AR device 500, and/or the HIPD 600 cause presentation of one or more avatars 304, digital representations of contacts 306, and virtual objects 308. As discussed below, the user 302 can interact with the one or more avatars 304, digital representations of the contacts 306, and virtual objects 308 via the wrist-wearable device 400, the AR device 500, and/or the HIPD 600.

The user 302 can use any of the wrist-wearable device 400, the AR device 500, and/or the HIPD 600 to provide user inputs. For example, the user 302 can perform one or more hand gestures that are detected by the wrist-wearable device 400 (e.g., using one or more EMG sensors and/or IMUs, described below in reference to FIGS. 4A-4B) and/or AR device 500 (e.g., using one or more image sensors or cameras, described below in reference to FIGS. 5A-5B) to provide a user input. Alternatively, or additionally, the user 302 can provide a user input via one or more touch surfaces of the wrist-wearable device 400, the AR device 500, and/or the HIPD 600, and/or voice commands captured by a microphone of the wrist-wearable device 400, the AR device 500, and/or the HIPD 600. In some embodiments, the wrist-wearable device 400, the AR device 500, and/or the HIPD 600 include a digital assistant to help the user in providing a user input (e.g., completing a sequence of operations, suggesting different operations or commands, providing reminders, or confirming a command). In some embodiments, the user 302 can provide a user input via one or more facial gestures and/or facial expressions. For example, cameras of the wrist-wearable device 400, the AR device 500, and/or the HIPD 600 can track the user 302's eyes for navigating a user interface.

The wrist-wearable device 400, the AR device 500, and/or the HIPD 600 can operate alone or in conjunction to allow the user 302 to interact with the AR environment. In some embodiments, the HIPD 600 is configured to operate as a central hub or control center for the wrist-wearable device 400, the AR device 500, and/or another communicatively coupled device. For example, the user 302 can provide an input to interact with the AR environment at any of the wrist-wearable device 400, the AR device 500, and/or the HIPD 600, and the HIPD 600 can identify one or more back-end and front-end tasks to cause the performance of the requested interaction and distribute instructions to cause the performance of the one or more back-end and front-end tasks at the wrist-wearable device 400, the AR device 500, and/or the HIPD 600. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 6A-6B, the HIPD 600 can perform the back-end tasks and provide the wrist-wearable device 400 and/or the AR device 500 operational data corresponding to the performed back-end tasks such that the wrist-wearable device 400 and/or the AR device 500 can perform the front-end tasks. In this way, the HIPD 600, which has more computational resources and greater thermal headroom than the wrist-wearable device 400 and/or the AR device 500, performs computationally intensive tasks and reduces the computer resource utilization and/or power usage of the wrist-wearable device 400 and/or the AR device 500.

In the example shown by the first AR system 300*a*, the HIPD 600 identifies one or more back-end tasks and front-end tasks associated with a user request to initiate an AR video call with one or more other users (represented by the avatar 304 and the digital representation of the contact 306) and distributes instructions to cause the performance of the one or more back-end tasks and front-end tasks. In particular, the HIPD 600 performs back-end tasks for processing and/or rendering image data (and other data) associated with the AR video call and provides operational data associated with the performed back-end tasks to the AR device 500 such that the AR device 500 performs front-end tasks for presenting the AR video call (e.g., presenting the avatar 304 and the digital representation of the contact 306).

In some embodiments, the HIPD 600 can operate as a focal or anchor point for causing the presentation of information. This allows the user 302 to be generally aware of where information is presented. For example, as shown in the first AR system 300*a*, the avatar 304 and the digital representation of the contact 306 are presented above the HIPD 600. In particular, the HIPD 600 and the AR device 500 operate in conjunction to determine a location for presenting the avatar 304 and the digital representation of the contact 306. In some embodiments, information can be presented within a predetermined distance from the HIPD 600 (e.g., within five meters). For example, as shown in the first AR system 300*a*, virtual object 308 is presented on the desk some distance from the HIPD 600. Similar to the above example, the HIPD 600 and the AR device 500 can operate in conjunction to determine a location for presenting the virtual object 308. Alternatively, in some embodiments, presentation of information is not bound by the HIPD 600. More specifically, the avatar 304, the digital representation of the contact 306, and the virtual object 308 do not have to be presented within a predetermined distance of the HIPD 600.

User inputs provided at the wrist-wearable device 400, the AR device 500, and/or the HIPD 600 are coordinated such that the user can use any device to initiate, continue, and/or complete an operation. For example, the user 302 can provide a user input to the AR device 500 to cause the AR device 500 to present the virtual object 308 and, while the virtual object 308 is presented by the AR device 500, the user 302 can provide one or more hand gestures via the wrist-wearable device 400 to interact and/or manipulate the virtual object 308.

FIG. 3B shows the user 302 wearing the wrist-wearable device 400 and the AR device 500, and holding the HIPD 600. In the second AR system 300*b*, the wrist-wearable device 400, the AR device 500, and/or the HIPD 600 are used to receive and/or provide one or more messages to a contact of the user 302. In particular, the wrist-wearable device 400, the AR device 500, and/or the HIPD 600 detect and coordinate one or more user inputs to initiate a messaging application and prepare a response to a received message via the messaging application.

In some embodiments, the user 302 initiates, via a user input, an application on the wrist-wearable device 400, the AR device 500, and/or the HIPD 600 that causes the application to initiate on at least one device. For example, in the second AR system 300*b*, the user 302 performs a hand gesture associated with a command for initiating a messaging application (represented by messaging user interface 312), the wrist-wearable device 400 detects the hand gesture, and, based on a determination that the user 302 is wearing AR device 500, causes the AR device 500 to present a messaging user interface 312 of the messaging application. The AR device 500 can present the messaging user interface 312 to the user 302 via its display (e.g., as shown by user 302's field of view 310). In some embodiments, the application is initiated and can be run on the device (e.g., the wrist-wearable device 400, the AR device 500, and/or the HIPD 600) that detects the user input to initiate the application, and the device provides another device operational data to cause the presentation of the messaging application. For example, the wrist-wearable device 400 can detect the user input to initiate a messaging application, initiate and run the messaging application, and provide operational data to the AR device 500 and/or the HIPD 600 to cause presentation of the messaging application. Alternatively, the application can be initiated and run at a device other than the device that detected the user input. For example, the wrist-wearable device 400 can detect the hand gesture associated with initiating the messaging application and cause the HIPD 600 to run the messaging application and coordinate the presentation of the messaging application.

Further, the user 302 can provide a user input provided at the wrist-wearable device 400, the AR device 500, and/or the HIPD 600 to continue and/or complete an operation initiated at another device. For example, after initiating the messaging application via the wrist-wearable device 400 and while the AR device 500 presents the messaging user interface 312, the user 302 can provide an input at the HIPD 600 to prepare a response (e.g., shown by the swipe gesture performed on the HIPD 600). The user 302's gestures performed on the HIPD 600 can be provided and/or displayed on another device. For example, the user 302's swipe gestures performed on the HIPD 600 are displayed on a virtual keyboard of the messaging user interface 312 displayed by the AR device 500.

In some embodiments, the wrist-wearable device 400, the AR device 500, the HIPD 600, and/or other communicatively coupled devices can present one or more notifications to the user 302. The notification can be an indication of a new message, an incoming call, an application update, a status update, etc. The user 302 can select the notification via the wrist-wearable device 400, the AR device 500, or the HIPD 600 and cause presentation of an application or operation associated with the notification on at least one device. For example, the user 302 can receive a notification that a message was received at the wrist-wearable device 400, the AR device 500, the HIPD 600, and/or other communicatively coupled device and provide a user input at the wrist-wearable device 400, the AR device 500, and/or the HIPD 600 to review the notification, and the device detecting the user input can cause an application associated with the notification to be initiated and/or presented at the wrist-wearable device 400, the AR device 500, and/or the HIPD 600.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 500 can present to the user 302 game application data and the HIPD 600 can use a controller to provide inputs to the game. Similarly, the user 302 can use the wrist-wearable device 400 to initiate a camera of the AR device 500, and the user can use the wrist-wearable device 400, the AR device 500, and/or the HIPD 600 to manipulate the image capture (e.g., zoom in or out or apply filters) and capture image data.

Turning to FIGS. 3C-1 and 3C-2, the user 302 is shown wearing the wrist-wearable device 400 and a VR device 510, and holding the HIPD 600. In the third AR system 300*c*, the wrist-wearable device 400, the VR device 510, and/or the HIPD 600 are used to interact within an AR environment, such as a VR game or other AR application. While the VR device 510 presents a representation of a VR game (e.g., first AR game environment 320) to the user 302, the wrist-wearable device 400, the VR device 510, and/or the HIPD 600 detect and coordinate one or more user inputs to allow the user 302 to interact with the VR game.

In some embodiments, the user 302 can provide a user input via the wrist-wearable device 400, the VR device 510, and/or the HIPD 600 that causes an action in a corresponding AR environment. For example, the user 302 in the third AR system 300*c* (shown in FIG. 3C-1) raises the HIPD 600 to prepare for a swing in the first AR game environment 320. The VR device 510, responsive to the user 302 raising the HIPD 600, causes the AR representation of the user 322 to perform a similar action (e.g., raise a virtual object, such as a virtual sword 324). In some embodiments, each device uses respective sensor data and/or image data to detect the user input and provide an accurate representation of the user 302's motion. For example, imaging sensors 654 (e.g., SLAM cameras or other cameras discussed below in FIGS. 6A and 6B) of the HIPD 600 can be used to detect a position of the 600 relative to the user 302's body such that the virtual object can be positioned appropriately within the first AR game environment 320; sensor data from the wrist-wearable device 400 can be used to detect a velocity at which the user 302 raises the HIPD 600 such that the AR representation of the user 322 and the virtual sword 324 are synchronized with the user 302's movements; and image sensors 526 (FIGS. 5A-5C) of the VR device 510 can be used to represent the user 302's body, boundary conditions, or real-world objects within the first AR game environment 320.

In FIG. 3C-2, the user 302 performs a downward swing while holding the HIPD 600. The user 302's downward swing is detected by the wrist-wearable device 400, the VR device 510, and/or the HIPD 600 and a corresponding action is performed in the first AR game environment 320. In some embodiments, the data captured by each device is used to improve the user's experience within the AR environment. For example, sensor data of the wrist-wearable device 400 can be used to determine a speed and/or force at which the downward swing is performed and image sensors of the HIPD 600 and/or the VR device 510 can be used to determine a location of the swing and how it should be represented in the first AR game environment 320, which, in turn, can be used as inputs for the AR environment (e.g., game mechanics, which can use detected speed, force, locations, and/or aspects of the user 302's actions to classify a user's inputs (e.g., user performs a light strike, hard strike, critical strike, glancing strike, miss) or calculate an output (e.g., amount of damage)).

While the wrist-wearable device 400, the VR device 510, and/or the HIPD 600 are described as detecting user inputs, in some embodiments, user inputs are detected at a single device (with the single device being responsible for distributing signals to the other devices for performing the user input). For example, the HIPD 600 can operate an application for generating the first AR game environment 320 and provide the VR device 510 with corresponding data for causing the presentation of the first AR game environment 320, as well as detect the 302's movements (while holding the HIPD 600) to cause the performance of corresponding actions within the first AR game environment 320. Additionally, or alternatively, in some embodiments, operational data (e.g., sensor data, image data, application data, device data, and/or other data) of one or more devices is provide to a single device (e.g., the HIPD 600) to process the operational data and cause respective devices to perform an action associated with processed operational data.

In FIGS. 3D-1 and 3D-2, the user 302 is shown wearing the wrist-wearable device 400, the VR device 510, and smart textile-based garments 700. In the fourth AR system **300*d*, the wrist-wearable device 400, the VR device 510, and/or the smart textile-based garments 700 are used to interact within an AR environment (e.g., any AR system described above in reference to FIGS. 3A-3C-2). While the VR device 510 presents a representation of a VR game (e.g., second AR game environment 331) to the user 302, the wrist-wearable device 400, the VR device 510, and/or the smart textile-based garments 700 detect and coordinate one or more user inputs to allow the user 302** to interact with the AR environment.

In some embodiments, the user 302 can provide a user input via the wrist-wearable device 400, the VR device 510, and/or the smart textile-based garments 700 that causes an action in a corresponding AR environment. For example, the user 302 in the fourth AR system **300*d* (shown in FIG. 3D-1) raises a hand wearing the smart textile-based garments 700 to prepare to cast a spell or throw an object within the second AR game environment 331. The VR device 510, responsive to the user 302 holding up their hand (wearing smart textile-based garments 700), causes the AR representation of the user 322 to perform a similar action (e.g., hold a virtual object or throw a fireball 334). In some embodiments, each device uses respective sensor data and/or image data to detect the user input and provides an accurate representation of the user 302**'s motion.

In FIG. 3D-2, the user 302 performs a throwing motion while wearing the smart textile-based garment 700. The user 302's throwing motion is detected by the wrist-wearable device 400, the VR device 510, and/or the smart textile-based garments 700, and a corresponding action is performed in the second AR game environment 331. As described above, the data captured by each device is used to improve the user's experience within the AR environment. Although not shown, the smart textile-based garments 700 can be used in conjunction with an AR device 510 and/or an HIPD 600.

Having discussed example AR systems, devices for interacting with such AR systems, and other computing systems more generally, devices and components will now be discussed in greater detail below. Some definitions of devices and components that can be included in some or all of the example devices discussed below are defined here for case of reference. A skilled artisan will appreciate that certain types of the components described below may be more suitable for a particular set of devices and less suitable for another particular set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

FIGS. 4A and 4B illustrate an example wrist-wearable device 400, in accordance with some embodiments. The wrist-wearable device 400 is an instance of the wrist-wearable device 400 described in reference to FIGS. 1A to 1F herein, such that the wrist-wearable device should be understood to have the features of the wrist-wearable device 400 and vice versa. FIG. 4A illustrates components of the wrist-wearable device 400, which can be used individually or in combination, including combinations that include other electronic devices and/or electronic components.

FIG. 4A shows a wearable band 410 and a watch body 420 (or capsule) being coupled, as discussed below, to form the wrist-wearable device 400. The wrist-wearable device 400 can perform various functions and/or operations associated with navigating through user interfaces and selectively opening applications, as well as the functions and/or operations described above with reference to FIGS. 1A to 1F (e.g., detecting attempts by the user 302 to perform sequences of handwriting motions and/or presenting user interfaces to the user related to attempts to perform sequences of handwriting motions).

As will be described in more detail below, operations executed by the wrist-wearable device 400 can include (i) presenting content to a user (e.g., displaying visual content via a display 405); (ii) detecting (e.g., sensing) user input (e.g., sensing a touch on peripheral button 423 and/or at a touch screen of the display 405, a hand gesture detected by sensors (e.g., biopotential sensors)); (iii) sensing biometric data via one or more sensors 413 (e.g., neuromuscular signals, heart rate, temperature, or sleep); messaging (e.g., text, speech, or video); image capture via one or more imaging devices or cameras 425; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 420, independently in the wearable band 410, and/or via an electronic communication between the watch body 420 and the wearable band 410. In some embodiments, functions can be executed on the wrist-wearable device 400 while an AR environment is being presented (e.g., via one of the AR systems 300*a* to 300*d*). As the skilled artisan will appreciate upon reading the descriptions provided herein, the novel wearable devices described herein can be used with other types of AR environments.

The wearable band 410 can be configured to be worn by a user such that an inner (or inside) surface of the wearable structure 411 of the wearable band 410 is in contact with the user's skin. When worn by a user, sensors 413 contact the user's skin. The sensors 413 can sense biometric data such as a user's heart rate, saturated oxygen level, temperature, sweat level, neuromuscular-signal sensors, or a combination thereof. The sensors 413 can also sense data about a user's environment, including a user's motion, altitude, location, orientation, gait, acceleration, position, or a combination thereof. In some embodiments, the sensors 413 are configured to track a position and/or motion of the wearable band 410. The one or more sensors 413 can include any of the sensors defined above and/or discussed below with respect to FIG. 4B.

The one or more sensors 413 can be distributed on an inside and/or an outside surface of the wearable band 410. In some embodiments, the one or more sensors 413 are uniformly spaced along the wearable band 410. Alternatively, in some embodiments, the one or more sensors 413 are positioned at distinct points along the wearable band 410. As shown in FIG. 4A, the one or more sensors 413 can be the same or distinct. For example, in some embodiments, the one or more sensors 413 can be shaped as a pill (e.g., sensor 413*a*), an oval, a circle a square, an oblong (e.g., sensor 413*c*), and/or any other shape that maintains contact with the user's skin (e.g., such that neuromuscular signal and/or other biometric data can be accurately measured at the user's skin). In some embodiments, the one or more sensors 413 are aligned to form pairs of sensors (e.g., for sensing neuromuscular signals based on differential sensing within each respective sensor). For example, sensor 413*b* is aligned with an adjacent sensor to form sensor pair 414*a*, and sensor 413*d* is aligned with an adjacent sensor to form sensor pair 414*b*. In some embodiments, the wearable band 410 does not have a sensor pair. Alternatively, in some embodiments, the wearable band 410 has a predetermined number of sensor pairs (one pair of sensors, three pairs of sensors, four pairs of sensors, six pairs of sensors, or sixteen pairs of sensors).

The wearable band 410 can include any suitable number of sensors 413. In some embodiments, the amount, and arrangements of sensors 413 depend on the particular application for which the wearable band 410 is used. For instance, a wearable band 410 configured as an armband, wristband, or chest-band may include a plurality of sensors 413 with a different number of sensors 413 and different arrangement for each use case, such as medical use cases, compared to gaming or general day-to-day use cases.

In accordance with some embodiments, the wearable band 410 further includes an electrical ground electrode and a shielding electrode. The electrical ground and shielding electrodes, like the sensors 413, can be distributed on the inside surface of the wearable band 410 such that they contact a portion of the user's skin. For example, the electrical ground and shielding electrodes can be at an inside surface of coupling mechanism 416 or an inside surface of a wearable structure 411. The electrical ground and shielding electrodes can be formed and/or use the same components as the sensors 413. In some embodiments, the wearable band 410 includes more than one electrical ground electrode and more than one shielding electrode.

The sensors 413 can be formed as part of the wearable structure 411 of the wearable band 410. In some embodiments, the sensors 413 are flush (or substantially flush within fault tolerances of the relevant materials) with the wearable structure 411 such that they do not extend beyond the surface of the wearable structure 411. While flush with the wearable structure 411, the sensors 413 are still configured to contact the user's skin (e.g., via a skin-contacting surface). Alternatively, in some embodiments, the sensors 413 extend beyond the wearable structure 411 a predetermined distance (e.g., 0.1 mm to 2 mm) to make contact and depress into the user's skin. In some embodiments, the sensors 413 are coupled to an actuator (not shown) configured to adjust an extension height (e.g., a distance from the surface of the wearable structure 411) of the sensors 413 such that the sensors 413 make contact and depress into the user's skin. In some embodiments, the actuators adjust the extension height between 0.01 mm to 1.2 mm. This allows the user to customize the positioning of the sensors 413 to improve the overall comfort of the wearable band 410 when worn while still allowing the sensors 413 to contact the user's skin. In some embodiments, the sensors 413 are indistinguishable from the wearable structure 411 when worn by the user.

The wearable structure 411 can be formed of an elastic material, elastomers, etc., configured to be stretched and fitted to be worn by the user. In some embodiments, the wearable structure 411 is a textile or woven fabric. As described above, the sensors 413 can be formed as part of a wearable structure 411. For example, the sensors 413 can be molded into the wearable structure 411 or be integrated into a woven fabric (e.g., the sensors 413 can be sewn into the fabric and mimic the pliability of fabric (e.g., the sensors 413 can be constructed from a series of woven strands of fabric)).

The wearable structure 411 can include flexible electronic connectors that interconnect the sensors 413, the electronic circuitry, and/or other electronic components (as described below in reference to FIG. 4B) that are enclosed in the wearable band 410. In some embodiments, the flexible electronic connectors are configured to interconnect the sensors 413, the electronic circuitry, and/or other electronic components of the wearable band 410 with respective sensors and/or other electronic components of another electronic device (e.g., watch body 420). The flexible electronic connectors are configured to move with the wearable structure 411 such that the user adjustment to the wearable structure 411 (e.g., resizing, pulling, or folding) does not stress or strain the electrical coupling of components of the wearable band 410.

As described above, the wearable band 410 is configured to be worn by a user. In particular, the wearable band 410 can be shaped or otherwise manipulated to be worn by a user. For example, the wearable band 410 can be shaped to have a substantially circular shape such that it can be configured to be worn on the user's lower arm or wrist. Alternatively, the wearable band 410 can be shaped to be worn on another body part of the user, such as the user's upper arm (e.g., around a bicep), forearm, chest, legs, etc. The wearable band 410 can include a retaining mechanism 412 (e.g., a buckle or a hook and loop fastener) for securing the wearable band 410 to the user's wrist or other body part. While the wearable band 410 is worn by the user, the sensors 413 sense data (referred to as sensor data) from the user's skin. In particular, the sensors 413 of the wearable band 410 obtain (e.g., sense and record) neuromuscular signals.

The sensed data (e.g., sensed neuromuscular signals) can be used to detect and/or determine the user's intention to perform certain motor actions. In particular, the sensors 413 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 405 of the wrist-wearable device 400 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 413 can be used to provide a user with an enhanced interaction with a physical object (e.g., devices communicatively coupled with the wearable band 410) and/or a virtual object in an AR application generated by an AR system (e.g., user interface objects presented on the display 405 or another computing device (e.g., a smartphone)).

In some embodiments, the wearable band 410 includes one or more haptic devices 446 (FIG. 4B; e.g., a vibratory haptic actuator) that are configured to provide haptic feedback (e.g., a cutaneous and/or kinesthetic sensation) to the user's skin. The sensors 413 and/or the haptic devices 446 can be configured to operate in conjunction with multiple applications including, without limitation, health monitoring, social media, games, and AR (e.g., the applications associated with AR).

The wearable band 410 can also include a coupling mechanism 416 (e.g., a cradle or a shape of the coupling mechanism can correspond to the shape of the watch body 420 of the wrist-wearable device 400) for detachably coupling a capsule (e.g., a computing unit) or watch body 420 (via a coupling surface of the watch body 420) to the wearable band 410. In particular, the coupling mechanism 416 can be configured to receive a coupling surface proximate to the bottom side of the watch body 420 (e.g., a side opposite to a front side of the watch body 420 where the display 405 is located), such that a user can push the watch body 420 downward into the coupling mechanism 416 to attach the watch body 420 to the coupling mechanism 416. In some embodiments, the coupling mechanism 416 can be configured to receive a top side of the watch body 420 (e.g., a side proximate to the front side of the watch body 420 where the display 405 is located) that is pushed upward into the cradle, as opposed to being pushed downward into the coupling mechanism 416. In some embodiments, the coupling mechanism 416 is an integrated component of the wearable band 410 such that the wearable band 410 and the coupling mechanism 416 are a single unitary structure. In some embodiments, the coupling mechanism 416 is a type of frame or shell that allows the watch body 420 coupling surface to be retained within or on the wearable band 410 coupling mechanism 416 (e.g., a cradle, a tracker band, a support base, or a clasp).

The coupling mechanism 416 can allow for the watch body 420 to be detachably coupled to the wearable band 410 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 420 to the wearable band 410 and to decouple the watch body 420 from the wearable band 410. For example, a user can twist, slide, turn, push, pull, or rotate the watch body 420 relative to the wearable band 410, or a combination thereof, to attach the watch body 420 to the wearable band 410 and to detach the watch body 420 from the wearable band 410. Alternatively, as discussed below, in some embodiments, the watch body 420 can be decoupled from the wearable band 410 by actuation of the release mechanism 429.

The wearable band 410 can be coupled with a watch body 420 to increase the functionality of the wearable band 410 (e.g., converting the wearable band 410 into a wrist-wearable device 400, adding an additional computing unit and/or battery to increase computational resources and/or a battery life of the wearable band 410, or adding additional sensors to improve sensed data). As described above, the wearable band 410 (and the coupling mechanism 416) is configured to operate independently (e.g., execute functions independently) from watch body 420. For example, the coupling mechanism 416 can include one or more sensors 413 that contact a user's skin when the wearable band 410 is worn by the user and provide sensor data for determining control commands.

A user can detach the watch body 420 (or capsule) from the wearable band 410 in order to reduce the encumbrance of the wrist-wearable device 400 to the user. For embodiments in which the watch body 420 is removable, the watch body 420 can be referred to as a removable structure, such that in these embodiments the wrist-wearable device 400 includes a wearable portion (e.g., the wearable band 410) and a removable structure (the watch body 420).

Turning to the watch body 420, the watch body 420 can have a substantially rectangular or circular shape. The watch body 420 is configured to be worn by the user on their wrist or on another body part. More specifically, the watch body 420 is sized to be easily carried by the user, attached on a portion of the user's clothing, and/or coupled to the wearable band 410 (forming the wrist-wearable device 400). As described above, the watch body 420 can have a shape corresponding to the coupling mechanism 416 of the wearable band 410. In some embodiments, the watch body 420 includes a single release mechanism 429 or multiple release mechanisms (e.g., two release mechanisms 429 positioned on opposing sides of the watch body 420, such as spring-loaded buttons) for decoupling the watch body 420 and the wearable band 410. The release mechanism 429 can include, without limitation, a button, a knob, a plunger, a handle, a lever, a fastener, a clasp, a dial, a latch, or a combination thereof.

A user can actuate the release mechanism 429 by pushing, turning, lifting, depressing, shifting, or performing other actions on the release mechanism 429. Actuation of the release mechanism 429 can release (e.g., decouple) the watch body 420 from the coupling mechanism 416 of the wearable band 410, allowing the user to use the watch body 420 independently from wearable band 410 and vice versa. For example, decoupling the watch body 420 from the wearable band 410 can allow the user to capture images using rear-facing camera 425*b*. Although the coupling mechanism 416 is shown positioned at a corner of watch body 420, the release mechanism 429 can be positioned anywhere on watch body 420 that is convenient for the user to actuate. In addition, in some embodiments, the wearable band 410 can also include a respective release mechanism for decoupling the watch body 420 from the coupling mechanism 416. In some embodiments, the release mechanism 429 is optional and the watch body 420 can be decoupled from the coupling mechanism 416, as described above (e.g., via twisting or rotating).

The watch body 420 can include one or more peripheral buttons 423 and 427 for performing various operations at the watch body 420. For example, the peripheral buttons 423 and 427 can be used to turn on or wake (e.g., transition from a sleep state to an active state) the display 405, unlock the watch body 420, increase or decrease volume, increase, or decrease brightness, interact with one or more applications, interact with one or more user interfaces. Additionally, or alternatively, in some embodiments, the display 405 operates as a touch screen and allows the user to provide one or more inputs for interacting with the watch body 420.

In some embodiments, the watch body 420 includes one or more sensors 421. The sensors 421 of the watch body 420 can be the same or distinct from the sensors 413 of the wearable band 410. The sensors 421 of the watch body 420 can be distributed on an inside and/or an outside surface of the watch body 420. In some embodiments, the sensors 421 are configured to contact a user's skin when the watch body 420 is worn by the user. For example, the sensors 421 can be placed on the bottom side of the watch body 420 and the coupling mechanism 416 can be a cradle with an opening that allows the bottom side of the watch body 420 to directly contact the user's skin. Alternatively, in some embodiments, the watch body 420 does not include sensors that are configured to contact the user's skin (e.g., including sensors internal and/or external to the watch body 420 that are configured to sense data of the watch body 420 and the watch body 420's surrounding environment). In some embodiments, the sensors 413 are configured to track a position and/or motion of the watch body 420.

The watch body 420 and the wearable band 410 can share data using a wired communication method (e.g., a Universal Asynchronous Receiver/Transmitter (UART) or a USB transceiver) and/or a wireless communication method (e.g., near-field communication or Bluetooth). For example, the watch body 420 and the wearable band 410 can share data sensed by the sensors 413 and 421, as well as application- and device-specific information (e.g., active and/or available applications), output devices (e.g., display or speakers), and/or input devices (e.g., touch screens, microphones, or imaging sensors).

In some embodiments, the watch body 420 can include, without limitation, a front-facing camera 425*a* and/or a rear-facing camera 425*b*, sensors 421 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 4B; imaging sensor 463), a touch sensor, a sweat sensor). In some embodiments, the watch body 420 can include one or more haptic devices 476 (FIG. 4B; a vibratory haptic actuator) that is configured to provide haptic feedback (e.g., a cutaneous and/or kinesthetic sensation) to the user. The sensors 421 and/or the haptic device 476 can also be configured to operate in conjunction with multiple applications, including, without limitation, health-monitoring applications, social media applications, game applications, and AR applications (e.g., the applications associated with AR).

As described above, the watch body 420 and the wearable band 410, when coupled, can form the wrist-wearable device 400. When coupled, the watch body 420 and wearable band 410 operate as a single device to execute functions (e.g., operations, detections, or communications) described herein. In some embodiments, each device is provided with particular instructions for performing the one or more operations of the wrist-wearable device 400. For example, in accordance with a determination that the watch body 420 does not include neuromuscular-signal sensors, the wearable band 410 can include alternative instructions for performing associated instructions (e.g., providing sensed neuromuscular-signal data to the watch body 420 via a different electronic device). Operations of the wrist-wearable device 400 can be performed by the watch body 420 alone or in conjunction with the wearable band 410 (e.g., via respective processors and/or hardware components) and vice versa. In some embodiments, operations of the wrist-wearable device 400, the watch body 420, and/or the wearable band 410 can be performed in conjunction with one or more processors and/or hardware components of another communicatively coupled device (e.g., FIGS. 6A-6B; the HIPD 600).

As described below with reference to the block diagram of FIG. 4B, the wearable band 410 and/or the watch body 420 can each include independent resources required to independently execute functions. For example, the wearable band 410 and/or the watch body 420 can each include a power source (e.g., a battery), a memory, data storage, a processor (e.g., a CPU), communications, a light source, and/or input/output devices.

FIG. 4B shows block diagrams of a computing system 430 corresponding to the wearable band 410 and a computing system 460 corresponding to the watch body 420, according to some embodiments. A computing system of the wrist-wearable device 400 includes a combination of components of the wearable band computing system 430 and the watch body computing system 460, in accordance with some embodiments.

The watch body 420 and/or the wearable band 410 can include one or more components shown in watch body computing system 460. In some embodiments, a single integrated circuit includes all or a substantial portion of the components of the watch body computing system 460 that are included in a single integrated circuit. Alternatively, in some embodiments, components of the watch body computing system 460 are included in a plurality of integrated circuits that are communicatively coupled. In some embodiments, the watch body computing system 460 is configured to couple (e.g., via a wired or wireless connection) with the wearable band computing system 430, which allows the computing systems to share components, distribute tasks, and/or perform other operations described herein (individually or as a single device).

The watch body computing system 460 can include one or more processors 479, a controller 47, a peripherals interface 461, a power system 495, and memory (e.g., a memory 480), each of which are defined above and described in more detail below.

The power system 495 can include a charger input 496, a power-management integrated circuit (PMIC) 497, and a battery 498, each of which are defined above. In some embodiments, a watch body 420 and a wearable band 410 can have respective charger inputs (e.g., charger inputs 496 and 457), respective batteries (e.g., batteries 498 and 459), and can share power with each other (e.g., the watch body 420 can power and/or charge the wearable band 410 and vice versa). Although watch body 420 and/or the wearable band 410 can include respective charger inputs, a single charger input can charge both devices when coupled. The watch body 420 and the wearable band 410 can receive a charge using a variety of techniques. In some embodiments, the watch body 420 and the wearable band 410 can use a wired charging assembly (e.g., power cords) to receive the charge. Alternatively, or in addition, the watch body 420 and/or the wearable band 410 can be configured for wireless charging. For example, a portable charging device can be designed to mate with a portion of watch body 420 and/or wearable band 410 and wirelessly deliver usable power to a battery of watch body 420 and/or wearable band 410. The watch body 420 and the wearable band 410 can have independent power systems (e.g., power system 495 and 456) to enable each to operate independently. The watch body 420 and wearable band 410 can also share power (e.g., one can charge the other) via respective PMICs (e.g., PMICs 497 and 458) that can share power over power and ground conductors and/or over wireless charging antennas.

In some embodiments, the peripherals interface 461 can include one or more sensors 421, many of which listed below are defined above. The sensors 421 can include one or more coupling sensors 462 for detecting when the watch body 420 is coupled with another electronic device (e.g., a wearable band 410). The sensors 421 can include imaging sensors 463 (one or more of the cameras 425 and/or separate imaging sensors 463 (e.g., thermal-imaging sensors)). In some embodiments, the sensors 421 include one or more SpO2 sensors 464. In some embodiments, the sensors 421 include one or more biopotential-signal sensors (e.g., EMG sensors 465, which may be disposed on a user-facing portion of the watch body 420 and/or the wearable band 410). In some embodiments, the sensors 421 include one or more capacitive sensors 466. In some embodiments, the sensors 421 include one or more heart rate sensors 467. In some embodiments, the sensors 421 include one or more IMUs 468. In some embodiments, one or more IMUs 468 can be configured to detect movement of a user's hand or other location that the watch body 420 is placed or held.

In some embodiments, the peripherals interface 461 includes an NFC component 469, a GPS component 470, a long-term evolution (LTE) component 471, and/or a Wi-Fi and/or Bluetooth communication component 472. In some embodiments, the peripherals interface 461 includes one or more buttons 473 (e.g., the peripheral buttons 423 and 427 in FIG. 4A), which, when selected by a user, cause operations to be performed at the watch body 420. In some embodiments, the peripherals interface 461 includes one or more indicators, such as a light-emitting diode (LED), to provide a user with visual indicators (e.g., message received, low battery, an active microphone, and/or a camera).

The watch body 420 can include at least one display 405 for displaying visual representations of information or data to the user, including user-interface elements and/or three-dimensional (3D) virtual objects. The display can also include a touch screen for inputting user inputs, such as touch gestures, swipe gestures, and the like. The watch body 420 can include at least one speaker 474 and at least one microphone 475 for providing audio signals to the user and receiving audio input from the user. The user can provide user inputs through the microphone 475 and can also receive audio output from the speaker 474 as part of a haptic event provided by the haptic controller 478. The watch body 420 can include at least one camera 425, including a front-facing camera 425*a* and a rear-facing camera 425*b*. The cameras 425 can include ultra-wide-angle cameras, wide-angle cameras, fish-eye cameras, spherical cameras, telephoto cameras, depth-sensing cameras, or other types of cameras.

The watch body computing system 460 can include one or more haptic controllers 478 and associated componentry (e.g., haptic devices 476) for providing haptic events at the watch body 420 (e.g., a vibrating sensation or audio output in response to an event at the watch body 420). The haptic controllers 478 can communicate with one or more haptic devices 476, such as electroacoustic devices, including a speaker of the one or more speakers 474 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 478 can provide haptic events to respective haptic actuators that are capable of being sensed by a user of the watch body 420. In some embodiments, the one or more haptic controllers 478 can receive input signals from an application of the applications 482.

In some embodiments, the computer system 430 and/or the computer system 460 can include memory 480, which can be controlled by a memory controller of the one or more controllers 47 and/or one or more processors 479. In some embodiments, software components stored in the memory 480 include one or more applications 482 configured to perform operations at the watch body 420. In some embodiments, the one or more applications 482 include games, word processors, messaging applications, calling applications, web browsers, social media applications, media streaming applications, financial applications, calendars, clocks, etc. In some embodiments, software components stored in the memory 480 include one or more communication interface modules 483 as defined above. In some embodiments, software components stored in the memory 480 include one or more graphics modules 484 for rendering, encoding, and/or decoding audio and/or visual data; and one or more data management modules 485 for collecting, organizing, and/or providing access to the data 487 stored in memory 480. In some embodiments, one or more of applications 482 and/or one or more modules can work in conjunction with one another to perform various tasks at the watch body 420.

In some embodiments, software components stored in the memory 480 can include one or more operating systems 481 (e.g., a Linux-based operating system, an Android operating system, etc.). The memory 480 can also include data 487.

The data 487 can include profile data 488A, sensor data 489A, media content data 490, application data 491.

It should be appreciated that the watch body computing system 460 is an example of a computing system within the watch body 420, and that the watch body 420 can have more or fewer components than shown in the watch body computing system 460, combine two or more components, and/or have a different configuration and/or arrangement of the components. The various components shown in watch body computing system 460 are implemented in hardware, software, firmware, or a combination thereof, including one or more signal processing and/or application-specific integrated circuits.

Turning to the wearable band computing system 430, one or more components that can be included in the wearable band 410 are shown. The wearable band computing system 430 can include more or fewer components than shown in the watch body computing system 460, combine two or more components, and/or have a different configuration and/or arrangement of some or all of the components. In some embodiments, all, or a substantial portion of the components of the wearable band computing system 430 are included in a single integrated circuit. Alternatively, in some embodiments, components of the wearable band computing system 430 are included in a plurality of integrated circuits that are communicatively coupled. As described above, in some embodiments, the wearable band computing system 430 is configured to couple (e.g., via a wired or wireless connection) with the watch body computing system 460, which allows the computing systems to share components, distribute tasks, and/or perform other operations described herein (individually or as a single device).

The wearable band computing system 430, similar to the watch body computing system 460, can include one or more processors 449, one or more controllers 447 (including one or more haptics controller 448), a peripherals interface 431 that can include one or more sensors 413 and other peripheral devices, power source (e.g., a power system 456), and memory (e.g., a memory 450) that includes an operating system (e.g., an operating system 451), data (e.g., data 454 including profile data 488B, sensor data 489B, etc.), and one or more modules (e.g., a communications interface module 452, a data management module 453, etc.).

The one or more sensors 413 can be analogous to sensors 421 of the computer system 460 in light of the definitions above. For example, sensors 413 can include one or more coupling sensors 432, one or more SpO2 sensors 434, one or more EMG sensors 435, one or more capacitive sensors 436, one or more heart rate sensors 437, and one or more IMU sensors 438.

The peripherals interface 431 can also include other components analogous to those included in the peripheral interface 461 of the computer system 460, including an NFC component 439, a GPS component 440, an LTE component 441, a Wi-Fi and/or Bluetooth communication component 442, and/or one or more haptic devices 476 as described above in reference to peripherals interface 461. In some embodiments, the peripherals interface 431 includes one or more buttons 443, a display 433, a speaker 444, a microphone 445, and a camera 455. In some embodiments, the peripherals interface 431 includes one or more indicators, such as an LED.

It should be appreciated that the wearable band computing system 430 is an example of a computing system within the wearable band 410, and that the wearable band 410 can have more or fewer components than shown in the wearable band computing system 430, combine two or more components, and/or have a different configuration and/or arrangement of the components. The various components shown in wearable band computing system 430 can be implemented in one or a combination of hardware, software, and firmware, including one or more signal processing and/or application-specific integrated circuits.

The wrist-wearable device 400 with respect to FIG. 4A is an example of the wearable band 410 and the watch body 420 coupled, so the wrist-wearable device 400 will be understood to include the components shown and described for the wearable band computing system 430 and the watch body computing system 460. In some embodiments, wrist-wearable device 400 has a split architecture (e.g., a split mechanical architecture or a split electrical architecture) between the watch body 420 and the wearable band 410. In other words, all of the components shown in the wearable band computing system 430 and the watch body computing system 460 can be housed or otherwise disposed in a combined wrist-wearable device 400, or within individual components of the watch body 420, wearable band 410, and/or portions thereof (e.g., a coupling mechanism 416 of the wearable band 410).

The techniques described above can be used with any device for sensing neuromuscular signals, including the arm-wearable devices of FIG. 4A-4B, but could also be used with other types of wearable devices for sensing neuromuscular signals (such as body-wearable or head-wearable devices that might have neuromuscular sensors closer to the brain or spinal column).

In some embodiments, a wrist-wearable device 400 can be used in conjunction with a head-wearable device described below (e.g., AR device 500 and VR device 510) and/or an HIPD 600, and the wrist-wearable device 400 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 400 can also be used in conjunction with a wearable garment, such as smart textile-based garment 700 described below in reference to FIGS. 7A-7C. Having thus described example wrist-wearable device, attention will now be turned to example head-wearable devices, such as AR device 500 and VR device 510.

Example Head-Wearable Devices

FIGS. 5A, 5B-1, 5B-2, and 5C show example head-wearable devices, in accordance with some embodiments. Head-wearable devices can include, but are not limited to, AR devices 500 (e.g., AR or smart eyewear devices, such as smart glasses, smart monocles, smart contacts, etc.), VR devices 510 (e.g., VR headsets or head-mounted displays (HMDs)), or other ocularly coupled devices. The AR devices 500 and the VR devices 510 are instances of the head-wearable devices described in reference to FIGS. 1A to 1F herein, such that the head-wearable device should be understood to have the features of the AR devices 500 and/or the VR devices 510 and vice versa. The AR devices 500 and the VR devices 510 can perform various functions and/or operations associated with navigating through user interfaces and selectively opening applications, as well as the functions and/or operations described above with reference to FIGS. 1A to 1F (e.g., displaying the user interface 104, the user interface 120, and/or any of the constituent user interface elements of these user interfaces.

Figure 5A:
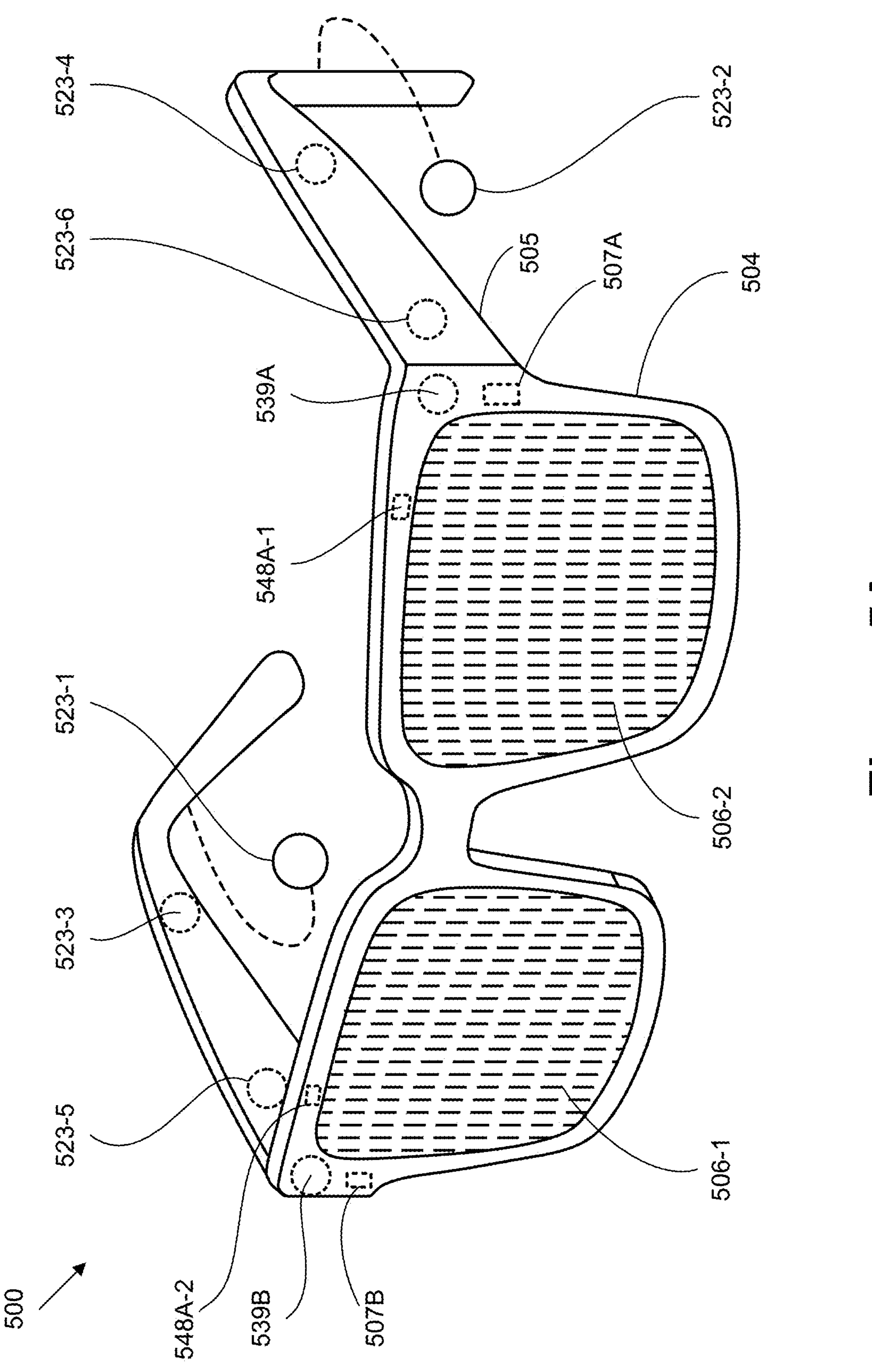
Figures 1, 5B:
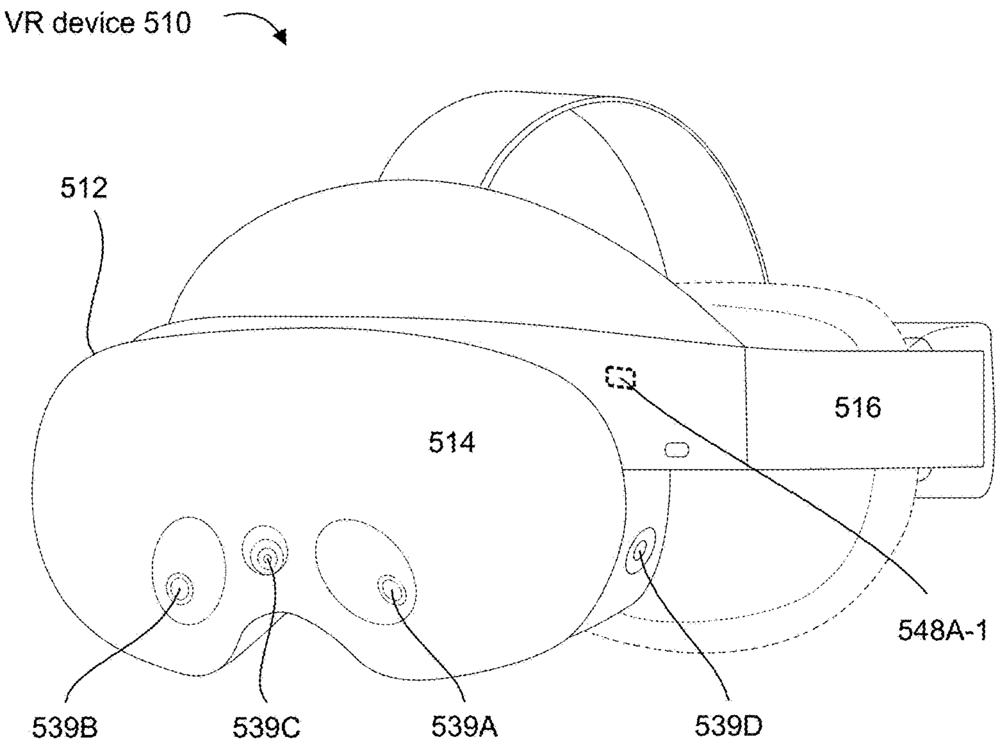
Figures 2, 5B:
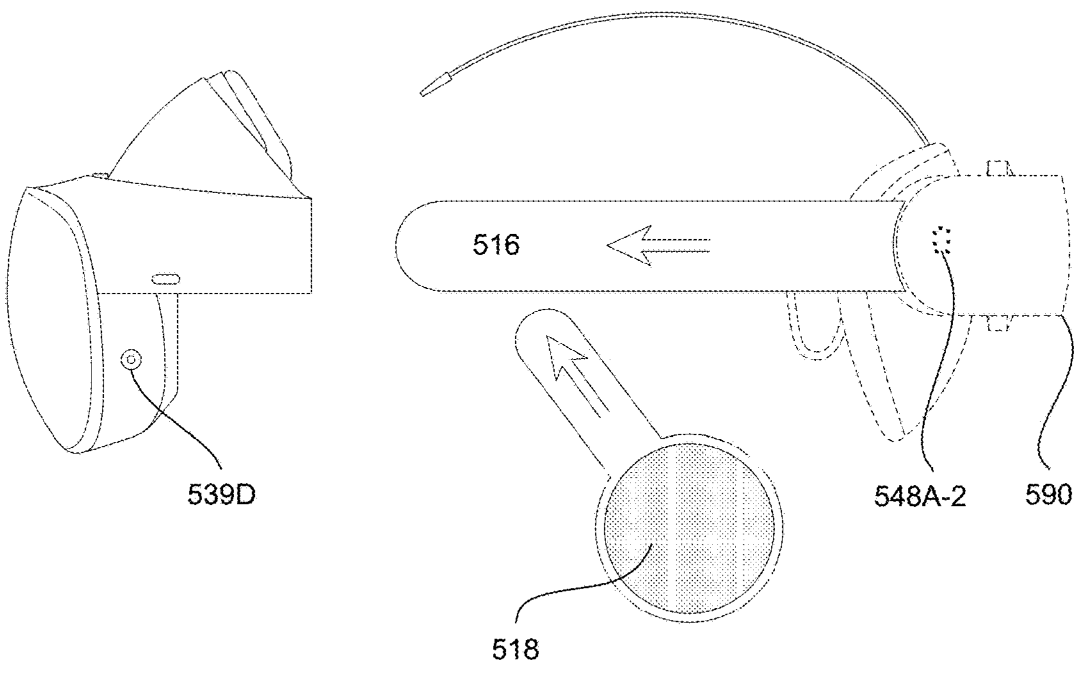

In some embodiments, an AR system (e.g., FIGS. 3A-3D-2; AR systems 300*a*-300*d*) includes an AR device 500 (as shown in FIG. 5A) and/or VR device 510 (as shown in FIGS. 5B-1-B-2). In some embodiments, the AR device 500 and the VR device 510 can include one or more analogous components (e.g., components for presenting interactive AR environments, such as processors, memory, and/or presentation devices, including one or more displays and/or one or more waveguides), some of which are described in more detail with respect to FIG. 5C. The head-wearable devices can use display projectors (e.g., display projector assemblies 507A and 507B) and/or waveguides for projecting representations of data to a user. Some embodiments of head-wearable devices do not include displays.

FIG. 5A shows an example visual depiction of the AR device 500 (e.g., which may also be described herein as augmented-reality glasses and/or smart glasses). The AR device 500 can work in conjunction with additional electronic components that are not shown in FIGS. 5A, such as a wearable accessory device and/or an intermediary processing device, in electronic communication or otherwise configured to be used in conjunction with the AR device 500. In some embodiments, the wearable accessory device and/or the intermediary processing device may be configured to couple with the AR device 500 via a coupling mechanism in electronic communication with a coupling sensor 524, where the coupling sensor 524 can detect when an electronic device becomes physically or electronically coupled with the AR device 500. In some embodiments, the AR device 500 can be configured to couple to a housing (e.g., a portion of frame 504 or temple arms 505), which may include one or more additional coupling mechanisms configured to couple with additional accessory devices. The components shown in FIG. 5A can be implemented in hardware, software, firmware, or a combination thereof, including one or more signal-processing components and/or application-specific integrated circuits (ASICs).

The AR device 500 includes mechanical glasses components, including a frame 504 configured to hold one or more lenses (e.g., one or both lenses 506-1 and 506-2). One of ordinary skill in the art will appreciate that the AR device 500 can include additional mechanical components, such as hinges configured to allow portions of the frame 504 of the AR device 500 to be folded and unfolded, a bridge configured to span the gap between the lenses 506-1 and 506-2 and rest on the user's nose, nose pads configured to rest on the bridge of the nose and provide support for the AR device 500, earpieces configured to rest on the user's ears and provide additional support for the AR device 500, temple arms 505 configured to extend from the hinges to the earpieces of the AR device 500, and the like. One of ordinary skill in the art will further appreciate that some examples of the AR device 500 can include none of the mechanical components described herein. For example, smart contact lenses configured to present AR to users may not include any components of the AR device 500.

The lenses 506-1 and 506-2 can be individual displays or display devices (e.g., a waveguide for projected representations). The lenses 506-1 and 506-2 may act together or independently to present an image or series of images to a user. In some embodiments, the lenses 506-1 and 506-2 can operate in conjunction with one or more display projector assemblies 507A and 507B to present image data to a user. While the AR device 500 includes two displays, embodiments of this disclosure may be implemented in AR devices with a single near-eye display (NED) or more than two NEDs.

The AR device 500 includes electronic components, many of which will be described in more detail below with respect to FIG. 5C. Some example electronic components are illustrated in FIG. 5A, including sensors 523-1, 523-2, 523-3, 523-4, 523-5, and 523-6, which can be distributed along a substantial portion of the frame 504 of the AR device 500. The distinct types of sensors are described below in reference to FIG. 5C. The AR device 500 also includes a left camera 539A and a right camera 539B, which are located on different sides of the frame 504. And the eyewear device includes one or more processors 548A and 548B (e.g., an integral microprocessor, such as an ASIC) that is embedded into a portion of the frame 504.

FIGS. 5B-1 and 5B-2 show an example visual depiction of the VR device 510 (e.g., a head-mounted display (HMD) 512, also referred to herein as an AR headset, a head-wearable device, or a VR headset). The HMD 512 includes a front body 514 and a frame 516 (e.g., a strap or band) shaped to fit around a user's head. In some embodiments, the front body 514 and/or the frame 516 includes one or more electronic elements for facilitating presentation of and/or interactions with an AR and/or VR system (e.g., displays, processors (e.g., processor 548A-1), IMUs, tracking emitters or detectors, or sensors). In some embodiments, the HMD 512 includes output audio transducers (e.g., an audio transducer 518-1), as shown in FIG. 5B-2. In some embodiments, one or more components, such as the output audio transducer(s) 518 and the frame 516, can be configured to attach and detach (e.g., are detachably attachable) to the HMD 512 (e.g., a portion or all of the frame 516 and/or the output audio transducer 518), as shown in FIG. 5B-2. In some embodiments, coupling a detachable component to the HMD 512 causes the detachable component to come into electronic communication with the HMD 512. The VR device 510 includes electronic components, many of which will be described in more detail below with respect to FIG. 5C.

FIGS. 5B-1 and 5B-2 also show that the VR device 510 having one or more cameras, such as the left camera 539A and the right camera 539B, which can be analogous to the left and right cameras on the frame 504 of the AR device 500. In some embodiments, the VR device 510 includes one or more additional cameras (e.g., cameras 539C and 539D), which can be configured to augment image data obtained by the cameras 539A and 539B by providing more information. For example, the camera 539C can be used to supply color information that is not discerned by cameras 539A and 539B. In some embodiments, one or more of the cameras 539A to 539D can include an optional IR cut filter configured to remove IR light from being received at the respective camera sensors.

The VR device 510 can include a housing 590 storing one or more components of the VR device 510 and/or additional components of the VR device 510. The housing 590 can be a modular electronic device configured to couple with the VR device 510 (or an AR device 500) and supplement and/or extend the capabilities of the VR device 510 (or an AR device 500). For example, the housing 590 can include additional sensors, cameras, power sources, and processors (e.g., processor 548A-2). to improve and/or increase the functionality of the VR device 510. Examples of the different components included in the housing 590 are described below in reference to FIG. 5C.

Alternatively, or in addition, in some embodiments, the head-wearable device, such as the VR device 510 and/or the AR device 500, includes, or is communicatively coupled to, another external device (e.g., a paired device), such as an HIPD 6 (discussed below in reference to FIGS. 6A-6B) and/or an optional neckband. The optional neckband can couple to the head-wearable device via one or more connectors (e.g., wired, or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 600, an optional neckband, and/or a wearable accessory device) with the head-wearable devices (e.g., an AR device 500 and/or a VR device 510) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 600) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 600, can process information generated by one or more of its sensors and/or information provided by other communicatively coupled devices. For example, a head-wearable device can include an IMU, and the intermediary processing device (a neckband and/or an HIPD 600) can compute all inertial and spatial calculations from the IMUs located on the head-wearable device. Additional examples of processing performed by a communicatively coupled device, such as the HIPD 600, are provided below in reference to FIGS. 6A and 6B.

AR systems may include a variety of types of visual feedback mechanisms. For example, display devices in the AR devices 500 and/or the VR devices 510 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 500 and/or the VR device 510 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 500 and the VR device 510, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 500 and/or the VR device 510 can include haptic feedback systems. The haptic feedback systems may provide several distinct types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 400, an HIPD 600, smart textile-based garment 700), and/or other devices described herein.

Figure 5C:
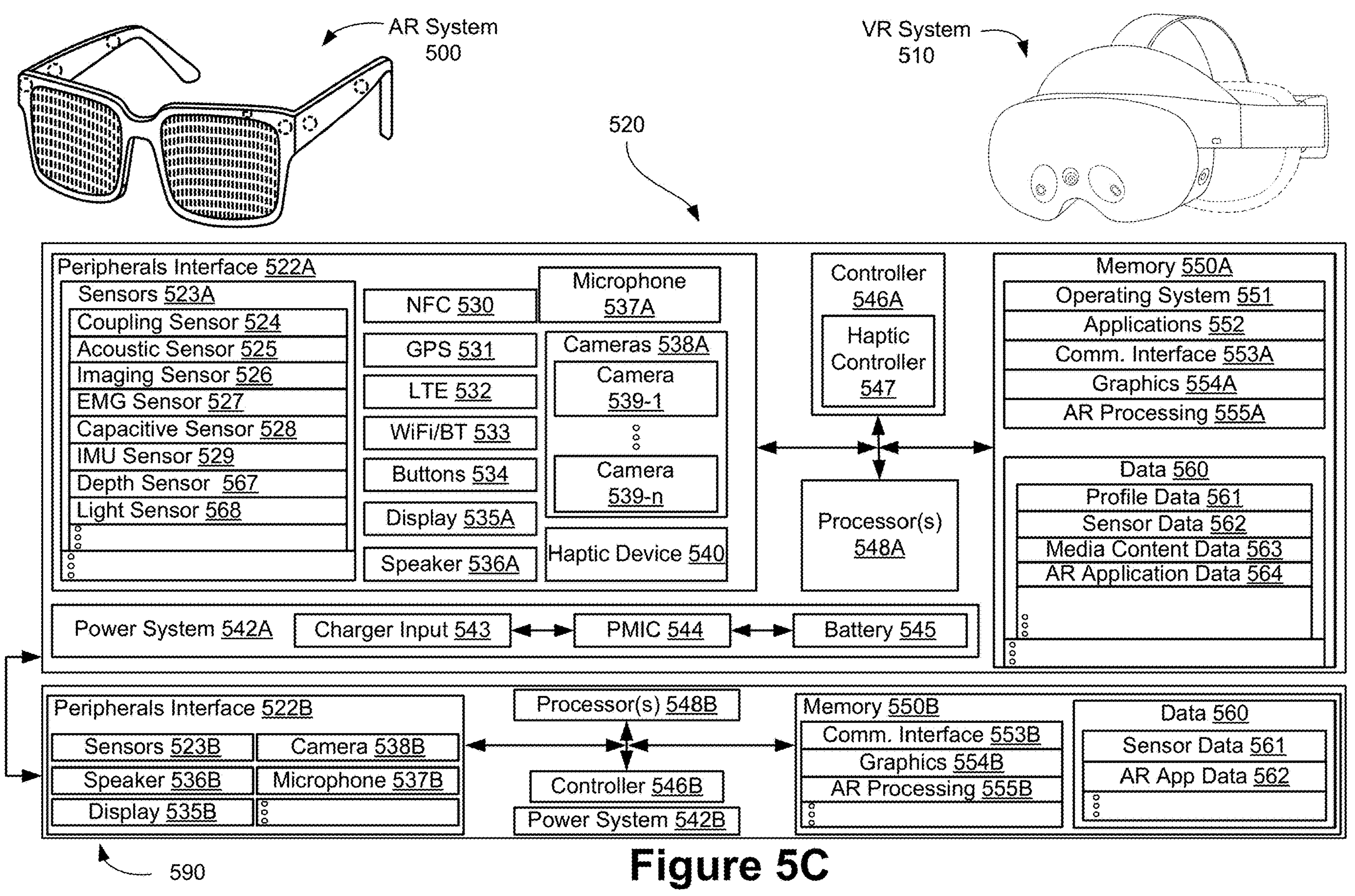

FIG. 5C illustrates a computing system 520 and an optional housing 590, each of which shows components that can be included in a head-wearable device (e.g., the AR device 500 and/or the VR device 510). In some embodiments, more or fewer components can be included in the optional housing 590 depending on practical restraints of the respective head-wearable device being described. Additionally, or alternatively, the optional housing 590 can include additional components to expand and/or augment the functionality of a head-wearable device.

In some embodiments, the computing system 520 and/or the optional housing 590 can include one or more peripheral interfaces 522A and 522B, one or more power systems 542A and 542B (including charger input 543, PMIC 544, and battery 545), one or more controllers 546A and 546B (including one or more haptic controllers 547), one or more processors 548A and 548B (as defined above, including any of the examples provided), and memory 550A and 550B, which can all be in electronic communication with each other. For example, the one or more processors 548A and/or 548B can be configured to execute instructions stored in the memory 550A and/or 550B, which can cause a controller of the one or more controllers 546A and/or 546B to cause operations to be performed at one or more peripheral devices of the peripheral interfaces 522A and/or 522B. In some embodiments, each operation described can occur based on electrical power provided by the power system 542A and/or 542B.

In some embodiments, the peripherals interface 522A can include one or more devices configured to be part of the computing system 520, many of which have been defined above and/or described with respect to wrist-wearable devices shown in FIGS. 4A and 4B. For example, the peripherals interface can include one or more sensors 523A. Some example sensors include one or more coupling sensors 524, one or more acoustic sensors 525, one or more imaging sensors 526, one or more EMG sensors 527, one or more capacitive sensors 528, and/or one or more IMUs 529. In some embodiments, the sensors 523A further include depth sensors 567, light sensors 568, and/or any other types of sensors defined above or described with respect to any other embodiments discussed herein.

In some embodiments, the peripherals interface can include one or more additional peripheral devices, including one or more NFC devices 530, one or more GPS devices 531, one or more LTE devices 532, one or more Wi-Fi and/or Bluetooth devices 533, one or more buttons 534 (e.g., including buttons that are slidable or otherwise adjustable), one or more displays 535A, one or more speakers 536A, one or more microphones 537A, one or more cameras 538A (e.g., including the first camera 539-1 through nth camera 539-*n*, which are analogous to the left camera 539A and/or the right camera 539B), one or more haptic devices 540, and/or any other types of peripheral devices defined above or described with respect to any other embodiments discussed herein.

The head-wearable devices can include a variety of types of visual feedback mechanisms (e.g., presentation devices). For example, display devices in the AR device 500 and/or the VR device 510 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 535A can be coupled to each of the lenses 506-1 and 506-2 of the AR device 500. The displays 535A coupled to each of the lenses 506-1 and 506-2 can act together or independently to present an image or series of images to a user. In some embodiments, the AR device 500 and/or the VR device 510 includes a single display 535A (e.g., a near-eye display) or more than two displays 535A.

In some embodiments, a first set of one or more displays 535A can be used to present an augmented-reality environment, and a second set of one or more display devices 535A can be used to present a VR environment. In some embodiments, one or more waveguides are used in conjunction with presenting AR content to the user of the AR device 500 and/or the VR device 510 (e.g., as a means of delivering light from a display projector assembly and/or one or more displays 535A to the user's eyes). In some embodiments, one or more waveguides are fully or partially integrated into the AR device 500 and/or the VR device 510. Additionally, or alternatively, to display screens, some AR systems include one or more projection systems. For example, display devices in the AR device 500 and/or the VR device 510 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 535A.

In some embodiments of the head-wearable devices, ambient light and/or a real-world live view (e.g., a live feed of the surrounding environment that a user would normally sec) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 535A for presenting information to users. For example, an external display 535A can be used to show a current battery level, network activity (e.g., connected, disconnected), current activity (e.g., playing a game, in a call, in a meeting, or watching a movie), and/or other relevant information. In some embodiments, the external displays 535A can be used to communicate with others. For example, a user of the head-wearable device can cause the external displays 535A to present a "do not disturb" notification. The external displays 535A can also be used by the user to share any information captured by the one or more components of the peripherals interface 522A and/or generated by the head-wearable device (e.g., during operation and/or performance of one or more applications).

The memory 550A can include instructions and/or data executable by one or more processors 548A (and/or processors 548B of the housing 590) and/or a memory controller of the one or more controllers 546A (and/or controller 546B of the housing 590). The memory 550A can include one or more operating systems 551, one or more applications 552, one or more communication interface modules 553A, one or more graphics modules 554A, one or more AR processing modules 555A, and/or any other types of modules or components defined above or described with respect to any other embodiments discussed herein.

The data 560 stored in memory 550A can be used in conjunction with one or more of the applications and/or programs discussed above. The data 560 can include profile data 561, sensor data 562, media content data 563, AR application data 564, and/or any other types of data defined above or described with respect to any other embodiments discussed herein.

In some embodiments, the controller 546A of the head-wearable devices processes information generated by the sensors 523A on the head-wearable devices and/or another component of the head-wearable devices and/or communicatively coupled with the head-wearable devices (e.g., components of the housing 590, such as components of peripherals interface 522B). For example, the controller 546A can process information from the acoustic sensors 525 and/or image sensors 526. For each detected sound, the controller 546A can perform a direction of arrival (DOA) estimation to estimate a direction from which the detected sound arrived at a head-wearable device. As one or more of the acoustic sensors 525 detect sounds, the controller 546A can populate an audio data set with the information (e.g., represented by sensor data 562).

In some embodiments, a physical electronic connector can convey information between the head-wearable devices and another electronic device, and/or between one or more processors 548A of the head-wearable devices and the controller 546A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 600) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 500 and/or the VR device 510 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 5B-1 and 5B-2 show the VR device 510 having cameras 539A-539D, which can be used to provide depth information for creating a voxel field and a 2D mesh to provide object information to the user to avoid collisions.

The optional housing 590 can include analogous components to those describe above with respect to the computing system 520. For example, the optional housing 590 can include a respective peripherals interface 522B, including more or fewer components to those described above with respect to the peripherals interface 522A. As described above, the components of the optional housing 590 can be used to augment and/or expand on the functionality of the head-wearable devices. For example, the optional housing 590 can include respective sensors 523B, speakers 536B, displays 535B, microphones 537B, cameras 538B, and/or other components to capture and/or present data. Similarly, the optional housing 590 can include one or more processors 548B, controllers 546B, and/or memory 550B (including respective communication interface modules 553B, one or more graphics modules 554B, one or more AR processing modules 555B) that can be used individually and/or in conjunction with the components of the computing system 520.

The techniques described above in FIGS. 5A-5C can be used with different head-wearable devices. In some embodiments, the head-wearable devices (e.g., the AR device 500 and/or the VR device 510) can be used in conjunction with one or more wearable devices such as a wrist-wearable device 400 (or components thereof) and/or a smart textile-based garment 700 (FIGS. 7A-7C), as well as an HIPD 600. Having thus described example the head-wearable devices, attention will now be turned to example handheld intermediary processing devices, such as HIPD 600.

Example Handheld Intermediary Processing Devices

Figure 6A:
FIGS. 6A to 6B illustrate an example handheld intermediary processing device, in accordance with some embodiments.
Figure 6A:
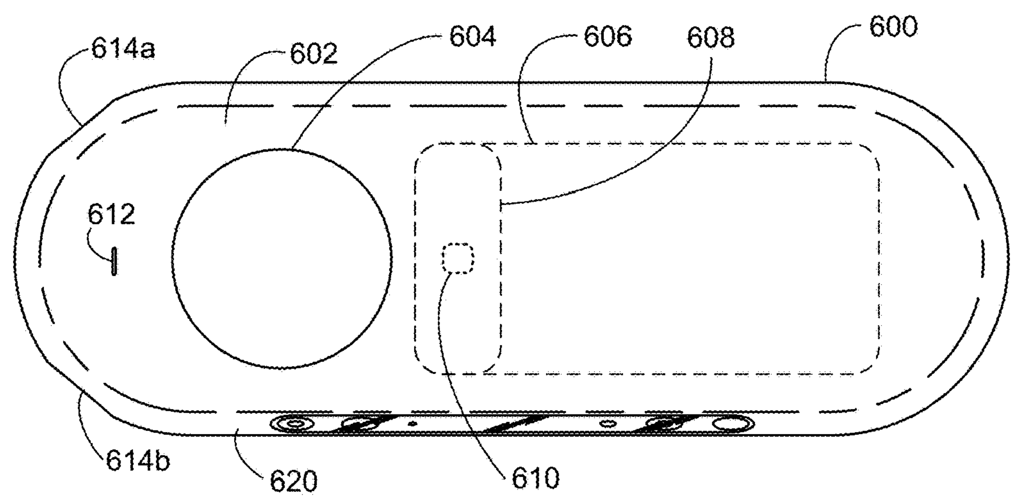
Figure 6A:
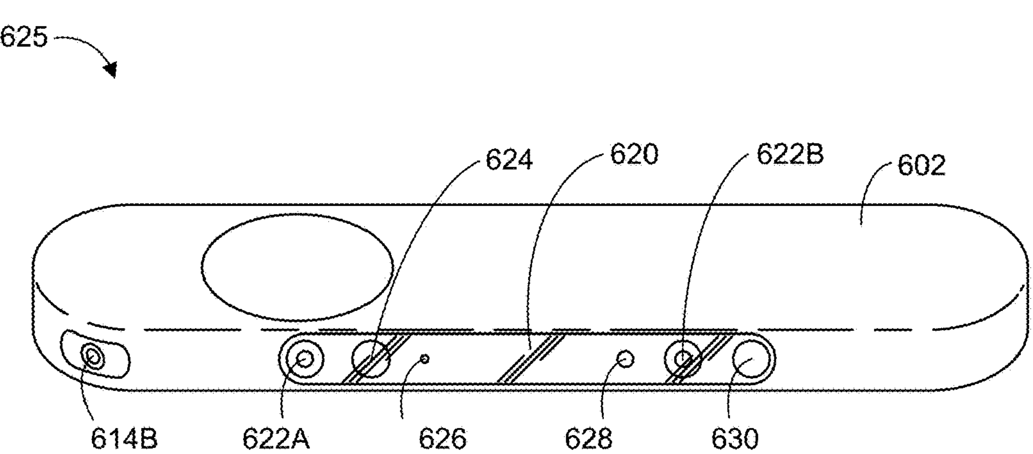
Figure 6B:
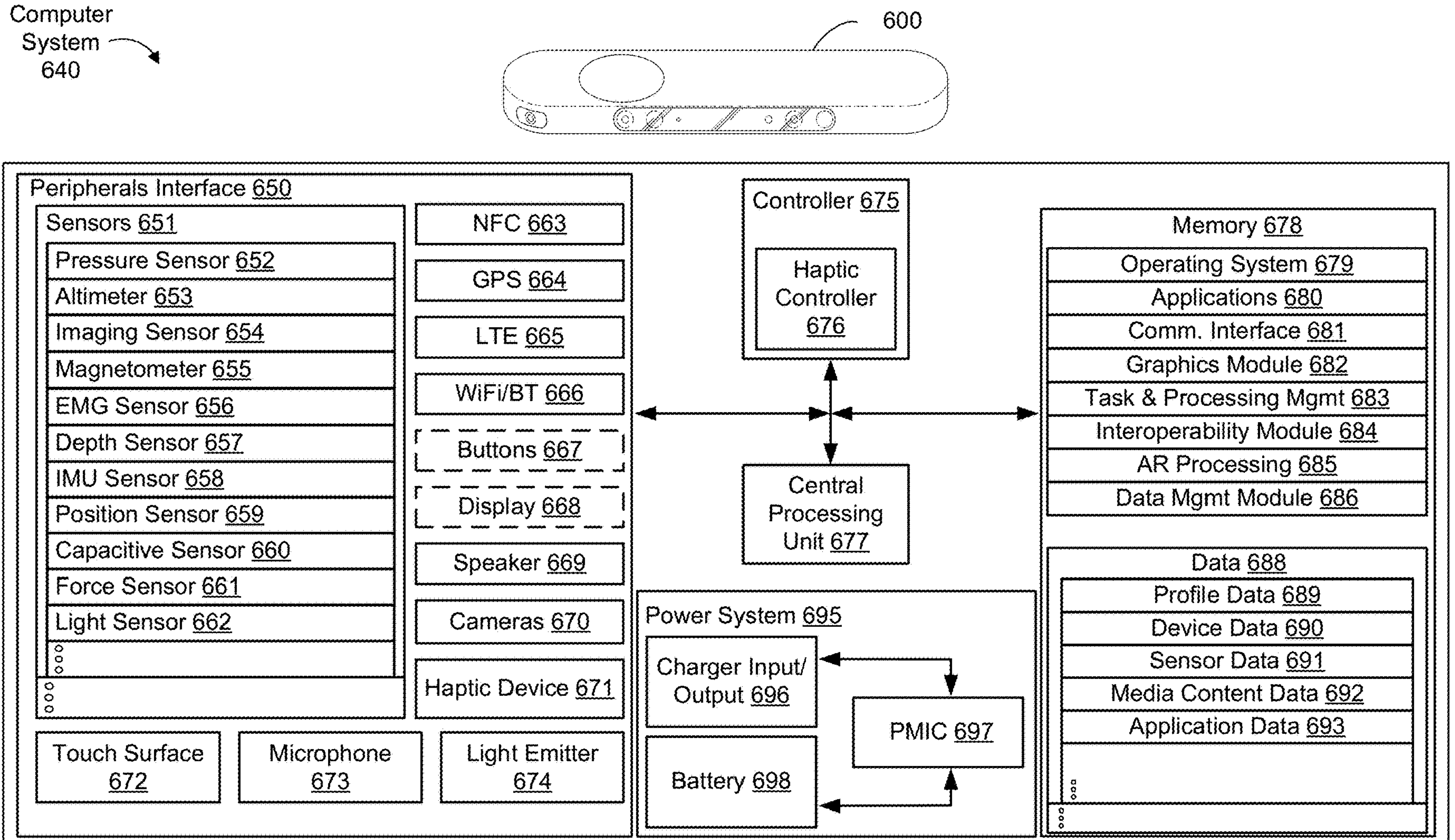

FIGS. 6A and 6B illustrate an example handheld intermediary processing device (HIPD) 600, in accordance with some embodiments. The HIPD 600 can perform various functions and/or operations associated with navigating through user interfaces and selectively opening applications, as well as the functions and/or operations described above with reference to FIGS. 1A to 1F. For example, in accordance with some embodiments, data obtained by the HIPD 600 can be used (e.g., in combination with data obtained by the wrist-wearable device 400) to identify one or more target inputs corresponding to a respective sequence of handwriting motions that the user 302 is performing, and/or to identify devolved sequences of handwriting motions and/or refined devolved sequences of handwriting motions corresponding to such sequences.

FIG. 6A shows a top view 605 and a side view 625 of the HIPD 600. The HIPD 600 is configured to communicatively couple with one or more wearable devices (or other electronic devices) associated with a user. For example, the HIPD 600 is configured to communicatively couple with the wrist-wearable device 400 (or components thereof, such as the watch body 420 and the wearable band 410), AR device 500, and/or VR device 510. The HIPD 600 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 600 can successfully be communicatively coupled with an electronic device, such as a wearable device).

The HIPD 600 can perform various functions independently and/or in conjunction with one or more wearable devices (e.g., wrist-wearable device 400, AR device 500, and/or VR device 510). The HIPD 600 is configured to increase and/or improve the functionality of communicatively coupled devices, such as the wearable devices. The HIPD 600 is configured to perform one or more functions or operations associated with interacting with user interfaces and applications of communicatively coupled devices, interacting with an AR environment, interacting with a VR environment, and/or operating as a human-machine interface controller. Additionally, as will be described in more detail below, functionality and/or operations of the HIPD 600 can include, without limitation, task offloading and/or handoffs, thermals offloading and/or handoffs, 6 degrees of freedom (6DoF) raycasting and/or gaming (e.g., using imaging devices or cameras 614A and 614B, which can be used for simultaneous localization and mapping (SLAM), and/or with other image processing techniques), portable charging; messaging, image capturing via one or more imaging devices or cameras (e.g., cameras 622A and 622B), sensing user input (e.g., sensing a touch on a multi-touch input surface 602), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 600 and/or in communication between the HIPD 600 and another wearable device described herein. In some embodiments, functions can be executed on the HIPD 600 in conjunction with an AR environment. As the skilled artisan will appreciate upon reading the descriptions provided herein, the novel HIPD 600 described herein can be used with any type of suitable AR environment.

While the HIPD 600 is communicatively coupled with a wearable device and/or other electronic device, the HIPD 600 is configured to perform one or more operations initiated at the wearable device and/or the other electronic device. In particular, one or more operations of the wearable device and/or the other electronic device can be offloaded to the HIPD 600 to be performed. The HIPD 600 performs one or more operations of the wearable device and/or the other electronic device and provides data corresponding to the completed operations to the wearable device and/or the other electronic device. For example, a user can initiate a video stream using the AR device 500 and back-end tasks associated with performing the video stream (e.g., video rendering) can be offloaded to the HIPD 600, which the HIPD 600 performs and provides corresponding data to the AR device 500 to perform remaining front-end tasks associated with the video stream (e.g., presenting the rendered video data via a display of the AR device 500). In this way, the HIPD 600, which has more computational resources and greater thermal headroom than a wearable device can perform computationally intensive tasks for the wearable device, improving performance of an operation performed by the wearable device.

The HIPD 600 includes a multi-touch input surface 602 on a first side (e.g., a front surface) that is configured to detect one or more user inputs. In particular, the multi-touch input surface 602 can detect single-tap inputs, multi-tap inputs, swipe gestures and/or inputs, force-based and/or pressure-based touch inputs, held taps, and the like. The multi-touch input surface 602 is configured to detect capacitive touch inputs and/or force (and/or pressure) touch inputs. The multi-touch input surface 602 includes a first touch-input surface 604 defined by a surface depression, and a second touch-input surface 606 defined by a substantially planar portion. The first touch-input surface 604 can be disposed adjacent to the second touch-input surface 606. In some embodiments, the first touch-input surface 604 and the second touch-input surface 606 can be different dimensions, shapes, and/or cover different portions of the multi-touch input surface 602. For example, the first touch-input surface 604 can be substantially circular and the second touch-input surface 606 is substantially rectangular. In some embodiments, the surface depression of the multi-touch input surface 602 is configured to guide user handling of the HIPD 600. In particular, the surface depression is configured such that the user holds the HIPD 600 upright when held in a single hand (e.g., such that the using imaging devices or cameras 614A and 614B are pointed toward a ceiling or the sky). Additionally, the surface depression is configured such that the user's thumb rests within the first touch-input surface 604.

In some embodiments, the different touch-input surfaces include a plurality of touch-input zones. For example, the second touch-input surface 606 includes at least a first touch-input zone 608 within a second touch-input zone 606 and a third touch-input zone 610 within the first touch-input zone 608. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 608 causes the HIPD 600 to perform a first command and a user input detected within the second touch-input zone 606 causes the HIPD 600 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 608 can be configured to detect force touch inputs (e.g., a magnitude at which the user presses down) and capacitive touch inputs, and the second touch-input zone 606 can be configured to detect capacitive touch inputs.

The HIPD 600 includes one or more sensors 651 for sensing data used in the performance of one or more operations and/or functions. For example, the HIPD 600 can include an IMU that is used in conjunction with cameras 614 for 3-dimensional object manipulation (e.g., enlarging, moving, destroying, etc. an object) in an AR or VR environment. Non-limiting examples of the sensors 651 included in the HIPD 600 include a light sensor, a magnetometer, a depth sensor, a pressure sensor, and a force sensor. Additional examples of the sensors 651 are provided below in reference to FIG. 6B.

The HIPD 600 can include one or more light indicators 612 to provide one or more notifications to the user. In some embodiments, the light indicators are LEDs or other types of illumination devices. The light indicators 612 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 604. The light indicators can be illuminated in distinct colors and/or patterns to provide the user with one or more notifications and/or information about the device. For example, a light indicator positioned around the first touch-input surface 604 can flash when the user receives a notification (e.g., a message), change red when the HIPD 600 is out of power, operate as a progress bar (e.g., a light ring that is closed when a task is completed (e.g., 0% to 100%)), operates as a volume indicator, etc.).

In some embodiments, the HIPD 600 includes one or more additional sensors on another surface. For example, as shown FIG. 6A, HIPD 600 includes a set of one or more sensors (e.g., sensor set 620) on an edge of the HIPD 600. The sensor set 620, when positioned on an edge of the of the HIPD 600, can be pe positioned at a predetermined tilt angle (e.g., 26 degrees), which allows the sensor set 620 to be angled toward the user when placed on a desk or other flat surface. Alternatively, in some embodiments, the sensor set 620 is positioned on a surface opposite the multi-touch input surface 602 (e.g., a back surface). The one or more sensors of the sensor set 620 are discussed in detail below.

The side view 625 of the of the HIPD 600 shows the sensor set 620 and camera 614B. The sensor set 620 includes one or more cameras 622A and 622B, a depth projector 624, an ambient light sensor 628, and a depth receiver 630. In some embodiments, the sensor set 620 includes a light indicator 626. The light indicator 626 can operate as a privacy indicator to let the user and/or those around them know that a camera and/or microphone is active. The sensor set 620 is configured to capture a user's facial expression such that the user can puppet a custom avatar (e.g., showing emotions, such as smiles, laughter, etc., on the avatar or a digital representation of the user). The sensor set 620 can be configured as a side stereo RGB system, a rear indirect Time-of-Flight (iToF) system, or a rear stereo RGB system. As the skilled artisan will appreciate upon reading the descriptions provided herein, the novel HIPD 600 described herein can use different sensor set 620 configurations and/or sensor set 620 placement.

In some embodiments, the HIPD 600 includes one or more haptic devices 671 (FIG. 6B; e.g., a vibratory haptic actuator) that are configured to provide haptic feedback (e.g., kinesthetic sensation). The sensors 651, and/or the haptic devices 671 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 600 is configured to operate without a display. However, in optional embodiments, the HIPD 600 can include a display 668 (FIG. 6B). The HIPD 600 can also income one or more optional peripheral buttons 667 (FIG. 6B). For example, the peripheral buttons 667 can be used to turn on or turn off the HIPD 600. Further, the HIPD 600 housing can be formed of polymers and/or elastomer elastomers. The HIPD 600 can be configured to have a non-slip surface to allow the HIPD 600 to be placed on a surface without requiring a user to watch over the HIPD 600. In other words, the HIPD 600 is designed such that it would not easily slide off a surfaces. In some embodiments, the HIPD 600 include one or magnets to couple the HIPD 600 to another surface. This allows the user to mount the HIPD 600 to different surfaces and provide the user with greater flexibility in use of the HIPD 600.

As described above, the HIPD 600 can distribute and/or provide instructions for performing the one or more tasks at the HIPD 600 and/or a communicatively coupled device. For example, the HIPD 600 can identify one or more back-end tasks to be performed by the HIPD 600 and one or more front-end tasks to be performed by a communicatively coupled device. While the HIPD 600 is configured to offload and/or handoff tasks of a communicatively coupled device, the HIPD 600 can perform both back-end and front-end tasks (e.g., via one or more processors, such as CPU 67; FIG. 6B). The HIPD 600 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 600 can perform the above operations alone or in conjunction with a wearable device (or other communicatively coupled electronic device).

FIG. 6B shows block diagrams of an HIPD computing system 640 of the HIPD 600, in accordance with some embodiments. The HIPD 600, described in detail above, can include one or more components shown in HIPD computing system 640. The HIPD 600 will be understood to include the components shown and described below for the HIPD computing system 640. In some embodiments, all, or a substantial portion of the components of the HIPD computing system 640 are included in a single integrated circuit. Alternatively, in some embodiments, components of the HIPD computing system 640 are included in a plurality of integrated circuits that are communicatively coupled.

The HIPD computing system 640 can include a processor (e.g., a CPU 67, a GPU, and/or a CPU with integrated graphics), a controller 675, a peripherals interface 650 that includes one or more sensors 651 and other peripheral devices, a power source (e.g., a power system 695), and memory (e.g., a memory 678) that includes an operating system (e.g., an operating system 679), data (e.g., data 688), one or more applications (e.g., applications 680), and one or more modules (e.g., a communications interface module 681, a graphics module 682, a task and processing management module 683, an interoperability module 684, an AR processing module 685, a data management module 686, etc.). The HIPD computing system 640 further includes a power system 695 that includes a charger input and output 696, a PMIC 697, and a battery 698, all of which are defined above.

In some embodiments, the peripherals interface 650 can include one or more sensors 651. The sensors 651 can include analogous sensors to those described above in reference to FIG. 4B. For example, the sensors 651 can include imaging sensors 654, (optional) EMG sensors 656, IMUs 658, and capacitive sensors 660. In some embodiments, the sensors 651 can include one or more pressure sensor 652 for sensing pressure data, an altimeter 653 for sensing an altitude of the HIPD 600, a magnetometer 655 for sensing a magnetic field, a depth sensor 657 (or a time-of flight sensor) for determining a difference between the camera and the subject of an image, a position sensor 659 (e.g., a flexible position sensor) for sensing a relative displacement or position change of a portion of the HIPD 600, a force sensor 661 for sensing a force applied to a portion of the HIPD 600, and a light sensor 662 (e.g., an ambient light sensor) for detecting an amount of lighting. The sensors 651 can include one or more sensors not shown in FIG. 6B.

Analogous to the peripherals described above in reference to FIGS. 4B, the peripherals interface 650 can also include an NFC component 663, a GPS component 664, an LTE component 665, a Wi-Fi and/or Bluetooth communication component 666, a speaker 669, a haptic device 671, and a microphone 673. As described above in reference to FIG. 6A, the HIPD 600 can optionally include a display 668 and/or one or more buttons 667. The peripherals interface 650 can further include one or more cameras 670, touch surfaces 672, and/or one or more light emitters 674. The multi-touch input surface 602 described above in reference to FIG. 6A is an example of touch surface 672. The light emitters 674 can be one or more LEDs, lasers, etc. and can be used to project or present information to a user. For example, the light emitters 674 can include light indicators 612 and 626 described above in reference to FIG. 6A. The cameras 670 (e.g., cameras 614A, 614B, and 622 described above in FIG. 6A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 670 can be used for SLAM; 6 DoF ray casting, gaming, object manipulation, and/or other rendering; facial recognition and facial expression recognition, etc.

Similar to the watch body computing system 460 and the watch band computing system 430 described above in reference to FIG. 4B, the HIPD computing system 640 can include one or more haptic controllers 676 and associated componentry (e.g., haptic devices 671) for providing haptic events at the HIPD 600.

Memory 678 can include high-speed random-access memory and/or non-volatile memory, such as one or more magnetic disk storage devices, flash memory devices, or other non-volatile solid-state memory devices. Access to the memory 678 by other components of the HIPD 600, such as the one or more processors and the peripherals interface 650, can be controlled by a memory controller of the controllers 675.

In some embodiments, software components stored in the memory 678 include one or more operating systems 679, one or more applications 680, one or more communication interface modules 681, one or more graphics modules 682, one or more data management modules 685, which are analogous to the software components described above in reference to FIG. 4B.

In some embodiments, software components stored in the memory 678 include a task and processing management module 683 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 683 uses data 688 (e.g., device data 690) to distribute the one or more front-end and/or back-end tasks based on communicatively coupled devices' computing resources, available power, thermal headroom, ongoing operations, and/or other factors. For example, the task and processing management module 683 can cause the performance of one or more back-end tasks (of an operation performed at communicatively coupled AR device 500) at the HIPD 600 in accordance with a determination that the operation is utilizing a predetermined amount (e.g., at least 70%) of computing resources available at the AR device 500.

In some embodiments, software components stored in the memory 678 include an interoperability module 684 for exchanging and utilizing information received and/or provided to distinct communicatively coupled devices. The interoperability module 684 allows for different systems, devices, and/or applications to connect and communicate in a coordinated way without user input. In some embodiments, software components stored in the memory 678 include an AR module 685 that is configured to process signals based at least on sensor data for use in an AR and/or VR environment. For example, the AR processing module 685 can be used for 3D object manipulation, gesture recognition, facial and facial expression, recognition, etc.

The memory 678 can also include data 687, including structured data. In some embodiments, the data 687 can include profile data 688, device data 689 (including device data of one or more devices communicatively coupled with the HIPD 600, such as device type, hardware, software, configurations, etc.), sensor data 691, media content data 692, application data 693.

It should be appreciated that the HIPD computing system 640 is an example of a computing system within the HIPD 600, and that the HIPD 600 can have more or fewer components than shown in the HIPD computing system 640, combine two or more components, and/or have a different configuration and/or arrangement of the components. The various components shown in HIPD computing system 640 are implemented in hardware, software, firmware, or a combination thereof, including one or more signal processing and/or application-specific integrated circuits.

Figure 7B:
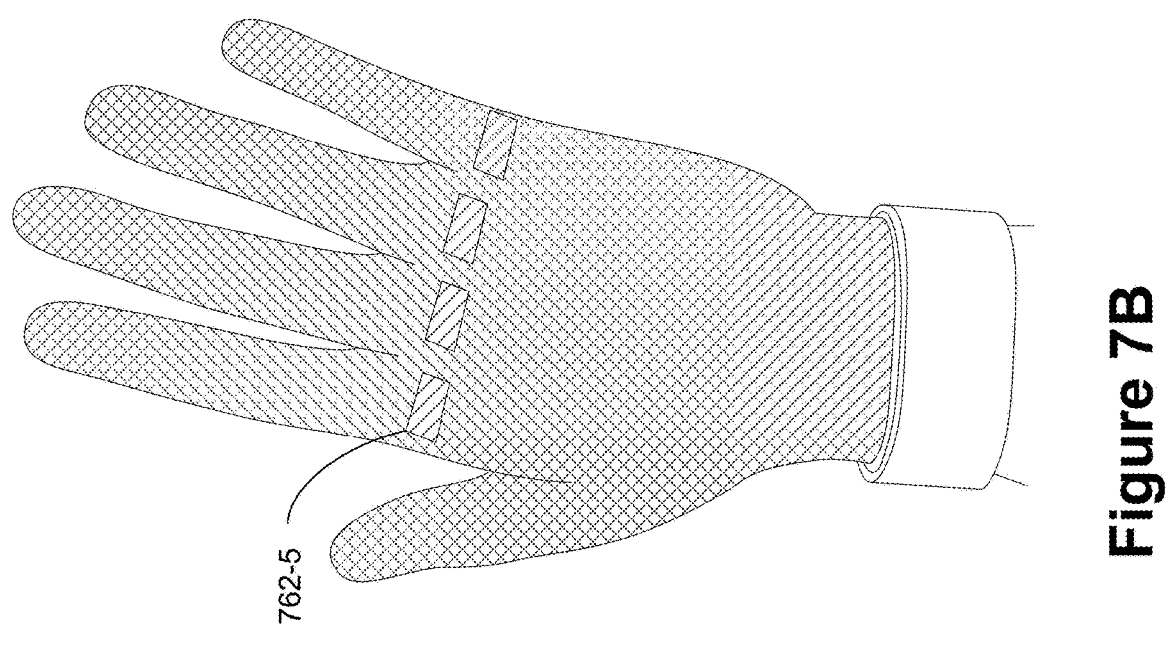
FIGS. 7A to 7C illustrate an example smart textile-based garment, in accordance with some embodiments.
Figure 7A:
Figure 7A:
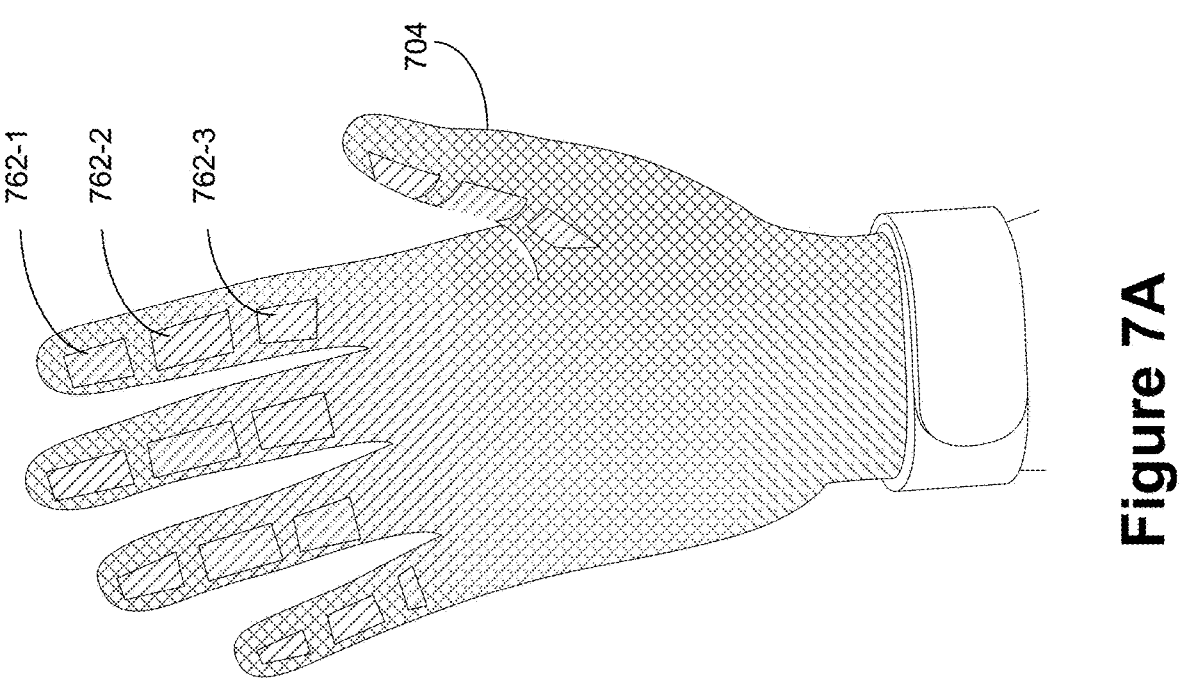
Figure 7C:
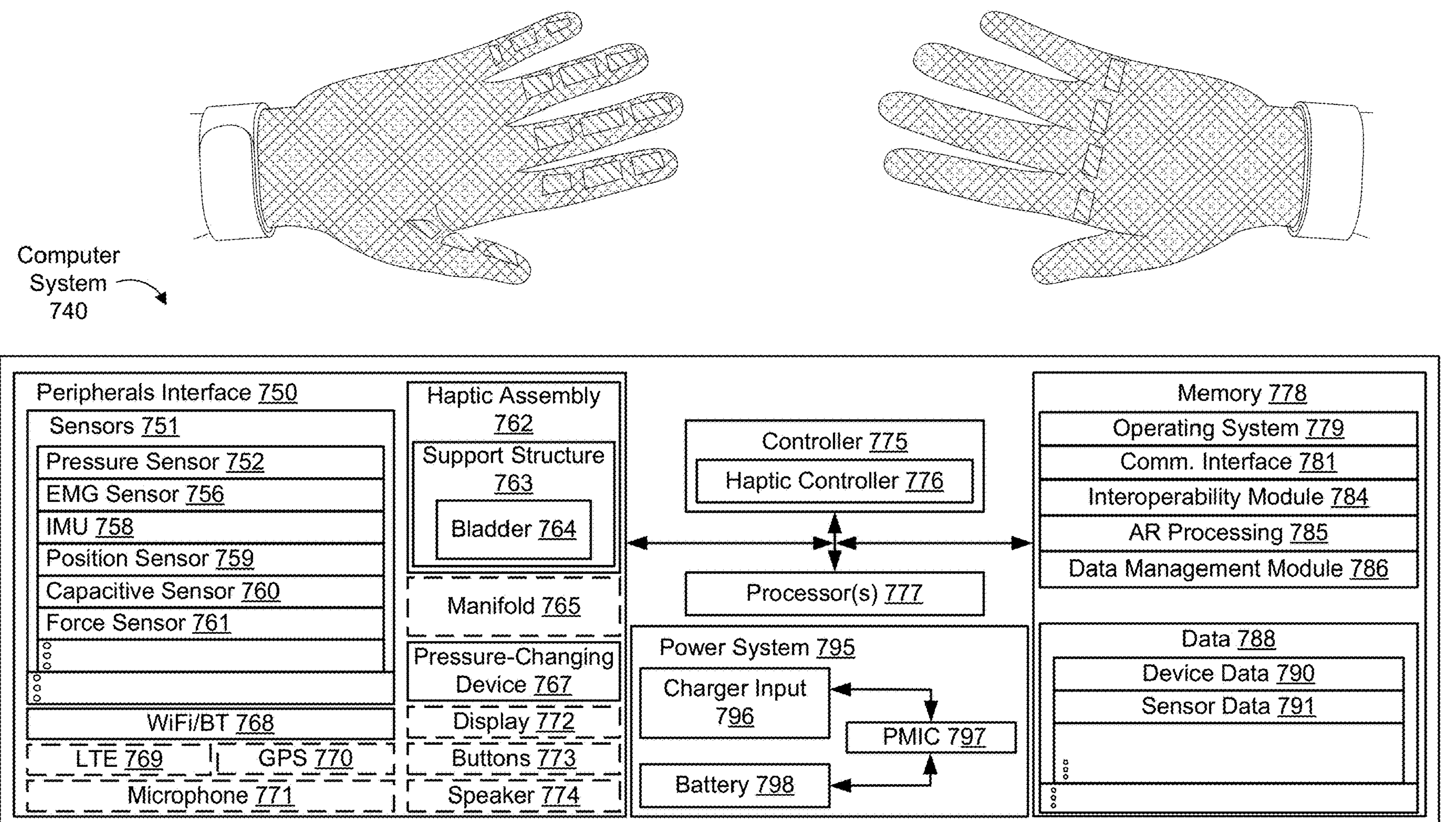

The techniques described above in FIG. 6A-6B can be used with any device used as a human-machine interface controller. In some embodiments, an HIPD 600 can be used in conjunction with one or more wearable device such as a head-wearable device (e.g., AR device 500 and VR device 510) and/or a wrist-wearable device 400 (or components thereof). In some embodiments, an HIPD 600 can also be used in conjunction with a wearable garment, such as smart textile-based garment 700 (FIGS. 7A-7C). Having thus described example HIPD 600, attention will now be turned to example feedback devices, such as smart textile-based garment 700.

Example Smart Textile-Based Garments

FIGS. 7A and 7B illustrate an example smart textile-based garment, in accordance with some embodiments. The smart textile-based garment 700 (e.g., wearable gloves, a shirt, a headband, a wristbands, socks, etc.) is configured to communicatively couple with one or more electronic devices, such as a wrist-wearable device 400, a head-wearable device, an HIPD 600, a laptop, tablet, and/or other computing devices. The smart textile-based garment 700 can perform various functions and/or operations associated with navigating through user interfaces and selectively opening applications, as well as the functions and/or operations described above with reference to FIGS. 1A to 1F. That is, in some embodiments, the smart textile-based garment 700 may be used instead of or in addition to the wrist-wearable device 400 for detecting sequences of handwriting motions, and/or providing feedback to the user 302 about sequences of handwriting motions that have been performed.

The smart textile-based garment 700 can be part of an AR system, such as AR system 300*d* described above in reference to FIGS. 3D-1 and 3D-2. The smart textile-based garment 700 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 700 receives instructions from a communicatively coupled device (e.g., the wrist-wearable device 400, a head-wearable device, and HIPD 600, etc.) for causing the performance of a feedback response. Alternatively, or in addition, in some embodiments, the smart textile-based garment 700 determines one or more feedback responses to provide a user. The smart textile-based garment 700 can determine the one or more feedback responses based on sensor data captured by one or more of its sensors (e.g., sensors 751; FIG. 7C) or communicatively coupled sensors (e.g., sensors of a wrist-wearable device 400, a head-wearable device, an HIPD 600, and/or another computing device that is part of the relevant computing system).

Non-limiting examples of the feedback determined by the smart textile-based garment 700 and/or a communicatively coupled device include visual feedback, audio feedback, haptic (e.g., tactile, kinesthetic, etc.) feedback, thermal or temperature feedback, and/or other sensory perceptible feedback. The smart textile-based garment 700 can include respective feedback devices (e.g., a haptic device or assembly 762 or other feedback devices or assemblies) to provide the feedback responses to the user. Similarly, the smart textile-based garment 700 can communicatively couple with another device (and/or the other device's feedback devices) to coordinate the feedback provided to the user. For example, a VR device 510 can present an AR environment to a user and as the user interacts with objects within the AR environment, such as a virtual cup, the smart textile-based garment 700 provides respective response to the user. In particular, the smart textile-based garment 700 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally or alternatively, in some embodiments, the smart textile-based garment 700 is configured to operate as a controller configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 1A to 2.

FIG. 7A shows one or more haptic assemblies 762 (e.g., first through fourth haptic assemblies 762-1 through 762-4) on a portion of the smart textile-based garment 700 adjacent to a palmar side of the user's hand and FIG. 7B shows additional haptic assemblies (e.g., a fifth haptic assembly 762-5) on a portion of the smart textile-based garment 700 adjacent to a dorsal side of the user's hand. In some embodiments, the haptic assemblies 762 include a mechanism that, at a minimum, provide resistance when a respective haptic assembly 762 is transitioned from a first state (e.g., a first pressurized state (e.g., at atmospheric pressure or deflated)) to a second state (e.g., a second pressurized state (e.g., inflated to a threshold pressure)). In other words, the haptic assemblies 762 described can transition between a first pressurized state and a second pressurized state to provide haptic feedback to the user. Structures of haptic assemblies 762 can be integrated into various devices configured to be in contact or proximity to a user's skin, including, but not limited to devices such as glove worn devices, body worn clothing device, headset devices. Each of the haptic assemblies 762 can be included in or physically coupled to a garment component 704 of the smart textile-based garment 700. For example, each of the haptic assemblies 762-1, 762-2, 762-3, . . . 762-N that are physically coupled to the garment component 704 are configured to contact respective phalanges of a user's thumb and fingers.

Due to the ever-changing nature of artificial-reality, the haptic assemblies 762 may be required to transition between the multiple states hundreds, or perhaps thousands of times, during a single use. Thus, the haptic assemblies 762 described herein are durable and designed to quickly transition from state to state. To provide some context, in a first pressurized state, the haptic assemblies 762 do not impede free movement of a portion of the wearer's body. For example, one or more haptic assemblies 762 incorporated into a glove are made from flexible materials that do not impede free movement of the wearer's hand and fingers (e.g., an electrostatic-zipping actuator). The haptic assemblies 762 are configured to conform to a shape of the portion of the wearer's body when in the first pressurized state. However, once in a second pressurized state, the haptic assemblies 762 can be configured to restrict and/or impede free movement of the portion of the wearer's body (e.g., appendages of the user's hand). For example, the respective haptic assembly 762 (or multiple respective haptic assemblies) can restrict movement of a wearer's finger (e.g., prevent the finger from curling or extending) when the haptic assembly 762 is in the second pressurized state. Moreover, once in the second pressurized state, the haptic assemblies 762 may take different shapes, with some haptic assemblies 762 configured to take a planar, rigid shape (e.g., flat, and rigid), while some other haptic assemblies 762 are configured to curve or bend, at least partially.

The smart textile-based garment 700 can be one of a plurality of devices in an AR system (e.g., AR systems of FIGS. 3A-3D-2). For example, a user can wear a pair of gloves (e.g., a first type of smart textile-based garment 700), wear a haptics component of a wrist-wearable device 400 (FIGS. 4A-4B), wear a headband (e.g., a second type of smart textile-based garment 700), hold an HIPD 600, etc. As explained above, the haptic assemblies 762 are configured to provide haptic simulations to a wearer of the smart textile-based garments 700. The garment component 704 of each smart textile-based garment 700 can be one of various articles of clothing (e.g., gloves, socks, shirts, pants, etc.). Thus, a user may wear multiple smart textile-based garments 700 that are each configured to provide haptic stimulations to respective parts of the body where the smart textile-based garments 700 are being worn. Although the smart textile-based garment 700 are described as an individual device, in some embodiments, the smart textile-based garment 700 can be combined with other wearable devices described herein. For example, the smart textile-based garment 700 can form part of a VR device 510 (e.g., a headband portion).

FIG. 7C shows block diagrams of a computing system 740 of the haptic assemblies 762, in accordance with some embodiments. The computing system 740 can include one or more peripheral interfaces 750, one or more power systems 795 (including charger input 796, PMIC 797, and battery 798), one or more controllers 775 (including one or more haptic controllers 776), one or more processors 777 (as defined above, including any of the examples provided), and memory 778, which can all be in electronic communication with each other. For example, the one or more processors 77 can be configured to execute instructions stored in the memory 778, which can cause a controller of the one or more controllers 775 to cause operations to be performed at one or more peripheral devices of the peripherals interface 750. In some embodiments, each operation described can occur based on electrical power provided by the power system 795.

In some embodiments, the peripherals interface 750 can include one or more devices configured to be part of the computing system 740, many of which have been defined above and/or described with respect to wrist-wearable devices shown in FIGS. 4A-6B. For example, the peripherals interface 750 can include one or more sensors 751, such as one or more pressure sensors 752, one or more EMG sensors 756, one or more IMUs 758, one or more position sensors 759, one or more capacitive sensors 760, one or more force sensors 761; and/or any other types of sensors defined above or described with respect to any other embodiments discussed herein. In some embodiments, the peripherals interface can include one or more additional peripheral devices, including one or more Wi-Fi and/or Bluetooth devices 768, an LTE component 769, a GPS component 770, a microphone 771, one or more haptic assemblies 762, one or more support structures 763 (which can include one or more bladders 764, one or more manifolds 765, one or more pressure-changing devices 767, one or more displays 772, one or more buttons 773, one or more speakers 774, and/or any other types of peripheral devices defined above or described with respect to any other embodiments discussed herein. In some embodiments, computing system 740 includes more or fewer components than those shown in FIG. 7C.

In some embodiments, each haptic assembly 762 includes a support structure 763 and at least one bladder 764. The bladder 764 (e.g., a membrane) is a sealed, inflatable pocket made from a durable and puncture-resistant material, such as thermoplastic polyurethane (TPU), a flexible polymer, or the like. The bladder 764 contains a medium (e.g., a fluid such as air, inert gas, or even a liquid) that can be added to or removed from the bladder 764 to change pressure (e.g., fluid pressure) inside the bladder 764. The support structure 763 is made from a material that is stronger and stiffer than the material of the bladder 764. A respective support structure 763 coupled to a respective bladder 764 is configured to reinforce the respective bladder 764 as the respective bladder changes shape and size due to changes in pressure (e.g., fluid pressure) inside the bladder. The above example haptic assembly 762 is non-limiting. The haptic assembly 762 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 700 also includes a haptic controller 776 and a pressure-changing device 767. Alternatively, in some embodiments, the computing system 740 is communicatively coupled with a haptic controller 776 and/or pressure-changing device 767 (e.g., in electronic communication with one or more processors 77 of the computing system 740). The haptic controller 776 is configured to control operation of the pressure-changing device 767, and in turn operation of the smart textile-based garments 700. For example, the haptic controller 776 sends one or more signals to the pressure-changing device 767 to activate the pressure-changing device 767 (e.g., turn it on and off). The one or more signals can specify a desired pressure (e.g., pounds per square inch) to be output by the pressure-changing device 767. Generation of the one or more signals, and in turn the pressure output by the pressure-changing device 767, can be based on information collected by sensors 751 of the smart textile-based garment 700 and/or other communicatively coupled device. For example, the haptic controller 776 can provide one or more signals, based on collected sensor data, to cause the pressure-changing device 767 to increase the pressure (e.g., fluid pressure) inside a first haptic assembly 762 at a first time, and provide one or more additional signals, based on additional sensor data, to the pressure-changing device 767, to cause the pressure-changing device 767 to further increase the pressure inside a second haptic assembly 762 at a second time after the first time. Further, the haptic controller 776 can provide one or more signals to cause the pressure-changing device 767 to inflate one or more bladders 764 in a first portion of a smart textile-based garment 700 (e.g., a first finger), while one or more bladders 764 in a second portion of the smart textile-based garment 700 (e.g., a second finger) remain unchanged. Additionally, the haptic controller 776 can provide one or more signals to cause the pressure-changing device 767 to inflate one or more bladders 764 in a first smart textile-based garment 700 to a first pressure and inflate one or more other bladders 764 in the first smart textile-based garment 700 to a second pressure different from the first pressure. Depending on the number of smart textile-based garments 700 serviced by the pressure-changing device 767, and the number of bladders therein, many different inflation configurations can be achieved through the one or more signals, and the examples above are not meant to be limiting.

The smart textile-based garment 700 may include an optional manifold 765 between the pressure-changing device 767, the haptic assemblies 762, and/or other portions of the smart textile-based garment 700. The manifold 765 may include one or more valves (not shown) that pneumatically couple each of the haptic assemblies 762 with the pressure-changing device 767 via tubing. In some embodiments, the manifold 765 is in communication with the controller 775, and the controller 775 controls the one or more valves of the manifold 765 (e.g., the controller generates one or more control signals). The manifold 765 is configured to switchably couple the pressure-changing device 767 with one or more haptic assemblies 762 of the smart textile-based garment 700. In some embodiments, one or more smart textile-based garments 700 or other haptic devices can be coupled in a network of haptic devices, and the manifold 765 can distribute the fluid between the coupled smart textile-based garments 700.

In some embodiments, instead of using the manifold 765 to pneumatically couple the pressure-changing device 767 with the haptic assemblies 762, the smart textile-based garment 700 may include multiple pressure-changing devices 767, where each pressure-changing device 767 is pneumatically coupled directly with a single (or multiple) haptic assembly 762. In some embodiments, the pressure-changing device 767 and the optional manifold 765 can be configured as part of one or more of the smart textile-based garments 700 (not illustrated) while, in other embodiments, the pressure-changing device 767 and the optional manifold 765 can be configured as external to the smart textile-based garments 700. In some embodiments, a single pressure-changing device 767 can be shared by multiple smart textile-based garments 700 or other haptic devices. In some embodiments, the pressure-changing device 767 is a pneumatic device, hydraulic device, a pneudraulic device, or some other device capable of adding and removing a medium (e.g., fluid, liquid, or gas) from the one or more haptic assemblies 762.

The memory 778 includes instructions and data, some, or all of which may be stored as non-transitory computer-readable storage media within the memory 778. For example, the memory 778 can include one or more operating systems 779, one or more communication interface applications 781, one or more interoperability modules 784, one or more AR processing applications 785, one or more data-management modules 786, and/or any other types of data defined above or described with respect to FIGS. 4A-6B.

The memory 778 also includes data 788, which can be used in conjunction with one or more of the applications discussed above. The data 788 can include device data 790, sensor data 791, and/or any other types of data defined above or described with respect to FIGS. 4A-6B.

The different components of the computing system 740 (and the smart textile-based garment 700) shown in FIGS. 7A-7C can be coupled via a wired connection (e.g., via busing). Alternatively, one or more of the devices shown in FIGS. 7A-7C may be wirelessly connected (e.g., via short-range communication signals).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer-readable storage medium comprising instructions for:

obtaining, via one or more sensors of a wearable electronic device in operable communication with a computing system, data corresponding to a user attempting to perform a sequence of handwriting motions associated with one or more target inputs while wearing the wearable electronic device of the computing system, wherein:

the one or more sensors include a biopotential-signal-sensing component, and the biopotential-signal-sensing component is configured to detect data used to determine respective handwriting motions performed by the user;

identifying, based on at least (i) the data corresponding to the user attempting to perform the sequence of handwriting motions and (ii) the one or more target inputs associated with the sequence of handwriting motions:

a devolved sequence of handwriting motions to suggest to the user for inputting a respective target input of the one or more target inputs, wherein:

the devolved sequence of handwriting motions is a different sequence as compared to the sequence of handwriting motions, and includes fewer handwriting motions as compared to the sequence of handwriting motions; and causing presentation, via the computing system, of a representation of the devolved sequence of handwriting motions.

2. The non-transitory computer-readable storage medium of claim 1, further comprising instructions for:

obtaining, via the one or more sensors of the wearable electronic device, other data corresponding to the user attempting to perform the devolved sequence of handwriting motions associated with the respective target input of the one or more target inputs;

identifying, based on at least (i) the other data corresponding to the user attempting to perform the devolved sequence of handwriting motions and (ii) the respective target input of the one or more target inputs:

a refined devolved sequence of handwriting motions to suggest to the user for inputting the respective target input, wherein the refined devolved sequence of handwriting motions is a different sequence as compared to the devolved sequence of handwriting motions identified based on the sequence of handwriting motions; and causing presentation, via the computing system, of a representation of the refined devolved sequence of handwriting motions.

3. The non-transitory computer-readable storage medium of claim 2, wherein:

the devolved sequence of handwriting motions is selected from a predefined set of devolved sequences corresponding to particular target inputs; and the refined devolved sequence is identified via a self-supervised model that is co-adapted based on sequences of handwriting motions performed by the user.

4. The non-transitory computer-readable storage medium of claim 1, further comprising instructions for:

identifying another devolved sequence of handwriting motions to suggest to the user for inputting a different respective target input of the one or more target inputs, wherein:

the devolved sequence of handwriting motions and the other devolved sequence of handwriting motions individually, and collectively, include fewer handwriting motions as compared to the sequence of handwriting motions.

5. The non-transitory computer-readable storage medium of claim 1, further comprising instructions for:

in accordance with determining that removing one or more handwriting motions of the sequence of handwriting motions would reduce an accuracy of detecting target inputs by less than a threshold error rate:

identifying the devolved sequence of handwriting motions includes determining the devolved sequence of handwriting motions by removing the one or more handwriting motions from the sequence of handwriting motions that was performed by the user.

6. The non-transitory computer-readable storage medium of claim 1, further comprising instructions for:

based on the data corresponding to the sequence of handwriting motions from the one or more sensors of the wearable electronic device:

identifying a plurality of devolved sequences of handwriting motions to suggest to the user for inputting the respective target input, including the devolved sequence of handwriting motions; and causing presentation, via the computing system, of a plurality of representations, each respective representation corresponding to one of the plurality of devolved sequences of handwriting motions.

7. The non-transitory computer-readable storage medium of claim 1, further comprising instructions for:

based on the data corresponding to the sequence of handwriting motions, applying a co-adaptation to an input detection model used to identify the devolved sequence of handwriting motions, wherein the co-adaptation is based on user-specific aspects of performance of one or more respective handwriting motions of the sequence of handwriting motions; and using the co-adaptation to the input detection model to detect a different sequence of handwriting motions corresponding to one or more different target inputs.

8. A method, comprising:

obtaining, via one or more sensors of a wearable electronic device in operable communication with a computing system, data corresponding to a user attempting to perform a sequence of handwriting motions associated with one or more target inputs while wearing the wearable electronic device of the computing system, wherein:

the one or more sensors include a biopotential-signal-sensing component, and the biopotential-signal-sensing component is configured to detect data used to determine respective handwriting motions performed by the user;

identifying, based on at least (i) the data corresponding to the user attempting to perform the sequence of handwriting motions and (ii) the one or more target inputs associated with the sequence of handwriting motions:

a devolved sequence of handwriting motions to suggest to the user for inputting a respective target input of the one or more target inputs, wherein:

the devolved sequence of handwriting motions is a different sequence as compared to the sequence of handwriting motions, and includes fewer handwriting motions as compared to the sequence of handwriting motions; and causing presentation, via the computing system, of a representation of the devolved sequence of handwriting motions.

9. The method of claim 8, further comprising:

obtaining, via the one or more sensors of the wearable electronic device, other data corresponding to the user attempting to perform the devolved sequence of handwriting motions associated with the respective target input of the one or more target inputs;

identifying, based on at least (i) the other data corresponding to the user attempting to perform the devolved sequence of handwriting motions and (ii) the respective target input of the one or more target inputs:

a refined devolved sequence of handwriting motions to suggest to the user for inputting the respective target input, wherein the refined devolved sequence of handwriting motions is a different sequence as compared to the devolved sequence of handwriting motions identified based on the sequence of handwriting motions; and causing presentation, via the computing system, of a representation of the refined devolved sequence of handwriting motions.

10. The method of claim 9, wherein:

the devolved sequence of handwriting motions is selected from a predefined set of devolved sequences corresponding to particular target inputs; and the refined devolved sequence is identified via a self-supervised model that is co-adapted based on sequences of handwriting motions performed by the user.

11. The method of claim 8, further comprising:

identifying another devolved sequence of handwriting motions to suggest to the user for inputting a different respective target input of the one or more target inputs, wherein:

the devolved sequence of handwriting motions and the other devolved sequence of handwriting motions individually, and collectively, include fewer handwriting motions as compared to the sequence of handwriting motions.

12. The method of claim 8, further comprising:

in accordance with determining that removing one or more handwriting motions of the sequence of handwriting motions would reduce an accuracy of detecting target inputs by less than a threshold error rate:

identifying the devolved sequence of handwriting motions includes determining the devolved sequence of handwriting motions by removing the one or more handwriting motions from the sequence of handwriting motions that was performed by the user.

13. The method of claim 8, further comprising:

based on the data corresponding to the sequence of handwriting motions from the one or more sensors of the wearable electronic device:

identifying a plurality of devolved sequences of handwriting motions to suggest to the user for inputting the respective target input, including the devolved sequence of handwriting motions; and causing presentation, via the computing system, of a plurality of representations, each respective representation corresponding to one of the plurality of devolved sequences of handwriting motions.

14. The method of claim 8, further comprising:

based on the data corresponding to the sequence of handwriting motions, applying a co-adaptation to an input detection model used to identify the devolved sequence of handwriting motions, wherein the co-adaptation is based on user-specific aspects of performance of one or more respective handwriting motions of the sequence of handwriting motions; and using the co-adaptation to the input detection model to detect a different sequence of handwriting motions corresponding to one or more different target inputs.

15. A computing system, comprising:

a wearable electronic device comprising:

one or more sensors in operable communication with the computing system; and one or more processors configured to:

obtain, via the one or more sensors of the wearable electronic device of the computing system, data corresponding to a user attempting to perform a sequence of handwriting motions associated with one or more target inputs while wearing the wearable electronic device of the computing system, wherein:

the one or more sensors include a biopotential-signal-sensing component, and the biopotential-signal-sensing component is configured to detect data used to determine respective handwriting motions performed by the user;

identify, based on at least (i) the data corresponding to the user attempting to perform the sequence of handwriting motions and (ii) the one or more target inputs associated with the sequence of handwriting motions:

a devolved sequence of handwriting motions to suggest to the user for inputting a respective target input of the one or more target inputs, wherein:

the devolved sequence of handwriting motions is a different sequence as compared to the sequence of handwriting motions, and includes fewer handwriting motions as compared to the sequence of handwriting motions; and cause presentation, via the computing system, of a representation of the devolved sequence of handwriting motions.

16. The computing system of claim 15, wherein the one or more processors are further configured to:

obtain, via the one or more sensors of the wearable electronic device, other data corresponding to the user attempting to perform the devolved sequence of handwriting motions associated with the respective target input of the one or more target inputs;

identify, based on at least (i) the other data corresponding to the user attempting to perform the devolved sequence of handwriting motions and (ii) the respective target input of the one or more target inputs:

a refined devolved sequence of handwriting motions to suggest to the user for inputting the respective target input, wherein the refined devolved sequence of handwriting motions is a different sequence as compared to the devolved sequence of handwriting motions identified based on the sequence of handwriting motions; and cause presentation, via the computing system, of a representation of the refined devolved sequence of handwriting motions.

17. The computing system of claim 16, wherein:

the devolved sequence of handwriting motions is selected from a predefined set of devolved sequences corresponding to particular target inputs; and the refined devolved sequence is identified via a self-supervised model that is co-adapted based on sequences of handwriting motions performed by the user.

18. The computing system of claim 15, wherein the one or more processors are further configured to:

identify another devolved sequence of handwriting motions to suggest to the user for inputting a different respective target input of the one or more target inputs, wherein:

the devolved sequence of handwriting motions and the other devolved sequence of handwriting motions individually, and collectively, include fewer handwriting motions as compared to the sequence of handwriting motions.

19. The computing system of claim 15, wherein the one or more processors are further configured to:

in accordance with determining that removing one or more handwriting motions of the sequence of handwriting motions would reduce an accuracy of detecting target inputs by less than a threshold error rate:

identify the devolved sequence of handwriting motions includes determining the devolved sequence of handwriting motions by removing the one or more handwriting motions from the sequence of handwriting motions that was performed by the user.

20. The computing system of claim 15, wherein the one or more processors are further configured to:

based on the data corresponding to the sequence of handwriting motions from the one or more sensors of the wearable electronic device:

identify a plurality of devolved sequences of handwriting motions to suggest to the user for inputting the respective target input, including the devolved sequence of handwriting motions; and cause presentation, via the computing system, of a plurality of representations, each respective representation corresponding to one of the plurality of devolved sequences of handwriting motions.

* * * * *